(12) United States Patent
Kawasaki

(10) Patent No.: US 8,046,609 B2
(45) Date of Patent: Oct. 25, 2011

(54) SEMICONDUCTOR DEVICE

(75) Inventor: Kenichi Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 587 days.

(21) Appl. No.: 12/209,809

(22) Filed: Sep. 12, 2008

(65) Prior Publication Data
US 2009/0072885 A1    Mar. 19, 2009

Related U.S. Application Data

(63) Continuation of application No. PCT/JP2007/055047, filed on Mar. 14, 2007, which is a continuation of application No. PCT/JP2006/305212, filed on Mar. 16, 2006.

(51) Int. Cl.
G06F 1/00 (2006.01)
G06F 1/26 (2006.01)
G06F 1/32 (2006.01)
G06F 1/04 (2006.01)
G06F 1/14 (2006.01)

(52) U.S. Cl. ........ 713/300; 713/320; 713/322; 713/500; 713/502

(58) Field of Classification Search .................. None
See application file for complete search history.

(56) References Cited

U.S. PATENT DOCUMENTS
6,191,647 B1 *   2/2001   Tanaka et al. ............... 327/551
2002/0094043 A1 *   7/2002   Chu et al. ..................... 375/346
2004/0027105 A1 *   2/2004   Nakamura et al. ............ 323/267
2007/0005282 A1 *   1/2007   Messier ......................... 702/111
2007/0288182 A1 *  12/2007   Douriet et al. .................. 702/64

FOREIGN PATENT DOCUMENTS
| JP | 6-349946 A | 12/1994 |
|---|---|---|
| JP | 11-007330 A | 1/1999 |
| JP | 2001-358294 A | 12/2001 |
| JP | 2002043910 | * 2/2002 |
| JP | 2003-297937 A | 10/2003 |
| JP | 2004-013820 A | 1/2004 |
| JP | 2006-048467 A | 2/2006 |

OTHER PUBLICATIONS

Tim Fischer et al.; Intel Fort Collins, CO, "A 90nm Variable-Frequency Clock System for a Power-Managed Itanium®-Family Processor", 2005 IEEE International Solid-State Circuits Conference, ISSCC 2005 Session 16, pp. 294-295, p. 599.

* cited by examiner

Primary Examiner — Chun Cao
Assistant Examiner — Samantha Hoang
(74) Attorney, Agent, or Firm — Arent Fox LLP

(57) ABSTRACT

A semiconductor device includes a plurality of circuits each independently conducting a predetermined process, and a circuit operation control part controlling operation start timings and operation suspend timings so as to mutually interfere with power voltage fluctuations caused by a state transition between an operation start and an operation suspend for each of the plurality of circuits.

20 Claims, 36 Drawing Sheets

FIG.24

| CLOCK ENABLING SEQUENCE | ON-STATE NUMBER | OFF-STATE NUMBER | CLOCK DISABLING SEQUENCE |
|---|---|---|---|
| | 4 (ALL ON-STATE) | 0 | STEP 5 |
| STEP 5 | 3 | 1 | STEP 4 |
| STEP 4 | 2 | 2 | STEP 3 |
| STEP 3 | 1 | 3 | STEP 2 |
| STEP 2 | 0 | 4 (ALL OFF-STATE) | STEP 1 |
| STEP 1 | | | |

Clock enabling sequence: STEP 1 → STEP 2 → STEP 3 → STEP 4 → STEP 5

Clock disabling sequence: STEP 5 → STEP 4 → STEP 3 → STEP 2 → STEP 1

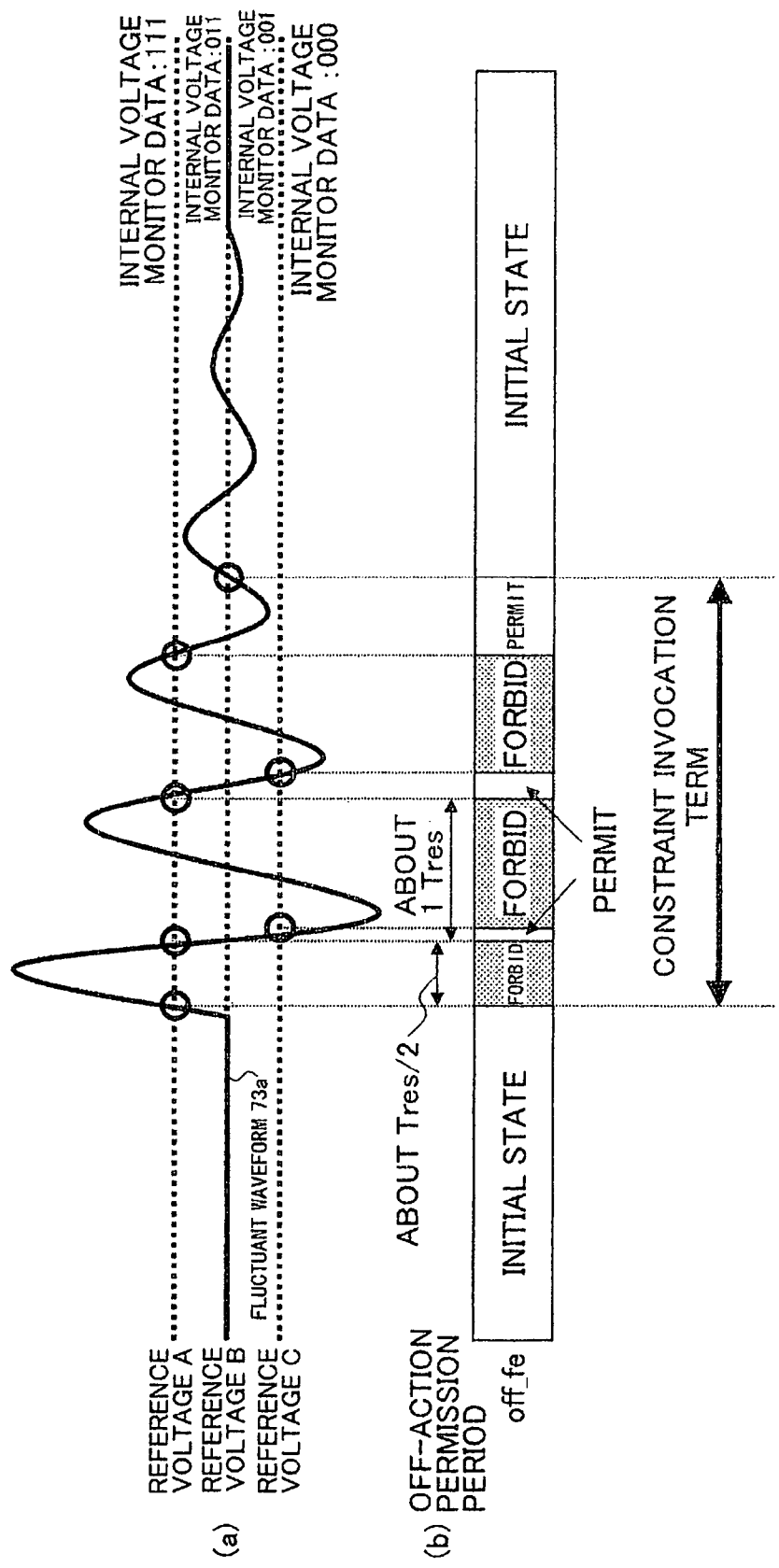

SEMICONDUCTOR DEVICE

CROSS-REFERENCE TO RELATED APPLICATIONS

This application is an U.S. continuation application filed under 35 USC 111(a) claiming benefit under 35 USC 120 and 365(c) of PCT application JP07/055,047, filed Mar. 14, 2007, which claims priority to PCT application JP06/305212, filed Mar. 16, 2006. The foregoing applications are hereby incorporated herein by reference.

FIELD

The present application relates to a semiconductor device.

BACKGROUND

Recently, in a semiconductor device (hereinafter, called an LSI (Large Scale Integration)), a plurality of processors has been formed and arranged as a multi-core. For example, in an LSI 1 illustrated in FIG. 1, a plurality of processors are arranged as a core 0, a core 1, a core 2, a core 3, . . . and a power supply voltage VDD and a ground voltage VSS are applied to the core 0, the core 1, the core 2, the core 3, . . . as an internal power voltage ivdd(V) and an internal ground ivss(V) connected through an inductance Ldd(H) and an inductance Lss (H). Also, the internal power voltage is fluctuated since a power current I(A) flows through their inductances when the core 0, the core 1, the core 2, the core 3, . . . operate. An internal power capacitor C(F) is inserted in order to suppress its voltage fluctuation.

While increasing the number of processors being arranged, a scale of power consumed in the LSI tends to be larger. On the other hand, it has been requested to reduce power consumption. In addition to a configuration of the LSI 1 illustrated in FIG. 1, an LSI 1a illustrated in FIG. 2 is configured so that operations of the core 0, the core 1, the core 2, the core 3, . . . are controlled in response to ON and OFF of an operation enable signals en0, en1, en2, en3, . . . by synchronizing with a system clock sclk. This configuration realized to suspend a circuit with respect to each of the core 0, the core 1, the core 2, the core 3, . . . .

However, in response to a request of reducing the power consumption, it is desired to increase frequency of switching an operation of each core in a circumstance of configuring a multi-core and under an operation control of each core. A difference between the power consumptions when the LSI is operating and when the LSI is suspending becomes bigger, and the power supply voltage in the LSI fluctuates greater due to its step response. Accordingly, there are problems in which internal circuits of the LSI 1 and LSI 1a malfunction. If the internal power capacitor C(F) is increased, the fluctuation of the internal voltage will be suppressed even though a production cost will be increased.

The fluctuation of the internal power voltage of the LSI due to the step response means a power supply noise caused by a rapid change of the internal current of the LSI in a transition from a circuit suspend state to a circuit operation state or a transition from the circuit operation state to the circuit suspend state.

As depicted in FIG. 3, it is a feature of the power supply noise in that the internal power voltage of the LSI begins to fluctuate with significantly great amplitude of a resonance period Tres immediately after an operation state of the LSI is transited, and presently converges when the operation state becomes stable. Also, transitions of the operation state are transiting from the circuit suspend state to the circuit operation state and transiting from the circuit operation state to the circuit suspend state.

When the operation enable signals en0 through en3 turn ON while synchronizing with the system clock sclk and the internal power current I starts to flow, the core 0, the core 1, the core 2, the core 3, . . . simultaneously transit from the circuit suspend state to the circuit operation state. In this case, the internal power voltage ivdd begins to greatly fluctuate toward a negative direction. When the circuit operation state becomes stable, the voltage converges presently. As described, when the circuit suspend state transits to the circuit operation state, the internal power voltage ivdd is significantly amplified due to the resonance period Tres.

On the other hand, when the operation enable signals en0 through en3 turn OFF and the internal power current I stops, the core 0, the core 1, the core 2, the core 3, . . . transit from the circuit operation state to the circuit suspend state. The internal power voltage ivdd begins to greatly fluctuate toward a positive direction. Then, when the circuit suspend state becomes stable, the voltage converges presently. As described, when the circuit operation state transits to the circuit suspend state, the internal power voltage ivdd is significantly amplified due to the resonance period Tres with a reversed phase of the case of transiting from the circuit suspend state to the circuit operation state.

The resonance period Tres is mainly determined based on the internal power capacitor C and the inductance L (Ldd+ Lcc) for the LSI 1 and LSI 1a and is expressed as follows:

$$Tres = 2 \times \pi \times \sqrt{(L \times C)} \qquad (1)$$

when $\pi$ denotes circle ratio.

In a conventional LSI design, in order to prevent a simple switching noise, an approach through shifting an operation timing of each circuit is applied. Moreover, regarding the power supply noise due to the step response as described above, for example, as depicted in FIG. 4, Tim Fischer et al. proposed to detect a noise being occurred and decrease a clock frequency (a) when the power supply noise occurs, in order for the LSI 1 and the LSI 1a to prevent an internal malfunction (for example, see the following reference document 1).

However, since the approach discussed in the conventional technique decreases the clock frequency when the power supply noise occurs, an LSI performance is degraded. Also, in this approach, since a frequency of a circuit operation is modulated, a resonance phenomenon is promoted. There is a risk in that the power supply noise is further amplified. Moreover, since the power supply noise itself due to the step response can not be controlled, it is impossible to suppress the power supply noise (see FIG. 4 of Fischer et al.).

SUMMARY

One aspect of the embodiments relates to a semiconductor device including a plurality of circuits each independently conducting a predetermined process, and a circuit operation control part controlling operation start timings and operation suspend timings so as to mutually interfere with power voltage fluctuations caused by a state transition between an operation start and an operation suspend for each of the plurality of circuits.

BRIEF DESCRIPTION OF THE DRAWINGS

Other objects, features and advantages of the present embodiments will become more apparent from the following detailed description when read in conjunction with the accompanying drawings, in which:

FIG. 24 is a diagram for explaining a clock enabling sequence and a clock disabling sequence by corresponding to a number of ON states and a number of OFF states according to the second embodiment;

FIG. 36 is a diagram for explaining the ON-action permission periods set by the clock disabling sequence according to the second embodiment.

DESCRIPTION OF THE EMBODIMENTS

Embodiments will be described with reference to the accompanying drawings.

Figure 1:
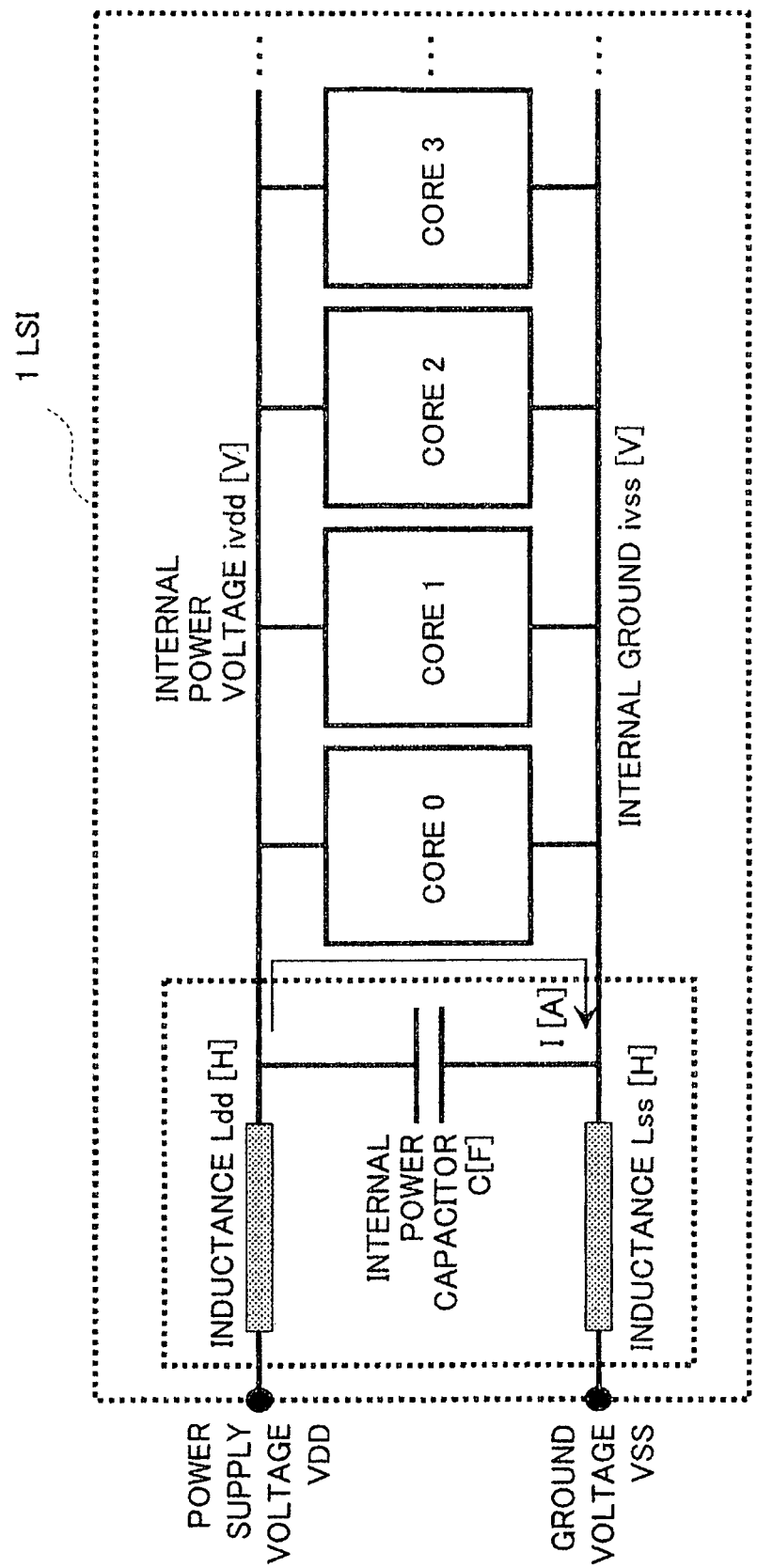
FIG. 1 is a diagram illustrating a configuration example of a semiconductor device mounting a multi-processor.
Figure 2:
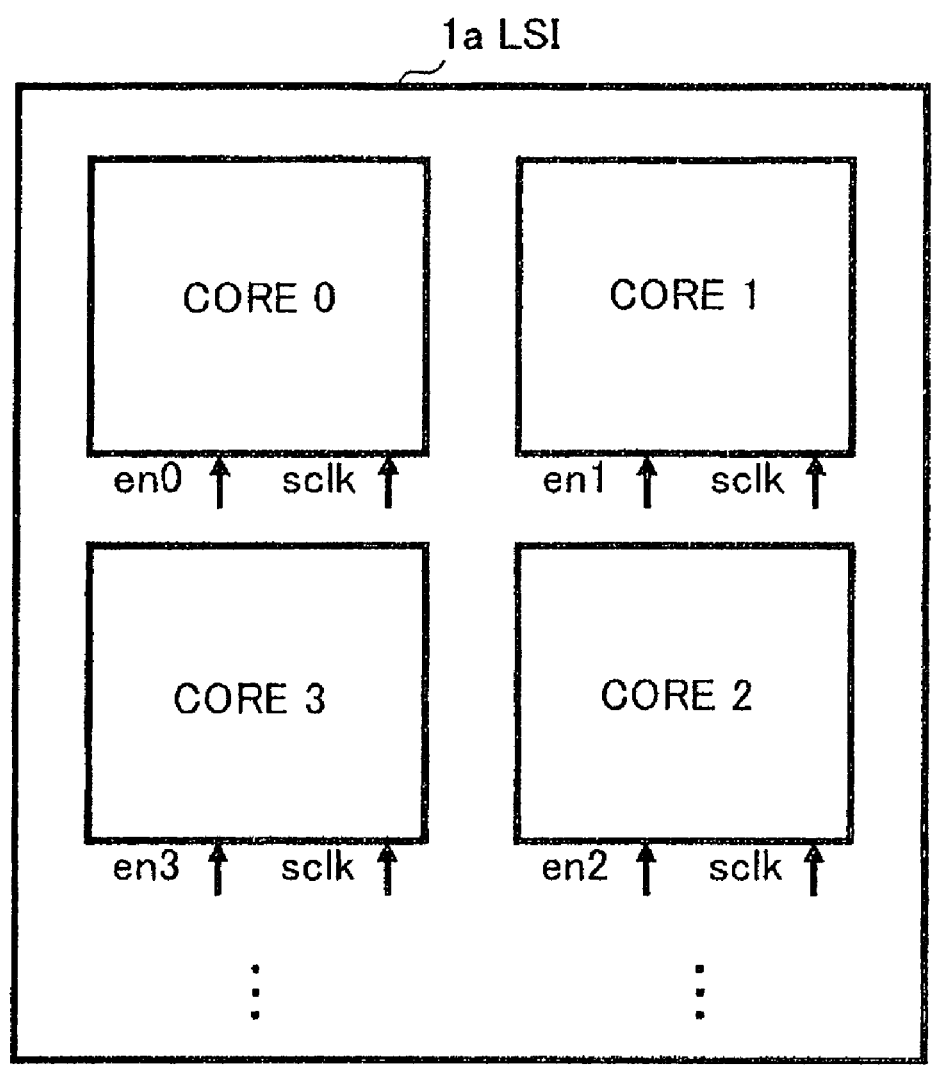
FIG. 2 is a diagram illustrating an example of a multi-processor implementing operation enable terminals.
Figure 3:
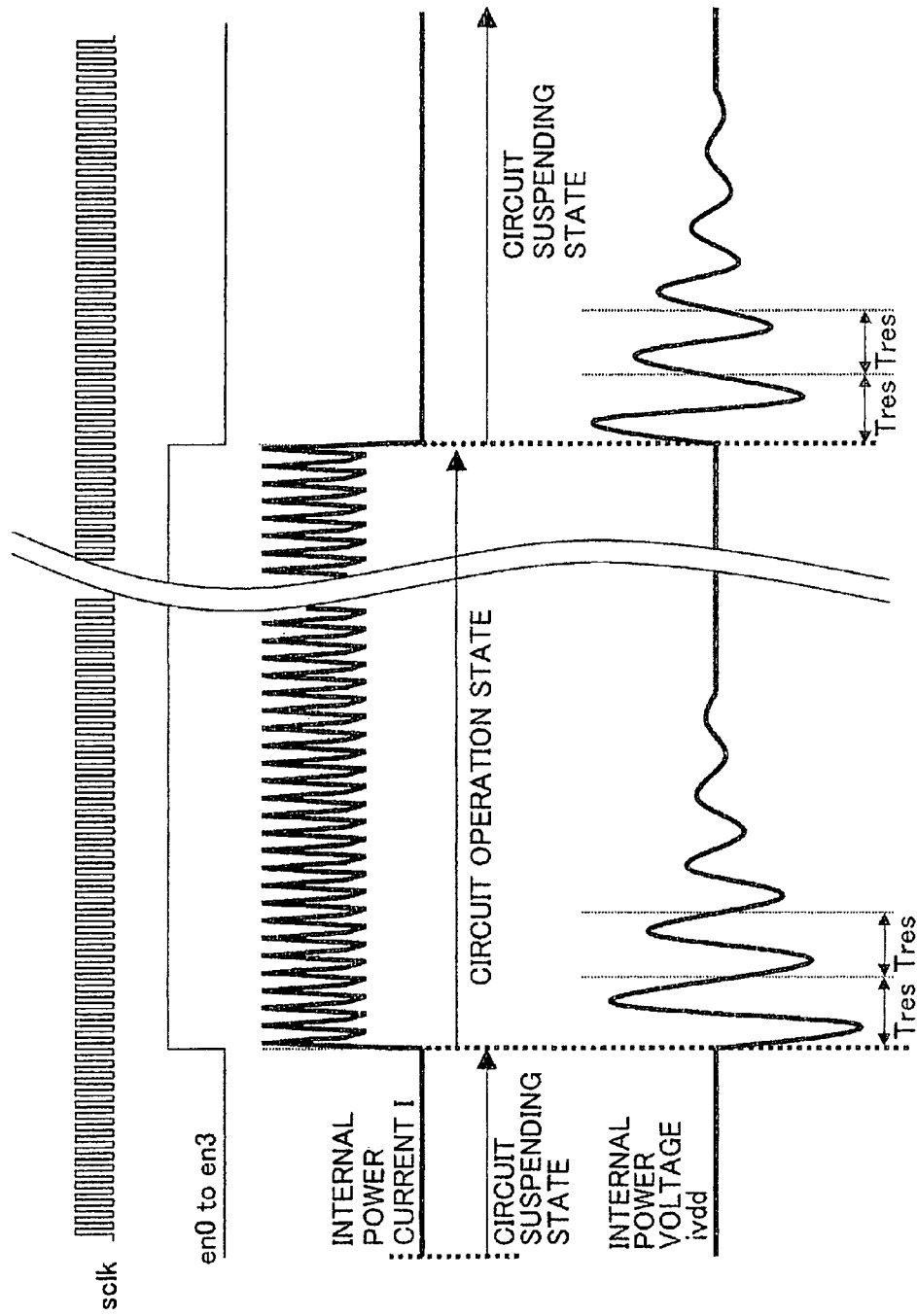
FIG. 3 is a diagram illustrating a fluctuation of an internal power voltage.
Figure 4:
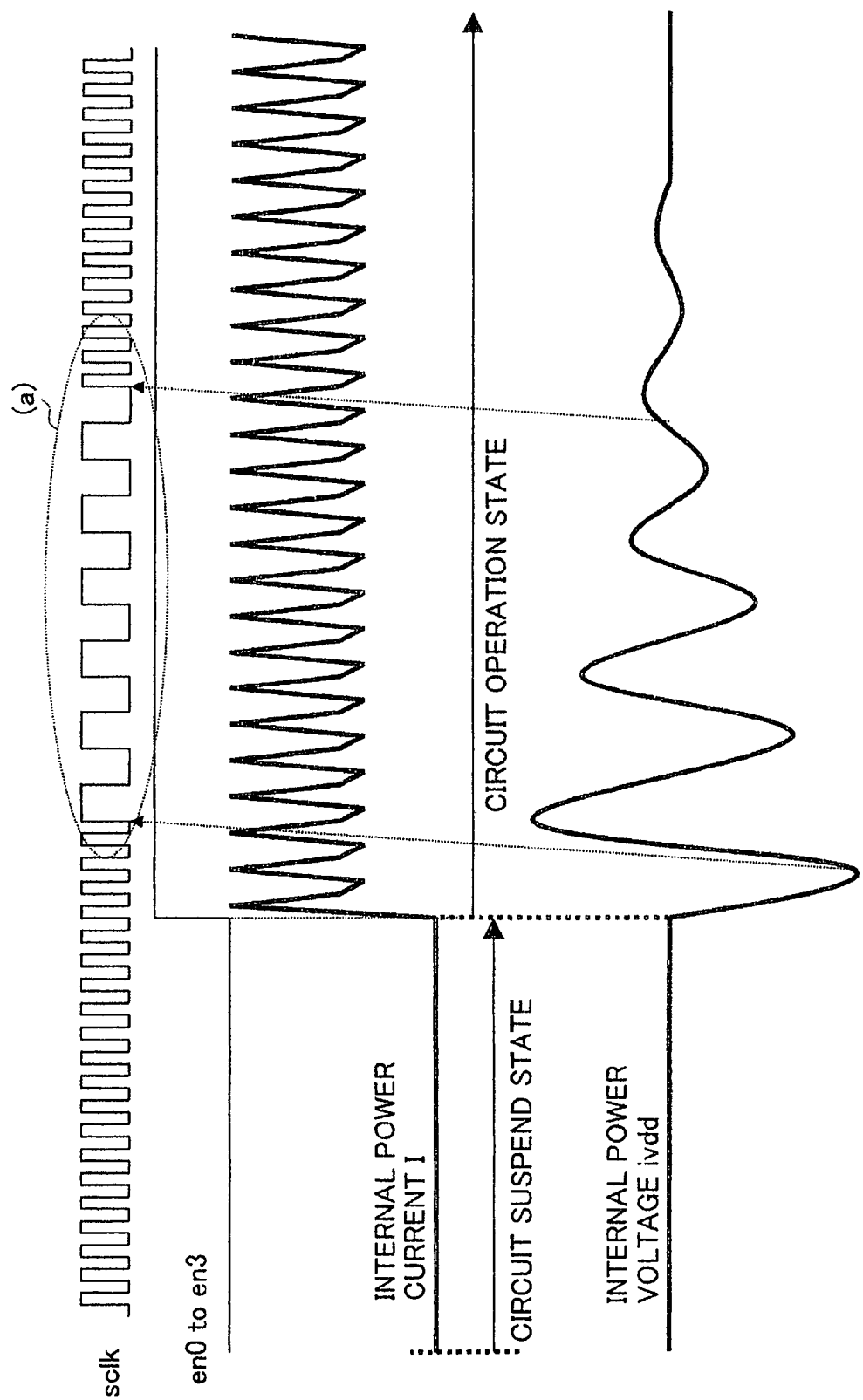
FIG. 4 is a diagram for explaining a conventional method for changing a clock frequency in response to an occurrence of a power supply noise.
Figure 5:
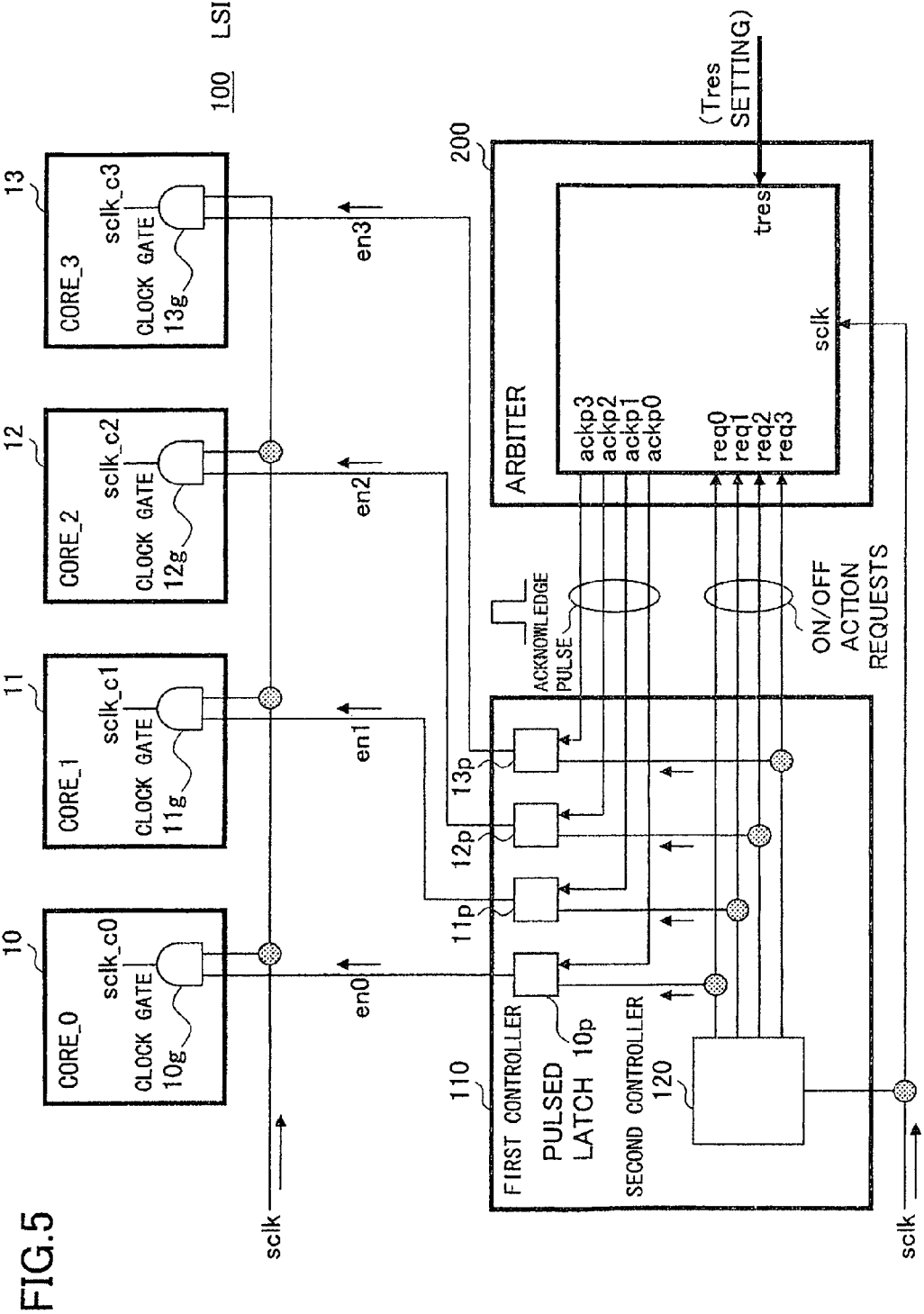
FIG. 5 is a diagram schematically illustrating a circuit configuration of an LSI according to a first embodiment.

FIG. 5 is a diagram showing a circuit configuration for suppressing a power supply noise in an LSI according to a first embodiment. In FIG. 5, only a circuit configuration for suppressing the power supply noise in the LSI is illustrated and other configurations are omitted.

In FIG. 5, as an example of the circuit configuration for suppressing the power supply noise, an LSI 100 includes a core_0 10, a core_1 11, a core_2 12, a core_3 13, a first controller 110, and an arbiter 200. In the LSI 100 illustrated in FIG. 5, four processors are arranged as the core_0 10, the core_1 11, the core_2 12, and the core_3 13. The circuit configuration is not limited to this configuration, and the embodiments may be applied to any configuration of a multi-core processor formed by one through n (n is greater then 4) numbers of processors by implementing a similar configuration described below.

The core_0 10 includes a clock gate 10g which inputs a system clock sclk and an operation enable signal en0 and outputs an internal system clock sclk_c0 inside the core_0 10. The core_1 11 includes a clock gate 11g which inputs the system clock sclk and an operation enable signal en1 and outputs an internal system clock sclk_c1 inside the core_1 11. The core_2 12 includes a clock gate 12g which inputs the system clock sclk and an operation enable signal en2 and outputs an internal system clock sclk_c2 inside the core_2 12. The core_3 13 includes a clock gate 13g which inputs the system clock sclk and an operation enable signal en3 and outputs an internal system clock sclk_c3 inside the core_3 13.

The first controller 110 includes a second controller 120 and pulsed latches 10p, 11p, 12p, and 13p.

The second controller 120 conducts ON-action requests for staring operations or OFF-action requests for suspending the operations of the core_0 10, the core_1 11, the core_2 12, and the core_3 13 with respect to the arbiter 200. The ON-action requests or the OFF-action requests are supplied to the pulsed latches 10p, 11p, 12p, and 13p.

The pulsed latch 10p is connected to the core_0 10. When the pulsed latch 10p receives the ON-action request or the OFF-action request from the second controller 120 and receives an acknowledge pulse ackp0 from the arbiter 200 with respect to the ON-action request or the OFF-action request, the pulsed latch 10p supplies the operation enable signal en0 to the core_0 10.

The pulsed latch 11p is connected to the core_1 11. When the pulsed latch 11p receives the ON-action request or the OFF-action request from the second controller 120 and receives an acknowledge pulse ackp1 from the arbiter 200 with respect to the ON-action request or the OFF-action request, the pulsed latch 11p supplies the operation enable signal en1 to the core_1 11.

The pulsed latch 12p is connected to the core_2 12. When the pulsed latch 12p receives the ON-action request or the OFF-action request from the second controller 120 and receives an acknowledge pulse ackp2 from the arbiter 200 with respect to the ON-action request or the OFF-action request, the pulsed latch 12p supplies the operation enable signal en1 to the core_2 12.

The pulsed latch 13p is connected to the core_3 13. When the pulsed latch 13p receives the ON-action request or the OFF-action request from the second controller 120 and receives an acknowledge pulse ackp3 from the arbiter 200 with respect to the ON-action request or the OFF-action request, the pulsed latch 13p supplies the operation enable signal en1 to the core_3 13.

The arbiter 200 is a circuit to adjust timings of the ON-action request and the OFF-action request based on the resonance period Tres which is externally set. When the arbiter 200 receives signals req0, req1, req2, and req3 corresponding to the core_0 10, the core_1 11, the core_2 12, and the core_3 13, the arbiter 200 conducts a taming adjustment based on the resonance period Tres and sends acknowledge pulses ackp0, ackp1, ackp2, and ackp3 to the first controller 110.

The ON-action means to make the operation enable signals en0 through en3 simultaneously or individually transit from an OFF state to an ON state. Also, the OFF-action means to make the operation enable signals en0 through en3 simultaneously or individually transit from the ON state to the OFF state.

Figure 6:
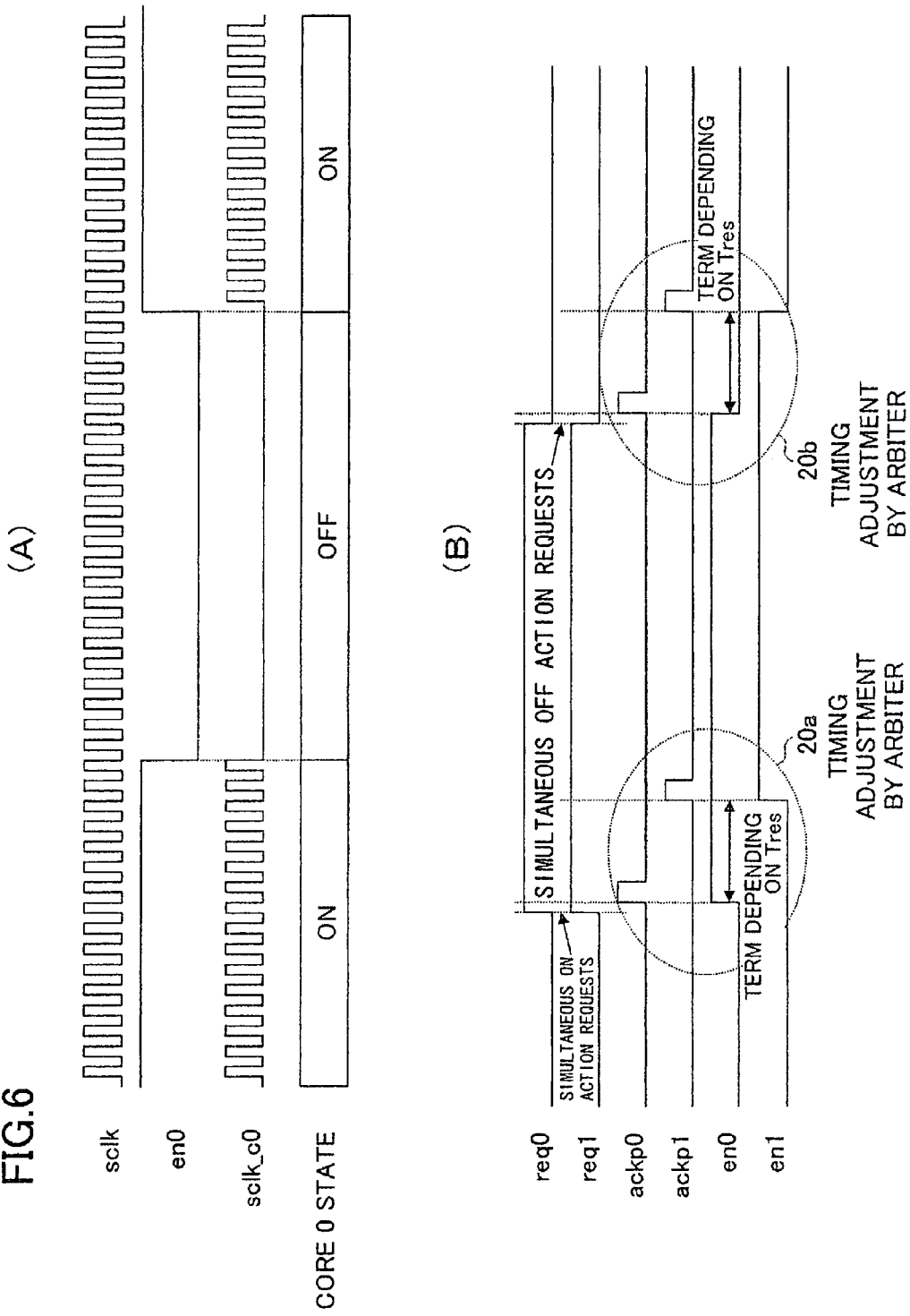
FIG. 6 is a diagram for explaining operation states of cores and a timing adjustment concept according to the first embodiment.

First, in a case of the core_0 10 as an example, signal states corresponding to the operation states of the core_0 10 will be described with reference to FIG. 6A. The operation states are the ON state and the OFF state. FIG. 6A is a diagram illustrating the operation states of the core_0 10.

In FIG. 6A, when the operation state of the core_0 10 (hereinafter, called a core_0 state) is the ON state, the operation enable signal en0 retains a high level, and the system clock, which is supplied so that the core_0 10 properly operates during the high level of the operation enable signal en0, is used as the internal system clock sclk_c0. When the core_0 state transits to the OFF state, the operation enable signal en0 becomes a low level, and supplying the system clock sclk to the core_0 10 is stopped. Thus, the internal system clock sclk_c0 of the core_0 10 becomes the low level. Also, the core_1 11 through the core_3 13 similarly repeat the ON state and the OFF state.

A concept of the timing adjustment conducted by the arbiter 200 based on the resonance period Tres will be described with reference to FIG. 6B. FIG. 6B is a diagram for explaining the concept of the timing adjustment based on the resonance period Tres in a case of simultaneously conducting the ON-action requests and further simultaneously conducting the OFF-action requests to the core_0 10 and the core_1 11.

In FIG. 6B, when the signal req0 and the signal req1 simultaneously turn ON and indicate the ON-action requests, the arbiter 200 sends the acknowledge pulse ackp0 for the core_0 10 to the first controller 110. When a certain time depending on the resonance period Tres lapses, the arbiter 200 sends the acknowledge ackp1 for the core_1 11 to the first controller 110 (a timing adjustment 20a by the arbiter 200).

After that, when the signal req0 and the signal req1 simultaneously turn OFF and indicate the OFF-action requests, the arbiter 200 sends the acknowledge pulse ackp0 for the core_0 10 to the first controller 110. When a certain time depending on the resonance period Tres, the arbiter 200 sends the acknowledge pulse ackp1 for the core_1 11 to the first controller 110 (a timing adjustment 20b by the arbiter 200).

In the following, the timing adjustment conducted by the arbiter 200 based on the resonance period Tres will be described in detail.

Figure 7:
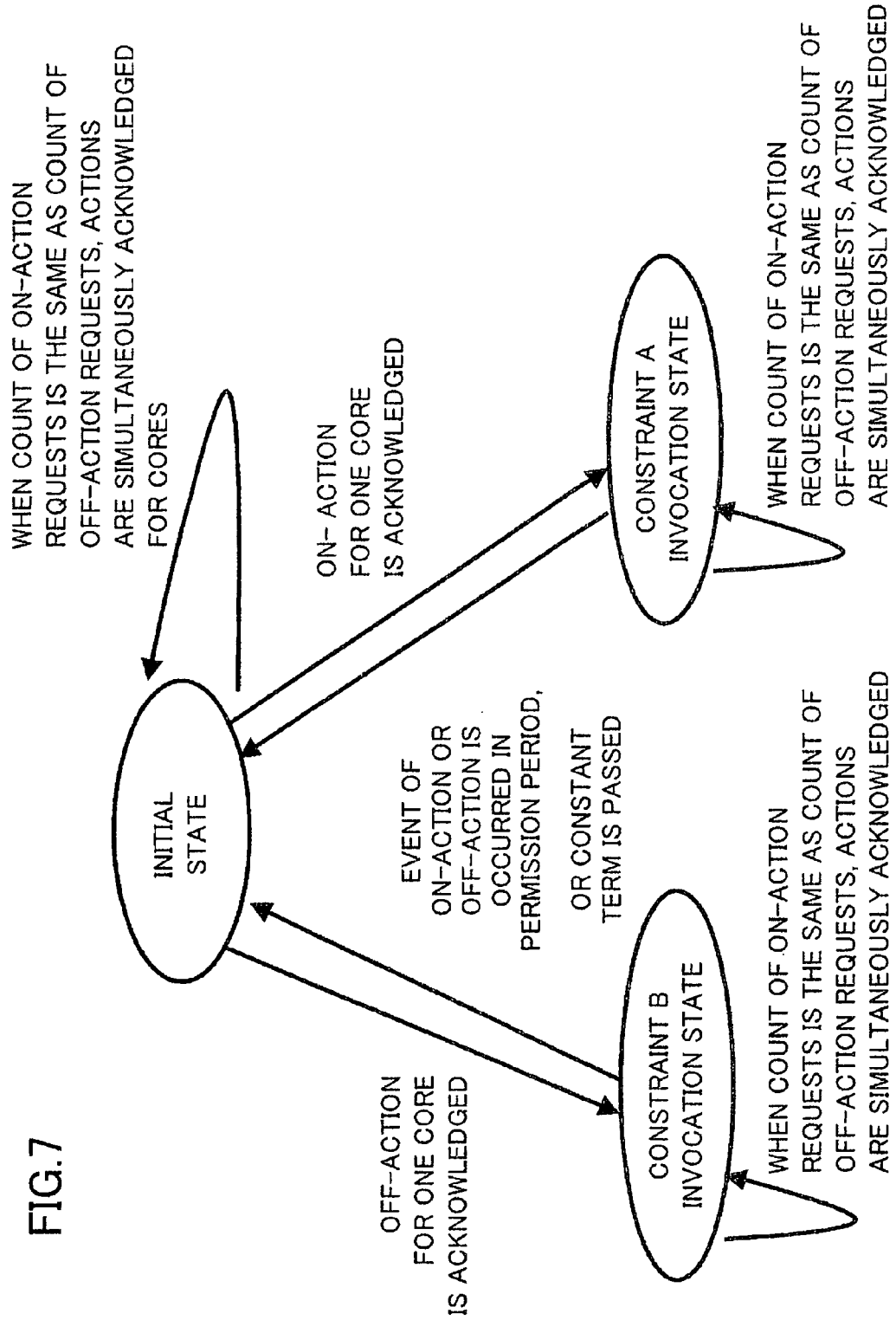
FIG. 7 is a diagram illustrating a state transition of an arbiter according to the first embodiment.

FIG. 7 is a diagram for explaining a state transition of the arbiter 200 according to the first embodiment. In FIG. 7, the arbiter 200 has an initial state, a constraint A invocation state, and a constraint B invocation state. The initial state is a stable state in that the internal power voltage ivdd is stable. For example, in the initial state, a power voltage fluctuation is not occurred or is converged, or a plurality of internal power voltage fluctuations are interfered with each other and are cancelled. The constraint A invocation state is a state of constraining a further operation start and a further operation suspend when the initial state is transited to the operation state. Moreover, the constraint B invocation state is a state of constraining the further operation start and the further operation suspend when the initial state is transited to the suspend state.

In the initial state, when the number of the ON-action requests and the number of the OFF-action requests from the controller 110 are the same value, the arbiter 200 acknowledges all ON-action requests and all OFF-action requests and retains the initial state.

When the number of the ON-action requests is more than the number of the OFF-action requests in the initial state, the arbiter 200 acknowledges the entire OFF-action requests and the ON-action requests of which count equals to the number of the OFF-action requests in the entire ON-action requests. The arbiter 200 further acknowledges one more ON-action request. The arbiter 200 retains other ON-action requests and transits to the constraint A invocation state from the initial state.

When an event of the ON-action request or the OFF-action request during a permission term set in the constraint A invocation state, the arbiter 200 transits from the constraint A invocation state to the initial state. Or, after a constant time lapses, the arbiter 200 transits from the constraint A invocation state to the initial state. The constant time is of assuming that the power voltage inside the LSI 100 converges in the constraint A invocation state.

When the number of the OFF-action requests is more than the number of the ON-action requests in the initial state, the arbiter 200 acknowledges the entire ON-action requests and the OFF-action requests of which number is equal to the number of the ON-action requests in the entire OFF-action requests. The arbiter 200 further acknowledges one more OFF-action request. The arbiter 200 retains other OFF-action requests and transits to the constraint B invocation state from the initial state.

When an event of the ON-action request or the OFF-action request during a permission term set in the constraint B invocation state, the arbiter 200 transits from the constraint B invocation state to the initial state. Or, after a constant time lapses, the arbiter 200 transits from the constraint B invocation state to the initial state. The constant time is a time until the power voltage inside the LSI 100 converges in the constraint B invocation state.

In the following, in a case in that the ON-action requests and the OFF-action requests simultaneously occur, one ON-action request is paired with one OFF-action request.

Figure 8:
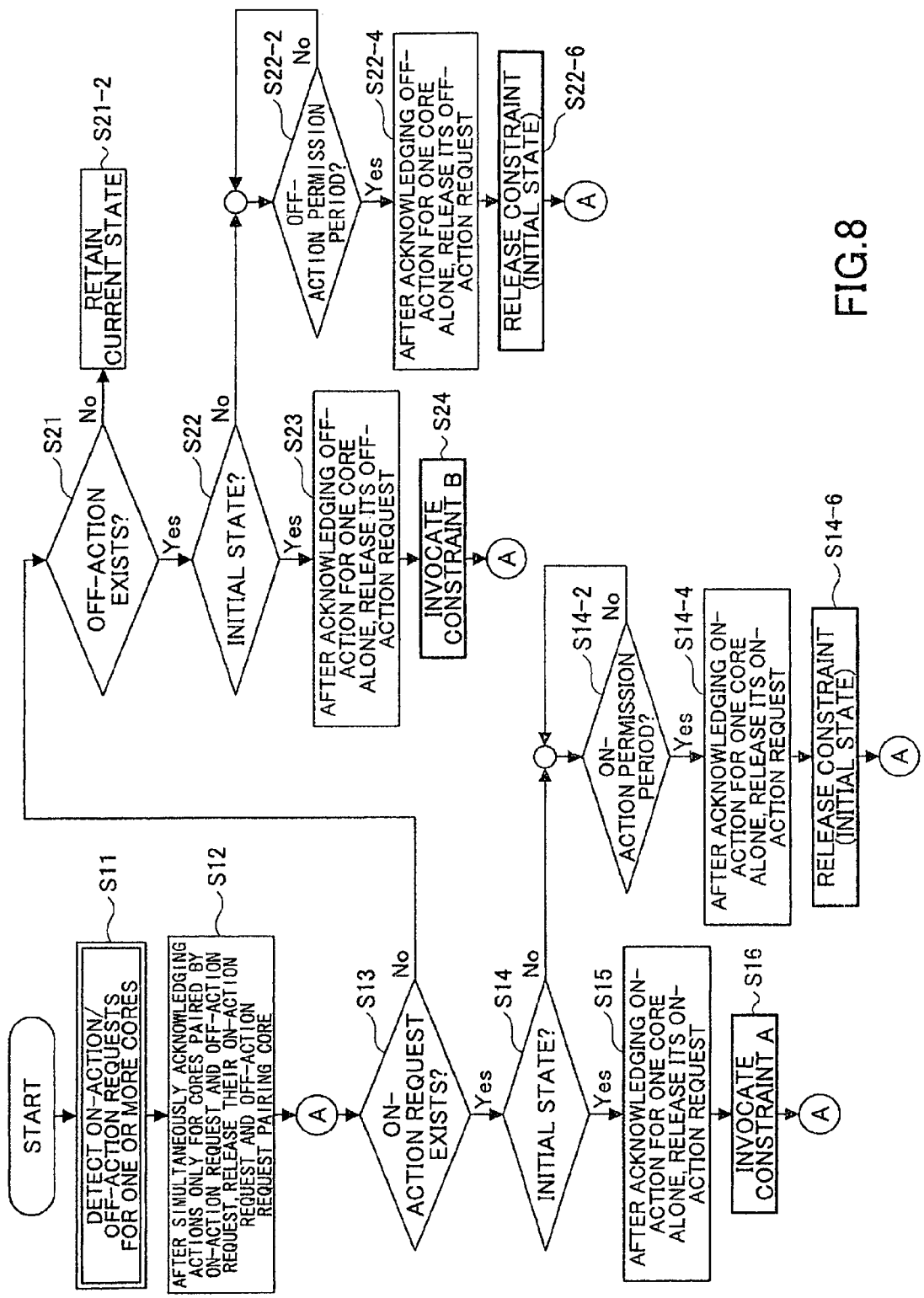
FIG. 8 is a flowchart for explaining a basic operation of the arbiter according to the first embodiment.

FIG. 8 is a flowchart diagram for explaining a basic operation of the arbiter 200 according to the first embodiment. In FIG. 8, when the arbiter 200 detects the ON-action requests or the OFF-action requests for one or more cores (step S11), the arbiter 200 simultaneously acknowledges only the ON-action request and the OFF-action request which are paired with each other, and then, release the pair of the ON-action request and the OFF-action request (step S12).

The arbiter 200 further determines whether or not other ON-action requests exist (step S13). When the ON-action request exists, the arbiter 200 determines whether or not it is the initial state (step S14). If the operation state is not the initial state, the arbiter 200 determines whether or not the ON-action permission term is set (step S14-2). If the ON-action permission term is not set, the arbiter 200 waits until the ON-action permission period is set.

On the other hand, when it is determined that the ON-action permission term is set in the step S14-2, after the arbiter 200 acknowledges to turn ON only for one core, the arbiter 200 releases the ON-action request (step S14-4). In a case of conducting the ON-action requests for a plurality of cores, for example, the arbiter 200 acknowledges the ON-actions from a smaller core number.

Then, the arbiter 200 releases the constraint A invocation state or the constraint B invocation state and transits to the initial state (step S14-6). After that, the arbiter 200 goes back to the step S13.

On the other hand, in the step S14, when it is determined whether or not it is the initial state, after the arbiter 200 acknowledges the ON-action only for one core, the arbiter 200 releases the ON-action request (step S15). When the ON-action requests are conducted for more than one core, for example, the arbiter 200 acknowledges the ON-actions from the smaller core number.

Then, the arbiter 200 invokes the constraint A and transits to the constraint A invocation state (step S16). After that, the arbiter 200 goes back to the step S13.

When it is determined that the ON-action request does not exist in the step S13, the arbiter 200 determines whether or not the OFF-action request exists (step S21). When it is determined that the OFF-action request does not exist, the arbiter 200 retains a current state (step S21-2).

On the other hand, the arbiter 200 determines whether or not it is the initial state (step S22). If it is not the initial state, the arbiter 200 determines whether or not it is the OFF-action permission period (step S22-2). When the OFF-action permission period, the arbiter 200 waits until the OFF-action permission period.

When it is determined whether or not it is the OFF-action permission period in the step S22-2, after the arbiter 200 acknowledges the OFF-action only for one core, the arbiter 200 releases the OFF-action request (step S22-4). If the OFF-action requests are conducted for more than one core, for example, the arbiter 200 acknowledges the OFF-actions from the smaller core number.

Subsequently, the arbiter 200 releases the constraint A invocation state or the constraint B invocation state, and transits to the initial state (step S22-6).

When it is determined that it is the initial state in the step S22, after the arbiter 200 acknowledges the OFF-action only for one core, the arbiter 200 releases the OFF-action request (step S23). If the OFF-action requests are conducted for more than one core, for example, the arbiter 200 acknowledges the OFF-actions from the smaller core number.

Subsequently, the arbiter 200 invokes the constraint B and transits to the constraint B invocation state (step S24). After that, the arbiter 200 goes back to the step S13.

In FIG. 8, when the ON-action request or the OFF-action request is newly sent from the first controller 110 and is detected, an interruption is made and the arbiter 200 starts the beginning of the above-described process from the step S11, again.

Figure 9:
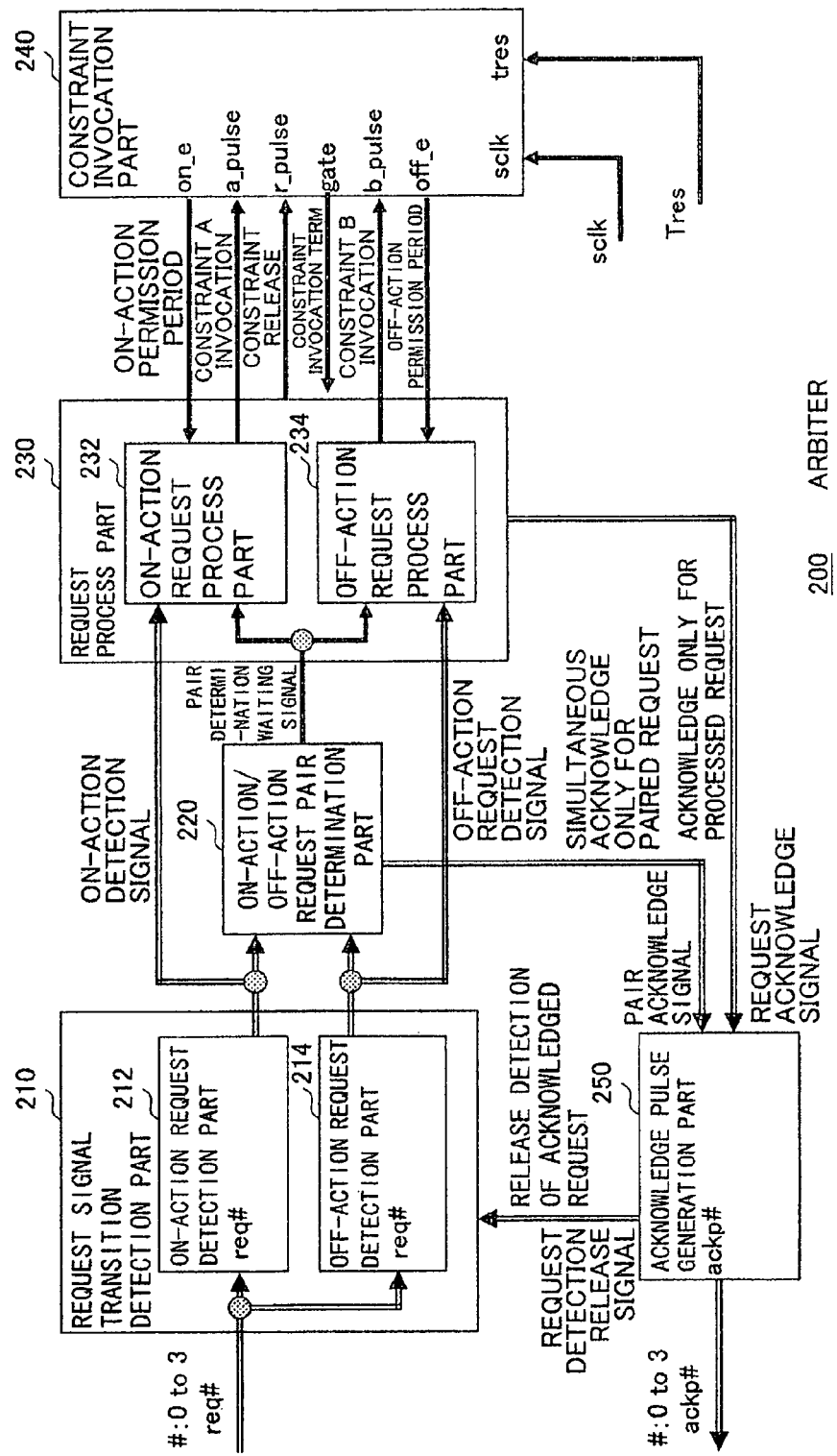
FIG. 9 is a diagram illustrating a circuit configuration of the arbiter according to the first embodiment.
Figure 10:
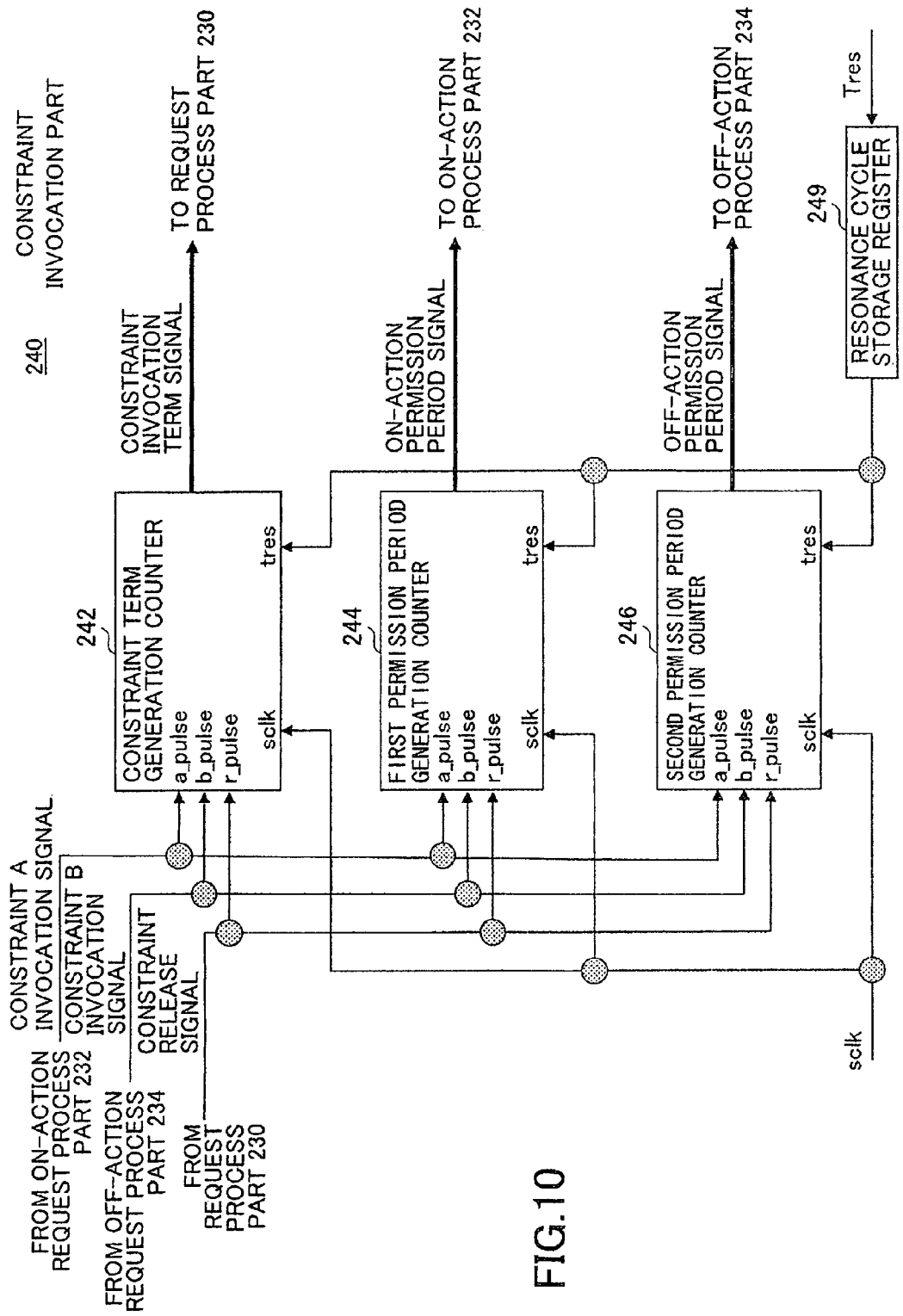
FIG. 10 is a diagram illustrating a circuit configuration of a constraint invocation part according to the first embodiment.

A circuit configuration and a signal flow of the arbiter 200 will be described with reference to FIG. 9 and FIG. 10. In FIG. 9 and FIG. 10, # denotes at least one of the core numbers 0 through 3, and may denote all numbers 0 through 3 or any combination of the numbers 0 through 3. For the sake of convenience, # generically denotes any case, and a single double-line represents all lines which are required in fact.

FIG. 9 is a block diagram illustrating a circuit configuration of the arbiter 200 according to the first embodiment. In FIG. 9, the arbiter 200 includes a request signal transition detection part 210, an ON-action/OFF-action request pair determination part 220, a request process part 230, a constraint invocation part 210, and an acknowledge pulse generation part 250.

The request signal transition detection part 210 is a circuit which detects a change from OFF to ON or from ON to OFF of the signal req#. The request signal transition detection part 210 further includes an ON-action request detection 212, and an OFF-action request detection part 214.

The ON-action/OFF-action request pair determination part 220 is a circuit which determines whether or not there is a pair of the ON-action request and the OFF-action request. The ON-action/OFF-action request pair determination part 220 outputs pair determination waiting signals to the ON-action request process part 232 and the OFF-action request process part 234 of the request process part 230 until a determination result of the pair is made. Accordingly, the request process part 230 does not operate during the pair determination waiting signal is ON.

The request process part 230 includes an ON-action request process part 232 which controls the transition of the operation state due to the ON-action request, and the OFF-action request process part 234 which controls the transition of the operation state due to the OFF-action request.

The constraint invocation part 240 controls a process for the ON-action request and the OFF-action request by using various control signals with respect to the request process part 230, by using the system clock sclk and the resonance period Tres.

When the acknowledge pulse generation part 250 receives a pair acknowledge signal from the ON-action/OFF-action request pair determination part 220, the acknowledge pulse generation part 250 sends the acknowledge pulses ackp# for the signals req# corresponding to the pair. Also, when the acknowledge pulse generation part 250 receives request acknowledge signals from the request process part 230, the acknowledge pulse generation part 250 sends the acknowledge pulses ackp# for the signals req# corresponding to the request acknowledge signals to the first controller 110.

First, the signals req# is received by the request signal transition detection part 210, ad is simultaneously supplied to the ON-action request detection part 212 and the OFF-action request detection part 214.

The ON-action request detection part 212 detects a change from OFF to ON of the signals req# sent from the second controller 110, and sends the signals req# indicating the OFF-action requests as ON-action request detection signals to the ON-action/OFF-action request pair determination part 220. The ON-action detection signals are also sent to the ON-action request process part 232 of the request process part 230. However, the ON-action request process part 232 of the request process part 230 does not conduct any process for the ON-action request detection signals during the ON-action request process part 232 is receiving the pair determination waiting signal from the ON-action/OFF action request pair determination part 220.

The OFF-action request detection part 214 detects a change from ON to OFF of the signals req# sent from the second controller 110, and sends the signals req# to which the ON-action request is made, as OFF-action request detection signals to the OFF-action/ON-action request pair determination part 220. The OFF-action request detection signals are also sent to the OFF-action request process part 234 of the request process part 230. However, the OFF-action request process part 234 of the request process part 230 does not any process with respect to the OFF-action request detection signal during the OFF-action request process part 234 is receiving the pair determination waiting signal from the ON-action/OFF-action request pair determination part 220.

Figure 16:
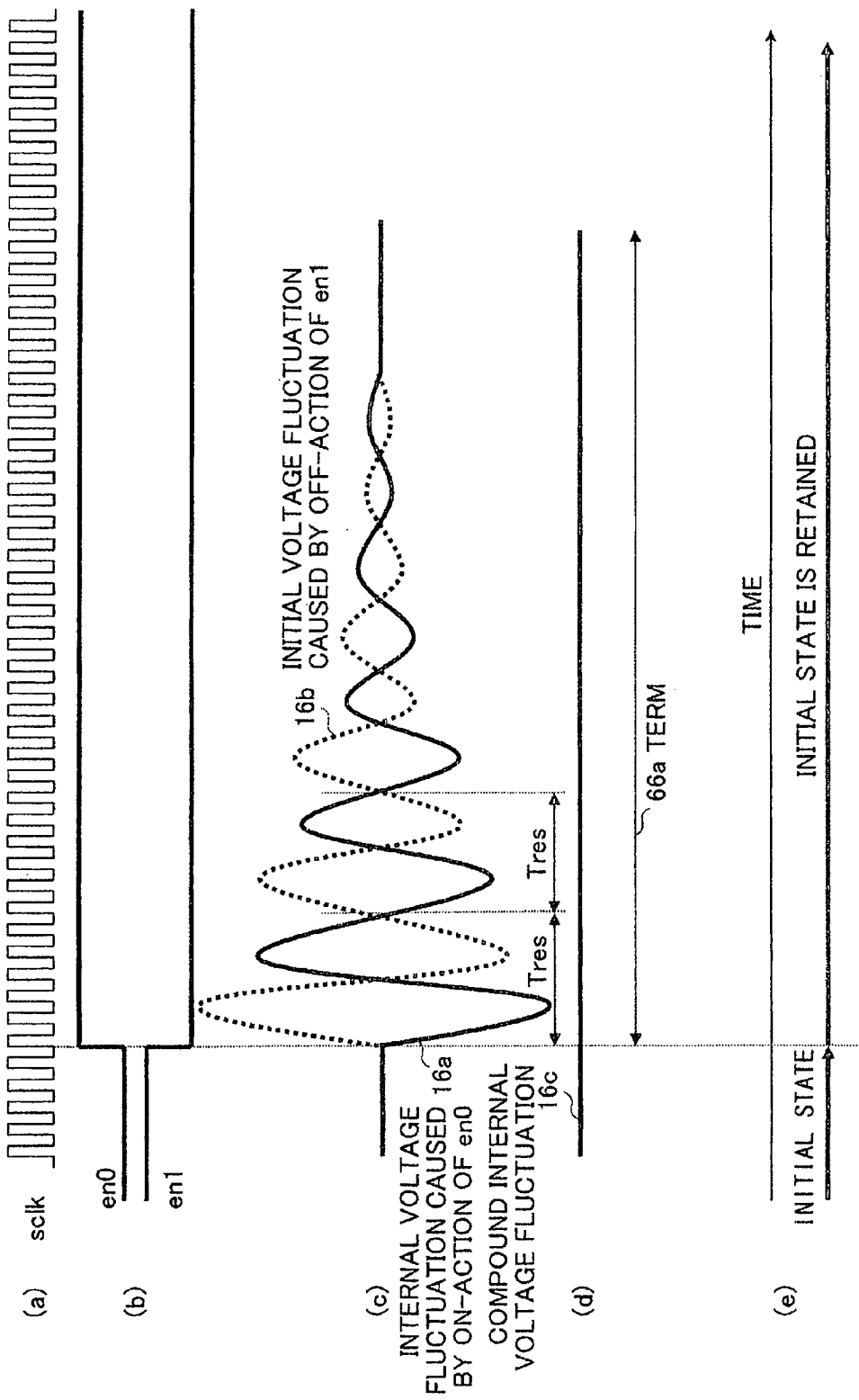
FIG. 16 is a diagram for explaining a internal power voltage waveform caused by simultaneously executing the ON-action and the OFF-action being a pair according to the first embodiment.

The ON-action/OFF-action request pair determination part 220 determines whether or not the pair exists, base on the ON-action request detection signals received from the ON-action request detection part 212 and the OFF-action request detection signals received from the OFF-action request detection part 214, and sends the pair acknowledge signals only for the signals req# being paired, to the acknowledge pulse generation part 250. In the circuit configuration depicted in FIG. 5, one or two pairs are made. Simultaneously, one of cores corresponding to the signals req# of one pair becomes the ON state, and another core becomes the OFF state. Accordingly, the internal power voltage fluctuation are cancelled (FIG. 16 described below). The arbiter 200 retains in the current state (FIG. 7).

After the ON-action/OFF-action request pair determination part 220 sends the pair acknowledge signals corresponding to the signals req# being paired, to the acknowledge pulse generation part 250, and the ON-action/OFF-action request pair determination part 220 releases the pair determination waiting signal.

In response to the pair acknowledge singles sent from the ON-action/OFF-action request pair determination part 220, when the acknowledge pulse generation part 250 sends the acknowledge pulses ackp# corresponding to the signals req# being paired, to the first controller 110, the acknowledge pulse generation part 250 sends request detection release signals for the ON-action request detection signal and the OFF-action request detection signal being paired, to the request signal transition detection part 210.

When the request detection release signals are received by the request signal transition detection part 210, the ON-action request detection part 212 releases only the ON-action request detection signals corresponding to the request detection release signals, and sends other ON-action request detection signals.

Similarly, the OFF-action request detection part 214 releases only the OFF-action request detection signals corresponding to the request detection release signals and sends other OFF-action request detection signals.

Since the pair determination waiting signal is released, the arbiter 200 conducts a request process corresponding to the state transition. In this case, since the pair has been already determined, the request process is conducted for one ON-action request or one OFF-action request. That is, either one of the ON-action request process part 232 and the OFF-action request process part 234 conducts the request process. In the following, the request process will be described for each state transition of the arbiter 200.

<Initial State>

The ON-action request process part 232 of the request process part 230 determines whether the current state is the initial state or the constraint invocation state, based on a level of a constraint invocation term signal gate sent from the constraint invocation part 240. If it is the initial state (for example, the constraint invocation term signal gate is a high level), the ON-action request process part 232 outputs the request acknowledge signal only for the signal req# corresponding to the smallest core number in the cores to which the ON-action requests are conducted. Subsequently, the ON-action request process part 232 sends a constraint A invocation pulse a_pulse to the constraint invocation part 240 so that the constraint A is invoked. The arbiter 200 is set in the constraint A invocation state.

Similarly, the OFF-action request process part 234 of the request process part 230 determines whether the current state is the initial state or the constraint invocation state, based on the level of the constraint invocation term signal gate sent from the constraint invocation part 240. If it is the initial state (for example, the constraint invocation term signal gate is the high level), the OFF-action request process part 232 outputs the request acknowledge signal only for the signal req# corresponding to the smallest core number in the cores to which the OFF-action requests are conducted. Subsequently, the OFF-action request process part 234 sends a constraint B invocation pulse b_pulse to the constraint invocation part 240 so that the constraint B is invoked. The arbiter 200 is set in the constraint B invocation state.

The acknowledge pulse generation part 250 sends the acknowledge pulses ackp# for the signals req# corresponding to the request acknowledge signals received from the request process part 230. Also, the acknowledge pulse generation part 250 sends one request detection release signal in response to the ON-action request detection signal or the OFF-action request detection signal corresponding to the request acknowledge signal, and the ON-action request detection signal or the OFF-action request detection signal of the request signal transition detection part 210 are released.

<Constraint Invocation State>

When the constraint invocation term signal gate sent from the constraint invocation part 240 is the low level, the ON-action request process part 232 of the request process part 230 further determines whether the current state is the ON-action permission period or an ON-action forbidden period, based on the level of the ON-action permission term signal on_e sent from the constraint invocation part 240. When it is the ON-action forbidden period (for example, the ON-action permission period signal on_e is the low level), the ON-action request process part 232 holds the request process, and waits until the ON-action permission period (for example, the ON-action permission period signal on_e is the high level).

When the ON-action permission period signal on_e becomes the high level, the ON-action request process part 232 of the request process part 230 outputs the request acknowledge signal only for the signal req# corresponding to the smallest core number in the core_0 10 through the core_3 13 to which the ON-action requests are conducted.

The acknowledge pulse generation part 250 sends the acknowledge pulses ackp# to the first controller 110 for the signals req# corresponding to the request acknowledge signals received from the request process part 230. Also, the acknowledge pulse generation part 250 releases the ON-action request detection signals of the request signal transition detection part 210 by sending the request detection release signals for the ON-action request detection signals corresponding to the request acknowledge signals.

Furthermore, in this case, the request process part 230 outputs the constraint release pulse r_pule to the constraint invocation part 240, and the constraint invocation state is released. Accordingly, the arbiter 200 returns to the initial state.

Similarly, when the constraint invocation term signal gate sent from the constraint invocation part 240 is the low level, the OFF-action request process part 234 of the request process part 230 further determines whether the current state is the OFF-action permission period or the OFF-action forbidden period, based on the level of the OFF-action permission period signal off_e sent from the constraint invocation part 240. In a case of the OFF-action forbidden period (for example, the OFF-action permission period signal off_e is the low level), the OFF-action request process part 234 holds the request process, and waits for the OFF-action permission period (for example, the ON-action permission period signal off_e is the high level).

When the ON-action permission period signal off_e becomes the high level, the OFF-action request process part 234 of the request process part 230 outputs the request acknowledge signal only for the signal req# corresponding to the smallest core number in the cores to which the OFF-action requests are conducted.

The acknowledge pulse generation part 250 sends the acknowledge pulses ackp# for the signals rea# corresponding to the request acknowledge signals received from the request process part 230. Also, the acknowledge pulse generation part 250 releases the OFF-action request detection signals of the request signal transition detection part 210 by sending the request detection release signals for the OFF-action request detection signals corresponding to the request acknowledge signals.

Furthermore, in this case, the request process part 230 releases the constraint invocation state by sending the constraint release pulses r_pulse to the constraint invocation part 240. Accordingly, the arbiter 200 returns to the initial state.

FIG. 10 is a diagram illustrating a circuit configuration of the constraint invocation part 240 according to the first embodiment. In FIG. 10, the constraint invocation part 240 includes a constraint term generation counter 242, a first permission period generation counter 244, a second permission period generation counter 246, and a resonance period storage register 249.

A constraint A invocation signal sent from the ON-action request processing part 232, a constraint B invocation signal sent from the OFF-action request process part 234, and a constraint release signal sent from the request process part 230 are supplied to the constraint term generation counter 242, the first permission period generation counter 244, and the second permission period generation counter 246.

Also, the system clock sclk is supplied to the constraint term generation counter 242, the first permission period generation counter 244, and the second permission period generation counter 246.

The resonance period Tres is supplied from the resonance period storage register 249 to the constraint term generation counter 242, the first permission period generation counter 244, and the second permission period generation counter 246.

The resonance period storage register 249 is a register to which the resonance period Tres is externally set. The resonance period Tres is indicated by a cycle count of the system clock sclk. In the arbiter 200, by the resonance period storage register 249 which is externally set, information concerning the resonance period of the power supply is set as programmable.

When the constraint term generation counter 242 detects the constraint A invocation signal a_pulse, the constraint term generation counter 242 retains the constraint invocation term signal gate to be low level during the constraint A invocation term determined based on the resonance period Tres. The constraint A invocation term is determined as follows:

resonance period Tres×frequency of constraint A invocation term

The constraint A invocation term is counted by using the system clock sclk.

When the constraint term generation counter 242 detects the constraint B invocation signal b_pulse, the constraint term generation counter 242 retains the constraint invocation term signal gate to be low level during the constraint B invocation term determined based on the resonance period Tres. The constraint B invocation term is determined as follows:

resonance period Tres×frequency of constraint B invocation term

The constraint B invocation term is counted by using the system clock sclk.

Moreover, when the constraint term generation counter 242 detects the constraint release signal r_pulse, the constraint term generation counter 242 releases the count. That is, the constraint invocation term signal gate is set to be a high level and the constraint is released.

When the first permission generation counter 244 detects the constraint A invocation signal a_pulse, the first permission generation counter 244 retains the ON-action permission term signal on_e to be a high level.

The ON-action permission term of the constraint A invocation term is determined to mutually cancel fluctuations of the internal power voltages caused by the ON-action requests during the constraint A invocation term. That is, when the constraint A invocation signal a_pulse is detected, after a predetermined number is counted by using the system clock sclk until a start of the ON-action permission period, the ON-action permission period signal on_e is set to be a high level. Subsequently, after a predetermined number of the ON-action permission period is counted by using the system clock sclk, the ON-action permission period signal on_e is set to be a low level. Accordingly, after a predetermined count is counted by using the system clock sclk until a start of a next ON-action permission period, the ON-action permission period signal on_e is set to be a high level. This above-described counting method is conducted in response to the constraint A invocation. A determination method of the ON-action permission period in the constraint A invocation term is described with reference to FIG. 11A and FIG. 11B in detail.

Also, when the first permission term generation counter 244 detects the constraint B invocation signal b_pulse, the first permission term generation counter 244 retains the ON-action permission term signal on_e to be a high level during the ON-action permission term determined based on the resonance period Tres.

The ON-action permission period of the constraint B invocation term is determined to mutually cancel the fluctuations of the internal power voltages caused by the ON-action requests during the constraint B invocation term. That is, after the constraint B invocation signal b_pulse is detected, the ON-action permission period signal on_e is set to be a high level. Subsequently, after a predetermined number is counted by using the system clock sclk for a first ON-action permission period, the ON-action permission period signal on_e is set to be a low level. Moreover, after a predetermined number is counted by using the system clock sclk until a state of a next ON-action permission term, the ON-action permission term signal on_e is set to be a high level. This above-described counting method is conducted in response to the constraint B invocation. A determination method of the ON-action permission period in the constraint B invocation term is described with reference to FIG. 14A and FIG. 14B in detail.

When the second permission period generation counter 246 detects the constraint A invocation signal a_pulse, the second permission period generation counter 246 retains the OFF-action permission period signal off_e to be a high level during the OFF-action permission period determined based on the resonance period Tres.

The OFF-action permission period of the constraint A invocation term is determined to mutually cancel the fluctuations of the internal power voltages caused by the OFF-action requests during the constraint A invocation term. That is, after the constraint A invocation signal a_pulse is detected, the OFF-action permission period signal off_e is set to be a high level. Subsequently, after a predetermined number is counted by using the system clock sclk for a first OFF-action permission period, the OFF-action permission period signal off_e is set to be a low level. Moreover, after a predetermined number is counted by using the system clock sclk until a state of a next OFF-action permission term, the OFF-action permission term signal off_e is set to be a high level. This above-described counting method is conducted in response to the constraint A invocation. A determination method of the OFF-action permission period in the constraint A invocation term is described with reference to FIG. 11A and FIG. 11B in detail.

Moreover, the when the second permission period generation counter 246 detects the constraint B invocation signal b_pulse, the second period generation counter 246 retains the OFF-action permission period signal off_e to be a high level during the OFF-action permission period based on the resonance period Tres.

The OFF-action permission period of the constraint B invocation term is determined to mutually cancel the fluctuations of the internal power voltages caused by the OFF-action requests during the constraint B invocation term. That is, when the constraint B invocation signal b_pulse is detected, after a predetermined number is counted by using the system clock sclk until a start of the OFF-action permission period, the OFF-action permission period signal off_e is set to be a high level. Subsequently, after a predetermined number of the OFF-action permission period is counted by using the system clock sclk, the ON-action permission period signal off_e is set to be a low level. Accordingly, after a predetermined count is counted by using the system clock sclk until a start of a next OFF-action permission period, the OFF-action permission period signal off_e is set to be a high level. This above-described counting method is conducted in response to the constraint B invocation. A determination method of the OFF-action permission period in the constraint B invocation term is described with reference to FIG. 14A and FIG. 14B in detail.

Next, a control of the first permission period generation counter 244 during the ON-action permission period and a control of the second permission period generation counter 246 during the OFF-action permission period in the constraint A invocation term are described with reference to FIG. 11A and FIG. 11B.

Figure 11:
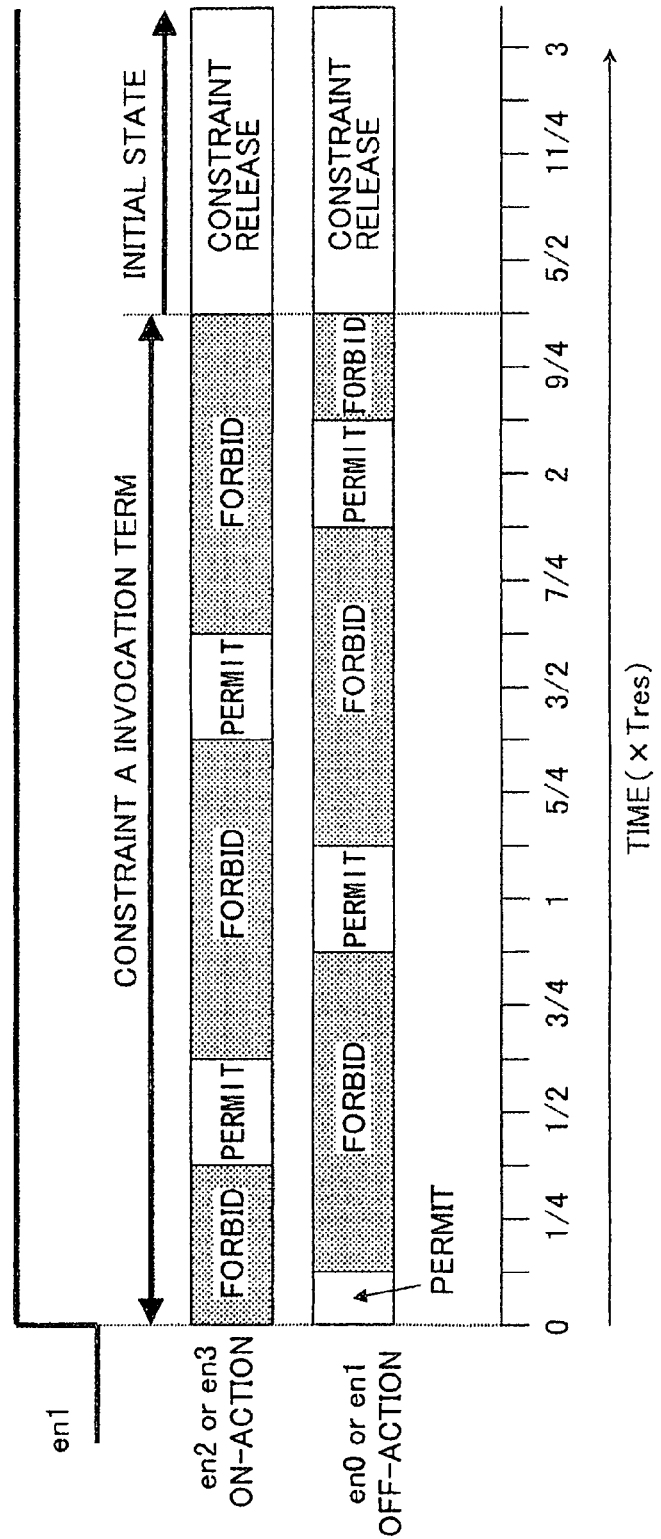
FIG. 11A is a diagram illustrating a state example of invoking a constraint A according to the first embodiment.
FIG. 11B is a diagram illustrating a control example for ON-action requests and OFF-action requests in a constraint A invocation term according to the first embodiment.

FIG. 11A is a diagram illustrating a state example in which the constraint A is invoked. In FIG. 11A, in a case in that the operation enable signal en0 is in the ON state and the operation enable signals en1, en2, and en3 are in the OFF state, when the operation enable signal en1 transits to the ON state, the constraint A is invoked.

FIG. 11B is a diagram illustrating control examples for the ON-action request and the OFF-action request in the constraint A invocation term during the state illustrated in FIG. 11A. In FIG. 11B, for example, when a value "16 cycles" of the system clock sclk is set as a Tres value indicating one resonance period, the constraint A invocation term is determined as 19/8 resonance periods in which the internal power voltage converges.

In FIG. 11B, first, a control for the ON-action request in the constraint A invocation term will be described.

The first ON-action permission period is set to appear after approximately ½ resonance period, and following ON-action permission periods are set to appear every one cycle after the first ON-action permission period.

For the ON-action permission periods, margins are set to provide certain intervals before and after the appearance timings. For example, the margins may be ±⅛ resonance period, ±1/16 resonance period, or a like. This example illustrates a case in that the margins are ±⅛ resonance period.

In the state example in FIG. 11A, the ON-action request may be conducted for the operation enable signal en2 or en3. For example, in a case in that the ON-action request process part 232 of the request process part 230 receives the ON-action request detection signal indicating the ON-action request for the operation enable signal en2 and the pair determination waiting signal is released, when the high level of the ON-action permission period signal on_e is detected, the ON-action request process part 232 acknowledges the ON-action request.

The request process part 230 outputs the request acknowledge signals, and the fluctuations of internal power voltages caused by transitions to the ON-state of the operation enable signal en1 and the ON-state of the operation enable signal en2 are mutually cancelled. Accordingly, the constraint release signal r_pulse is sent to the constraint invocation part 240. The constraint A invocation term is released, and the arbiter 200 is in the initial state.

When the ON-action request process part 232 receives the ON-action request detection signal indicating the ON-action request with respect to the operation enable signal en2 in an ON-action forbidden period, the ON-action request process part 232 holds the ON-action request until a next ON-action permission period, and outputs the request acknowledge signal when the next ON-action permission period starts. Accordingly, the constraint A invocation term is released, and the arbiter 200 is in the initial state.

Next, referring to FIG. 11B, a control for the OFF-action request in the constraint A invocation term will be described.

The first OFF-action permission period is set to appear simultaneously with the constraint A invocation, and following OFF-action permission periods are set to appear every one cycle after the first OFF-action permission period.

For the OFF-action permission periods, margins are set to provide certain intervals before and after the appearance timings. For example, the margins may be ±⅛ resonance period, ±1/16 resonance period, or a like. This example illustrates a case in that the margins are ±⅛ resonance period.

In the state example in FIG. 11A, the OFF-action request may be conducted for the operation enable signal en0 or en1. For example, in a case in that the OFF-action request process part 234 of the request process part 230 receives the OFF-action request detection signal indicating the OFF-action request for the operation enable signal en0 and the pair determination waiting signal is released, when the high level of the OFF-action permission period signal off_e is detected, the OFF-action request process part 234 acknowledges the OFF-action request.

The request process part 230 outputs the request acknowledge signals, and the fluctuations of internal power voltages caused by transitions to the ON-state of the operation enable signal en1 and the OFF-state of the operation enable signal en0 are mutually cancelled. Accordingly, the constraint release signal r_pulse is sent to the constraint invocation part 240. The constraint A invocation term is released, and the arbiter 200 is in the initial state.

When the OFF-action request process part 234 receives the OFF-action request detection signal indicating the OFF-action request with respect to the operation enable signal en0 in an OFF-action forbidden period, the OFF-action request process part 234 holds the OFF-action request until a next OFF-action permission period, and outputs the request acknowledge signal when the next OFF-action permission period starts. Accordingly, the constraint A invocation term is released, and the arbiter 200 is in the initial state.

Moreover, in a case in that the ON-action request and the OFF-action request being paired occur in the constraint A invocation term, even if it is not the ON-action permission period and the OFF-action permission period, the ON-action request and the OFF-action request being paired are simultaneously acknowledged and the constraint A invocation term as illustrated in FIG. 11B is retained.

Next, a difference between a presence and an absence of an event occurrence due to the ON-action request or the OFF-action request after the constraint A invocation will be described with reference to FIG. 12 and FIG. 13. The event occurrence indicates a state of releasing the constraint due to the ON-action request or the OFF-action request conducted after the constraint A invocation, instead of waiting the constraint A invocation term.

Figure 12:
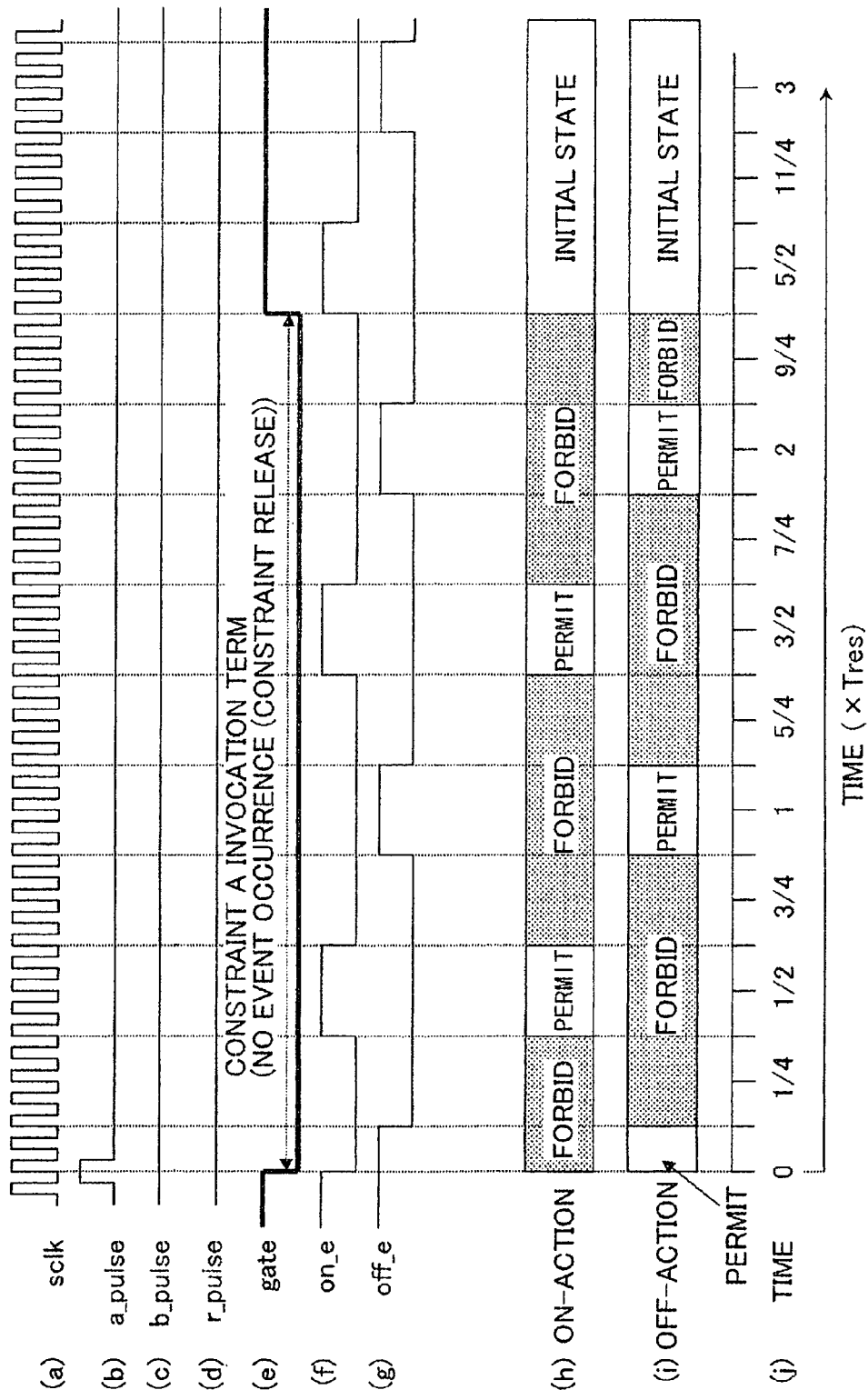
FIG. 12 is a diagram illustrating a case of terminating the constraint A invocation term since there is no event occurrence according to the first embodiment.

FIG. 12 is a diagram illustrating signal states for a case in that the constraint A invocation term is terminated since no event occurs. The system clock sclk is illustrated from a state immediately before the constraint A invocation term to a state after transiting to the initial state when the end of the constraint A invocation term (FIG. 12(*a*)). The constraint A invocation signal a_pulse turns OFF at one clock after the ON state indicating a start of the constraint A (FIG. 12(*b*)). The constraint B invocation signal b_pulse is in the OFF state (FIG. 12(*c*)). The constraint release signal r_pulse is in the OFF state (FIG. 12(*d*)).

The constraint invocation term signal gate becomes a low level immediately after the ON state of the constraint A invocation signal a_pulse, and the low level is retained during the constraint A invocation term. If there is no even occurrence (constraint release), the constraint invocation term signal gate becomes a high level at the end of the constraint A invocation term (FIG. 12(*e*)).

The ON-action permission term signal on_e alternately repeats the low level and the high level by corresponding to the ON-action forbidden period and the ON-action permission term with respect to the constraint A invocation term, in response to the ON state of the constraint A invocation signal a_pulse (FIG. 12(*f*)).

Similarly, the OFF-action permission term signal off_e repeats the low level and the high level in turn by corresponding to the OFF-action permission term and the OFF-action forbidden period with respect to the constraint A invocation term, in response to the ON state of the constraint A invocation signal a_pulse (FIG. 12(*g*)).

A time (FIG. 12(*j*)) is indicated by the resonance period Tres which one cycle equals to 16 cycles of the system sclk. By the above-described signal states, for the ON-action request, first ⅜ resonance periods are defined as the ON-action forbidden period, ⅜ to ⅝ resonance periods are defined as the ON-action permission period, ⅝ to 11/8 resonance periods are defined as the ON-action forbidden period, . . . , and it becomes the initial state after 19/8 resonance periods (FIG. 12(*h*)). Excluding the first ON-action forbidden period, a pair of the ON-action permission period and the ON-action forbidden period becomes one cycle. This control is conducted by the first permission period generation counter 244 (FIG. 10).

With respect to the OFF-action request, a first ⅛ resonance period is defined as the OFF-action permission period, ⅛ resonance period to ⅞ resonance periods are defined as the OFF-action forbidden period, ⅞ resonance periods to 9/8 resonance periods are defined as the OFF-action permission period, . . . , and it becomes the initial state after 19/8 resonance periods (FIG. 12(*i*)). Excluding the first OFF-action permission period and the last OFF-action forbidden period, a pair of the OFF-action permission period and the OFF-action forbidden period becomes one cycle. This control is conducted by the second permission period generation counter 246 (FIG. 10).

Figure 13:
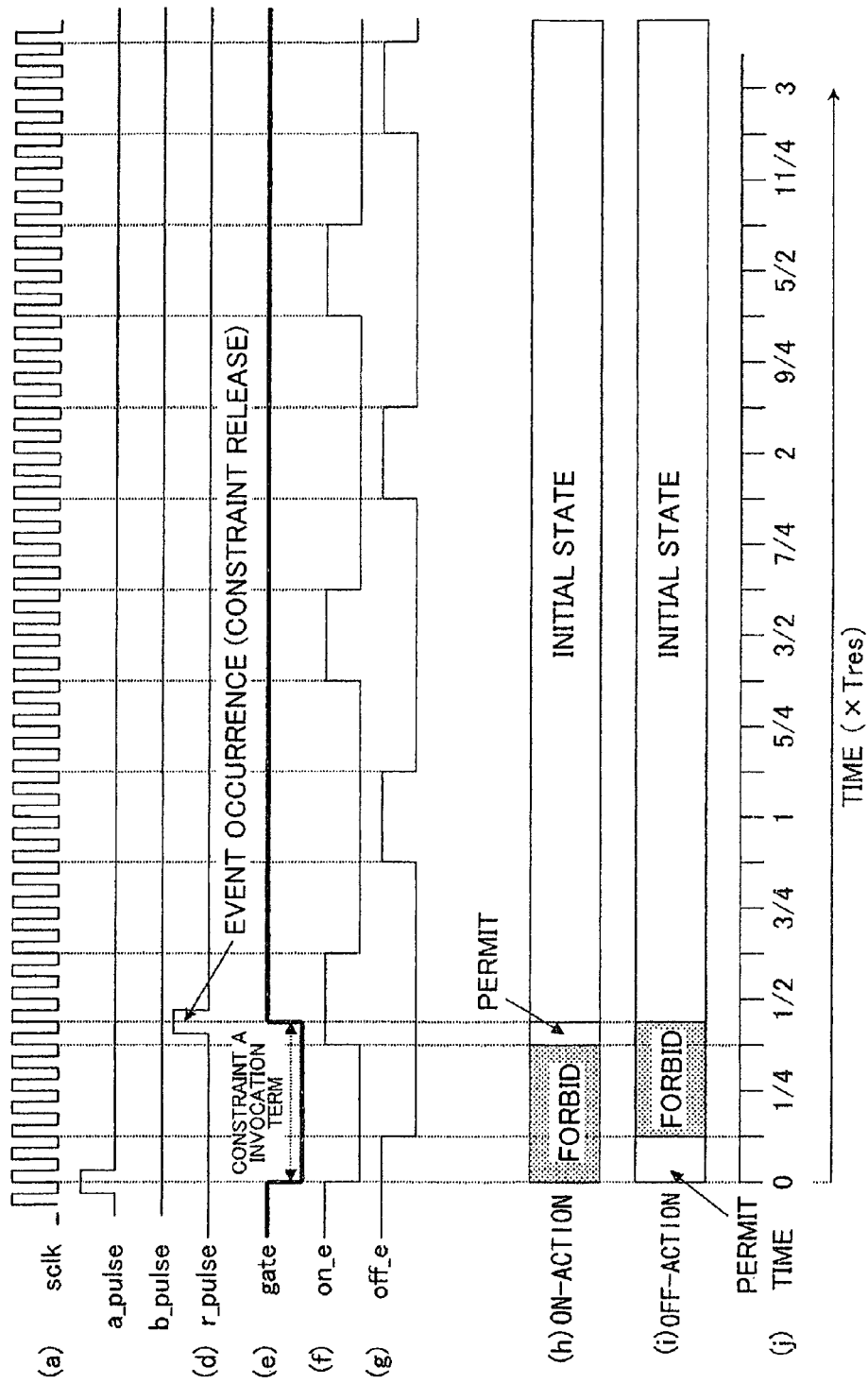
FIG. 13 is a diagram illustrating a case of transiting to an initial state by an event occurrence during the constraint A invocation term according to the first embodiment.

FIG. 13 is a diagram illustrating signal states for a case in that it becomes the initial state by the event occurrence during the constraint A invocation term. The system clock sclk is illustrated from a state immediately before the constraint A invocation term to a state after transiting to the initial state when the end of the constraint A invocation term (FIG. 13(*a*)). The constraint A invocation signal a_pulse turns OFF at one clock after the ON state indicating a start of the constraint A (FIG. 13(*b*)). The constraint B invocation signal b_pulse is in the OFF state (FIG. 13(*c*)). The constraint release signal r_pulse becomes the OFF state after the constraint A invocation, for example, at one clock after the ON state indicating the constraint release in response to an acknowledge of the ON-action request in the ON-action permission period (FIG. 13(d)).

The constraint invocation term signal gate becomes a low level immediately after the ON state of the constraint A invocation signal a_pulse, and becomes a high level in response to the ON state of the constraint release signal r_pulse (FIG. 13(e)). The ON-action permission period signal on_e alternately repeats the low level and the high level in response to the ON-action forbidden period and the ON-action permission period in the constraint A invocation term, in response to the ON state of the constraint A invocation signal a_pulse (FIG. 13(f)). The OFF-action permission period signal off_e repeats the low level and the high level corresponding to the OFF-action permission period and the OFF-action forbidden period in the constraint A invocation term, in response to the ON state of the constraint A invocation signal a_pulse (FIG. 13(g)).

Similar to FIG. 12, a time (FIG. 13(j)) is indicated by the resonance period Tres which one cycle equals to 16 cycles of the system clock sclk. By the above-described signal states, for the ON-action request, the constraint A is released and becomes the initial state during the ON-action permission period following to the ON-action forbidden period of first ⅜ resonance periods (FIG. 13(h)).

Moreover, the OFF-action request is released and becomes the initial state during the OFF-action forbidden period following to the OFF-action permission period of the first ⅛ resonance period (FIG. 13(i)).

Next, a control of the first permission period generation counter 244 during the ON-action permission period and a control of the second permission period generation counter 246 during the OFF-action permission period in the constraint B invocation term are described with reference to FIG. 14A and FIG. 14B.

Figure 14:
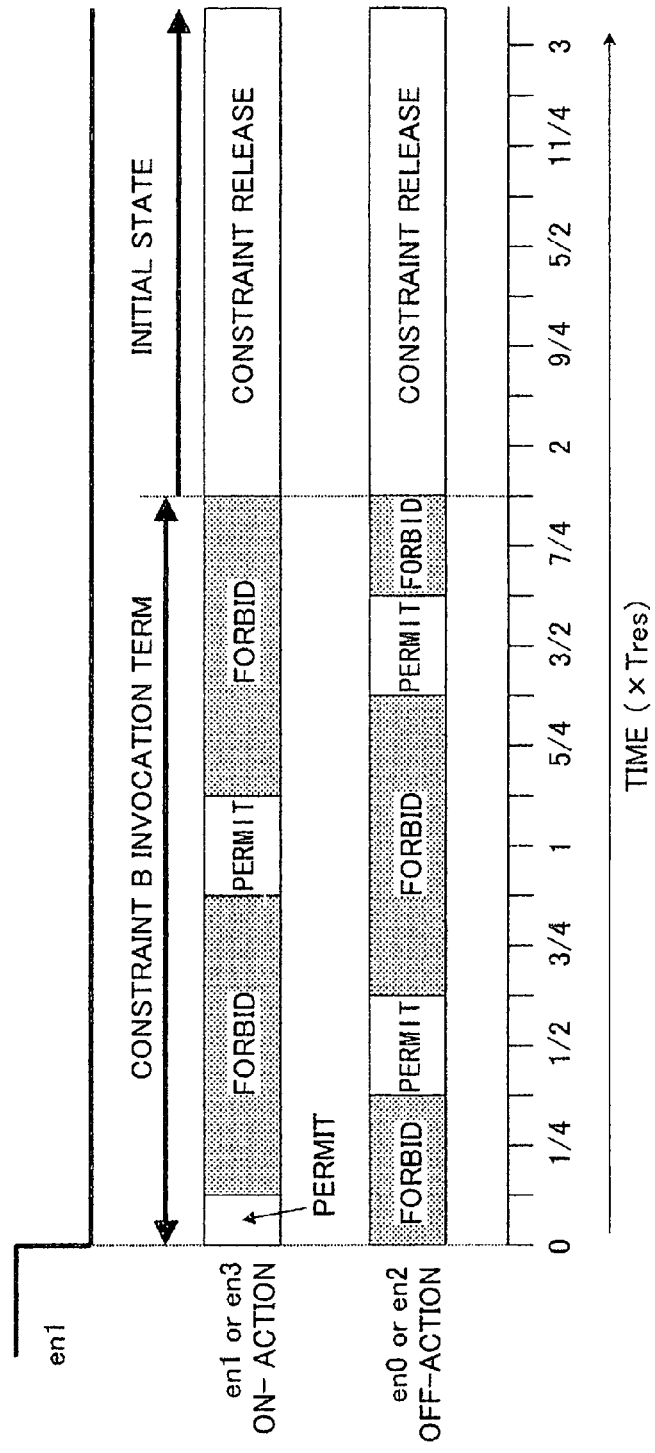
FIG. 14A is a diagram illustrating a state example of invoking a constraint A according to the first embodiment.
FIG. 14B is a diagram illustrating a control example for the ON-action requests and the OFF-action requests in a constraint B invocation term according to the first embodiment.

FIG. 14A is a diagram illustrating a state example in which the constraint B is invoked. In FIG. 14A, in a case in that the operation enable signals en0, en1, and en2 are in the ON state and the operation enable signal en3 is in the OFF state, when the operation enable signal en1 transits to the OFF state, the constraint B is invoked.

FIG. 14B is a diagram illustrating control examples for the ON-action request and the OFF-action request in the constraint B invocation term during the state illustrated in FIG. 14A. In FIG. 14B, for example, when a value "16 cycles" of the system clock sclk is set as a Tres value indicating one resonance period, the constraint B invocation term is determined as ¹⁵⁄₈ resonance periods in which the internal power voltage converges.

In FIG. 14B, first, a control for the ON-action request in the constraint B invocation term will be described.

The first ON-action permission period is set to appear simultaneously with the constraint B invocation, and following ON-action permission periods are set to appear every one cycle after the first ON-action permission period.

For the ON-action permission periods, margins are set to provide certain intervals before and after the appearance timings. For example, the margins may be ±⅛ resonance period, ±¹⁄₁₆ resonance period, or a like. This example illustrates a case in that the margins are ±⅛ resonance period.

In the state example in FIG. 14A, the ON-action request may be conducted for the operation enable signal en1 or en3. For example, in a case in that the ON-action request process part 232 of the request process part 230 receives the ON-action request detection signal indicating the ON-action request for the operation enable signal en3 and the pair determination waiting signal is released, when the high level of the ON-action permission period signal on_e is detected, the ON-action request process part 232 acknowledges the ON-action request.

The request process part 230 outputs the request acknowledge signals, and the fluctuations of internal power voltages caused by transitions to the OFF-state of the operation enable signal en1 and the ON-state of the operation enable signal en3 are mutually cancelled. Accordingly, the constraint release signal r_pulse is sent to the constraint invocation part 240. The constraint B invocation term is released, and the arbiter 200 is in the initial state.

When the ON-action request process part 232 receives the ON-action request detection signal indicating the ON-action request with respect to the operation enable signal en3 in the ON-action forbidden period, the ON-action request process part 232 holds the ON-action request until a next ON-action permission period, and outputs the request acknowledge signal when the next ON-action permission period starts. Accordingly, the constraint B invocation term is released, and the arbiter 200 is in the initial state.

Next, referring to FIG. 14B, a control for the OFF-action request in the constraint B invocation term will be described.

The first OFF-action permission period is set to appear after approximately ½ resonance period, and following OFF-action permission period is set to appear every one cycle after the first OFF-action permission period.

For the OFF-action permission periods, margins are set to provide certain intervals before and after the appearance timings. For example, the margins may be ±⅛ resonance period, ±¹⁄₁₆ resonance period, or a like. This example illustrates a case in that the margins are ±⅛ resonance period.

In the state example in FIG. 14A, the OFF-action request may be conducted for the operation enable signal en0 or en2. For example, in a case in that the OFF-action request process part 234 of the request process part 230 receives the OFF-action request detection signal indicating the OFF-action request for the operation enable signal en2 and the pair determination waiting signal is released, when the high level of the OFF-action permission period signal off_e is detected, the OFF-action request process part 234 acknowledges the OFF-action request.

The request process part 230 outputs the request acknowledge signals, and the fluctuations of internal power voltages caused by transitions to the OFF-state of the operation enable signal en1 and the OFF-state of the operation enable signal en2 are mutually cancelled. Accordingly, the constraint release signal r_pulse is sent to the constraint invocation part 240. The constraint B invocation term is released, and the arbiter 200 is in the initial state.

When the OFF-action request process part 234 receives the OFF-action request detection signal indicating the OFF-action request with respect to the operation enable signal en2 in the OFF-action forbidden period, the OFF-action request process part 234 holds the OFF-action request until a next OFF-action permission period, and outputs the request acknowledge signal when the next OFF-action permission period starts. Accordingly, the constraint B invocation term is released, and the arbiter 200 is in the initial state.

Moreover, in a case in that the ON-action request and the OFF-action request being paired occur in the constraint B invocation term, even if it is not the ON-action permission period and the OFF-action permission period, the ON-action request and the OFF-action request being paired are simultaneously acknowledged and the constraint B invocation term as illustrated in FIG. 14B is retained.

Figure 15:
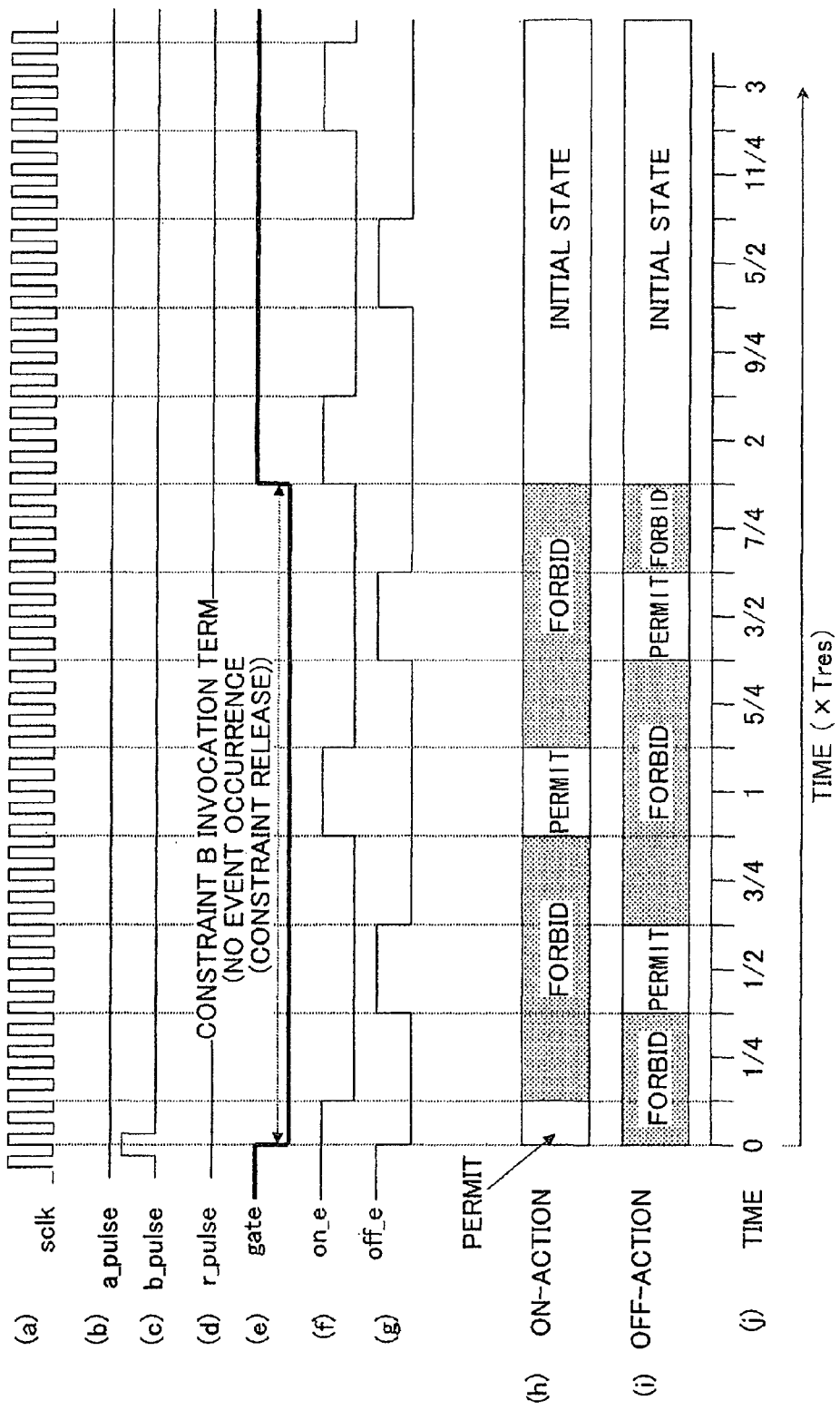
FIG. 15 is a diagram illustrating a case of terminating the constraint B invocation term since there is no event occurrence according to the first embodiment.

FIG. 15 is a diagram illustrating a timing chart for a case in that there is no event occurrence and the constraint B invocation term is terminated. The system clock sclk is illustrated from a state immediately before the constraint B invocation term to a state after transiting to the initial state when the end of the constraint B invocation term (FIG. 15(a)). The constraint A invocation signal a_pulse is the OFF state (FIG. 15(b)). The constraint B invocation signal b_pulse turns OFF at one clock after the ON state indicating a start of the constraint B (FIG. 15(c)). The constraint release signal r_pulse is the OFF state (FIG. 15(d)).

The constraint invocation term signal gate becomes a low level immediately after the ON state of the constraint B invocation signal b_pulse, and retains the low level during the constraint B invocation term (FIG. 15(e)). If there is not event occurrence (constraint release), the constraint invocation term signal gate becomes a high level at the end of the constraint B invocation period.

The ON-action permission period signal on_e alternately repeats the low level and the high level in response to the ON-action forbidden period and the ON-action permission period in the constraint B invocation term, in response to the ON state of the constraint B invocation signal b_pulse (FIG. 15(f)).

The OFF-action permission period signal off_e repeats the low level and the high level corresponding to the OFF-action permission period and the OFF-action forbidden period in the constraint B invocation term, in response to the ON state of the constraint B invocation signal b_pulse (FIG. 15(g)).

A time is indicated by the resonance period Tres which one cycle equals to 16 cycles of the system sclk (FIG. 15(j)). With respect to the ON-action request, a first ⅛ resonance period is defined as the ON-action permission period, ⅛ resonance period to ⅞ resonance periods are defined as the ON-action forbidden period, ⅞ resonance periods to 9/8 resonance periods are defined as the ON-action permission period, and it becomes the initial state after 19/8 resonance periods. Excluding the first ON-action permission period, a pair of the ON-action permission period and the OFF-action permission period becomes one cycle (FIG. 15(i)). This control is conducted by the first permission period generation counter 244 (FIG. 10).

With respect to the OFF-action request, a first ⅜ resonance period is defined as the OFF-action forbidden period, ⅜ resonance period to ⅝ resonance periods are defined as the OFF-action permission period, ⅝ resonance periods to 11/8 resonance periods are defined as the OFF-action forbidden period, . . . , and it becomes the initial state after 15/8 resonance periods (FIG. 15(h)). Excluding the first OFF-action permission period and the last OFF-action permission period, a pair of the OFF-action permission period and the OFF-action forbidden period becomes one cycle. This control is conducted by the second permission period generation counter 246 (FIG. 10).

In a case in that the arbiter 200 becomes the initial state due to the event occurrence during the constraint B invocation term, a control is the same as the control in a case in that the event occurs during the constraint A invocation term. Thus, the explanation thereof will be omitted.

In the following, internal power voltage waveforms by the control of the arbiter 200 will be described with reference to FIG. 16 through FIG. 20.

FIG. 16 is a diagram for explaining the internal power voltage waveforms in simultaneous operations concerning a pair of the ON-action request and the OFF-action request. In FIG. 16, the internal power voltage waveforms, in which the arbiter 200 determines that the ON-action request for the operation enable signal en0 and the OFF-action request for the operation enable signal en1 are paired, will be described.

By synchronizing with the system clock sclk (FIG. 16(a)), the operation enable signal en0 transits from the OFF state to the ON state and the operation enable signal en1 simultaneously transits from the ON state to the OFF state (FIG. 16(b)).

An internal voltage fluctuation 16a caused by the ON-action of the operation enable signal en0 and an internal voltage fluctuation 16b caused by the OFF-action of the operation enable signal en1 are mutually cancelled, and the internal voltage fluctuations 16a and 16b are converged, respectively (FIG. 16(c)).

A composed internal voltage fluctuation 16c is formed by the internal voltage fluctuation 16a caused by the ON-action of the operation enable signal en0 and the OFF-action of the operation enable signal en1. When the internal voltage fluctuations 16a and 16b are converged, the composed internal voltage fluctuation 16c retains a constant voltage in a term 66a (FIG. 16(d)).

In the pair determination, since the ON-action and the OFF-action being a pair are simultaneously acknowledged in the initial state, a state transition of the arbiter 200 retains the initial state.

As described above, even if states of the operation enable signals en0 and en1 are transited, almost internal voltage fluctuation affecting the LSI 100 is not appeared.

Figure 17:
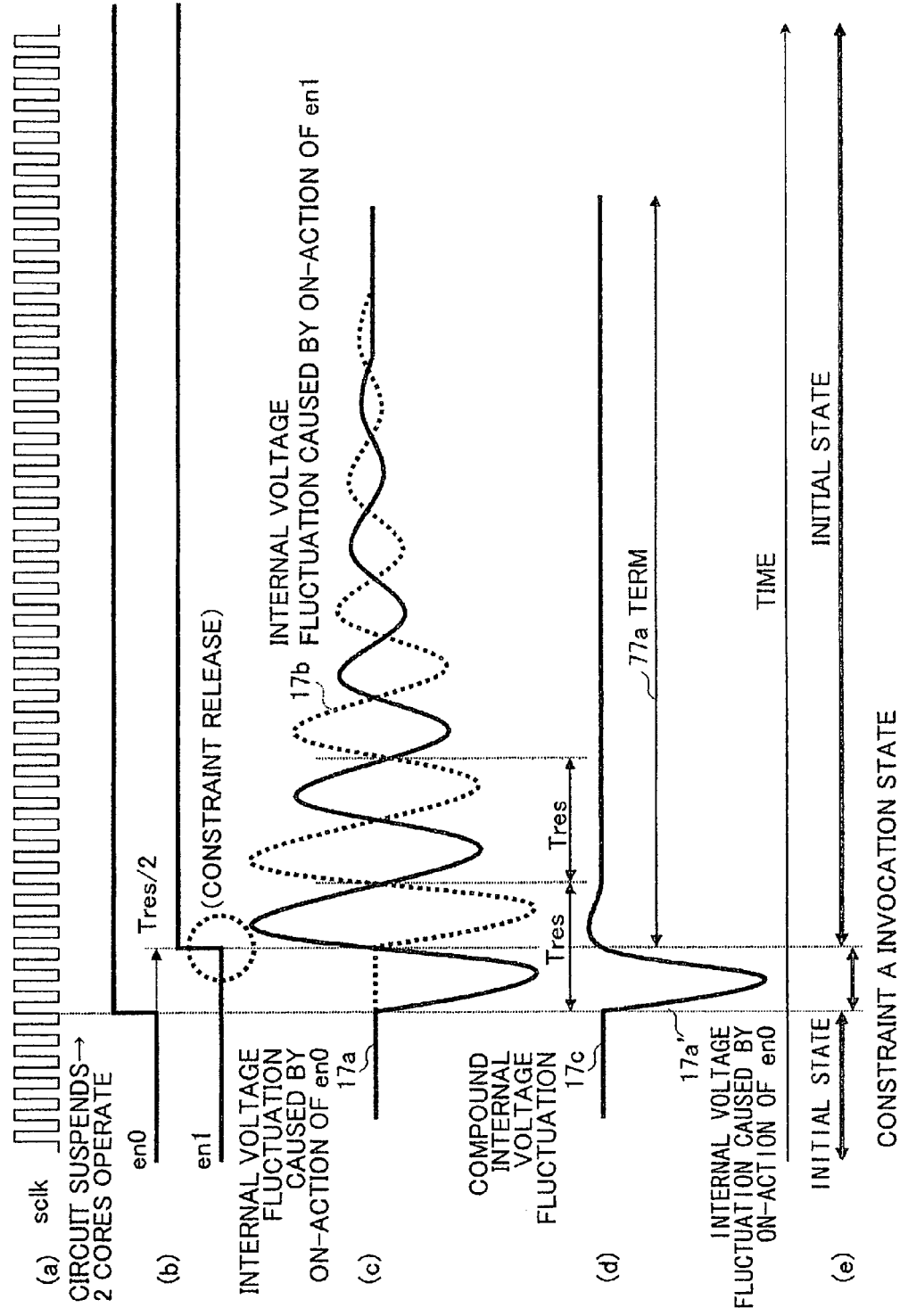
FIG. 17 is a diagram for explaining the internal power voltage waveform due to a transition from a circuit suspend state to a two core operation state according to the first embodiment.

FIG. 17 is a diagram for explaining the internal power voltage waveforms in transiting from the circuit suspend state to a two core operation state. In FIG. 17, the internal power voltage waveforms in which the arbiter 200 acknowledges the ON-action of the operation enable signal en1 in the ON-action permission period will be described in a case in that the ON-action requests are simultaneously conducted to the operation enable signals en0 and en1, or in a case in that the ON-action request is conducted to the operation enable signal en1 during the constraint A invocation term invoked by the ON-action of the operation enable signal en0.

By synchronizing with the system clock sclk (FIG. 17(a)), when two cores in the circuit suspend state are transited to the operation state, after the operation enable signal en0 turns ON and the arbiter 200 becomes the constraint A invocation state, the operation enable signal en1 is tuned ON during the ON-action permission term following to an approximately ½ resonance period Tres (FIG. 17(b)). In the arbiter 200, the constraint A invocation is released in response to the ON-action of the operation enable signal en1.

After an approximately ½ resonance period Tres from an occurrence of an internal voltage fluctuation 17a caused by the ON-action of the operation enable signal en0, an internal voltage fluctuation 17b occurs due to the ON-action of the operation enable signal en1. After that, the internal voltage fluctuation 17a and the internal voltage fluctuation 17b are mutually cancelled, and are converged (FIG. 17(c)).

As a result, a compound internal voltage fluctuation 17c is formed by the internal voltage fluctuation 17a caused by the ON-action of the operation enable signal en0 and the internal voltage fluctuation 17b caused by the ON-action of the operation enable signal en1 (FIG. 17(d)). In the compound internal voltage fluctuation 17c, an internal voltage fluctuation 17a' caused by the ON-action of the operation enable signal en0 appears in the ½ resonance period Tres immediately after the ON-action of the operation enable signal en0. The internal voltage fluctuation 17a, is a part of the internal voltage fluctuation 17a. However, after the appearance of the internal voltage fluctuation 17a', the internal voltage fluctuation 17a rapidly converges and a constant voltage is retained in a term 77a.

The term 77a is a term in which the internal voltage fluctuations 17a and 17b are approximately cancelled by mutual interferences of the ON-action of the operation enable signal en0 and the ON-action of the operation enable signal en1, and appears after the ON-action of the operation enable signal en1 subsequent to the ½ resonance period Tres response to the ON-action of the operation enable signal en0.

In this case, the arbiter 200 becomes the constraint A invocation state due to the ON-action of the operation enable signal en0 from the initial state, and returns to the initial state due to the ON-action of the operation enable signal en1 after the ½ resonance period Tres (FIG. 17(e)).

As described above, even if there are state transitions for two operation enable signals en0 and en1, the compound internal voltage fluctuation 17c applied to the LSI 100 simply appears as an internal voltage fluctuation 17a' caused by the ON-action of the operation enable en0 (a part of the internal voltage fluctuation 17a) and appears only during the approximately ½ resonance period Tres.

Figure 18:
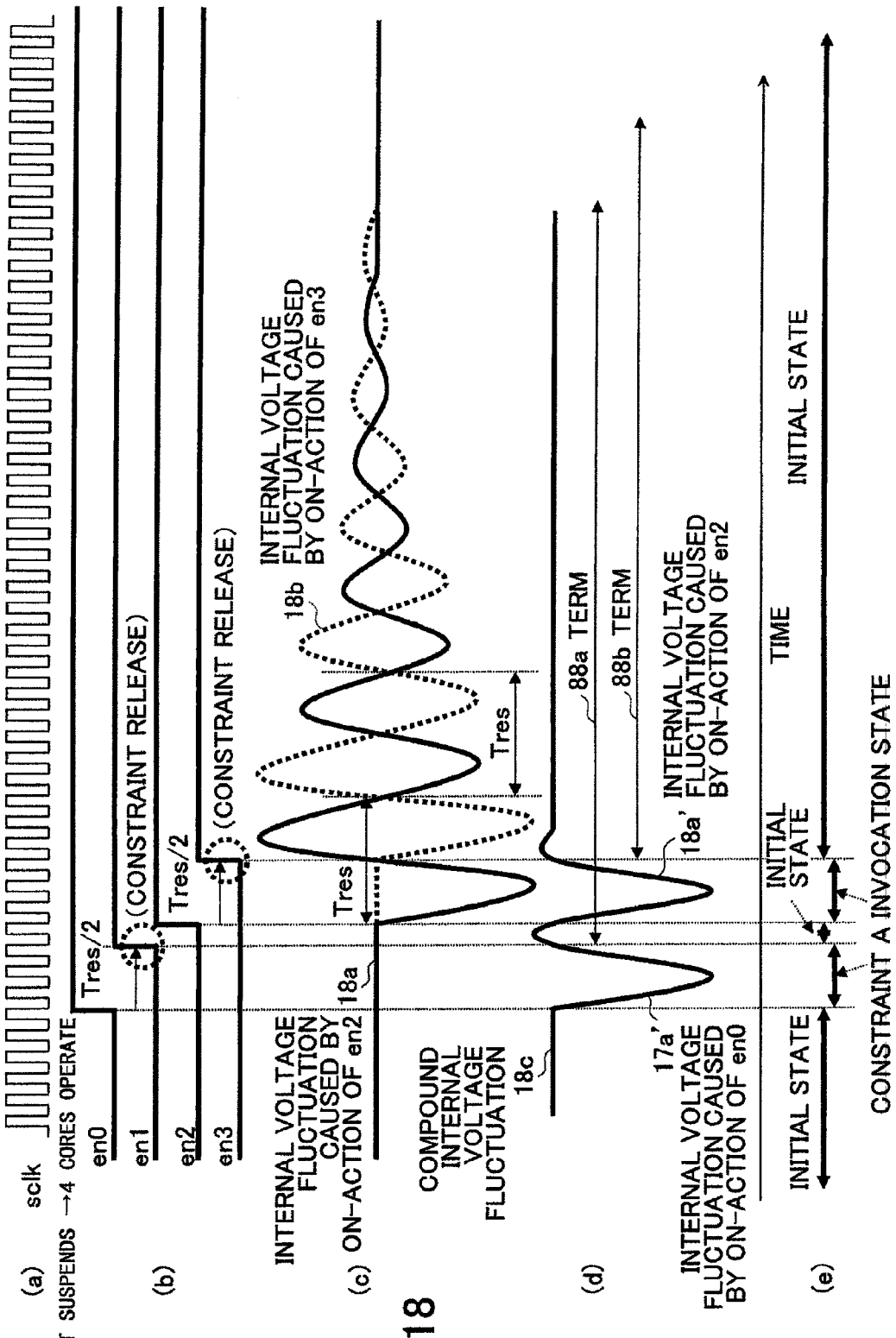
FIG. 18 is a diagram for explaining the internal power voltage waveform due to a transition from a circuit suspend state to a four core operation state according to the first embodiment.

FIG. 18 is a diagram for explaining the internal power voltage waveforms in transiting from the circuit suspend state to a four core operation state. In FIG. 18, the internal power voltage waveforms, in which for example, the arbiter 200 acknowledges the ON-actions in a sequence of the operation enable signals en0, en1, en2, and en3, will be described in a case in that the ON-action requests are simultaneously conducted to the operation enable signals en0 through en3, or in a case in that the ON-action requests are conducted to the operation enable signals en1 through en3 during the constraint A invocation term invoked by the ON-action of the operation enable signal en0.

By synchronizing with the system clock sclk (FIG. 18(a)), when four cores in the circuit suspend state are transited to the circuit operation state, after the operation enable signal en0 turns ON and the arbiter 200 becomes the constraint A invocation state, the operation enable signal en1 is tuned ON during the ON-action permission period following to an approximately ½ resonance period Tres. When the constraint A is released by the ON-action of the operation enable signal en1 and the arbiter 200 becomes the initial state, the arbiter 200 invokes the constraint A by the ON-action of the operation enable signal en2, and turns ON the operation enable signal en3 during the ON-action permission period following to the approximately ½ resonance period Tres (FIG. 18(b)). The arbiter 200 releases the constraint A invocation by the ON-action of the operation enable signal en3, again.

As illustrated in FIG. 17, the interferences internally occur due to the internal voltage fluctuation 17a caused by the ON-action of the enable signal en0 and the internal voltage fluctuation 17b caused by the ON-action of the operation enable signal en1. Moreover, as illustrated in FIG. 18, after an approximately ½ resonance period Tres from an occurrence of the internal voltage fluctuation 18a caused by the ON-action of the operation enable signal en2, the internal voltage fluctuation 18b occurs due to the ON-action of the operation enable signal en3. After that, the internal voltage fluctuation 18a and the internal voltage fluctuation 18b are mutually cancelled, and are converged (FIG. 18(c)).

As a result, a compound internal voltage fluctuation 18c is formed by the internal voltage fluctuation 17a caused by the ON-action of the operation enable signal en0, the internal voltage fluctuation 17b caused by the ON-action of the operation enable signal en1, the internal voltage fluctuation 18a caused by the ON-action of the operation enable signal en2, and the internal voltage fluctuation 18b caused by the ON-action of the operation enable signal en3 (FIG. 18(d)).

In the compound internal voltage fluctuation 18c, an internal voltage fluctuation 17a' (a part of the internal voltage fluctuation 17a) appears due to the ON-action of the operation enable signal en0 during the approximately ½ resonance period Tres immediately after the ON-action of the operation enable signal en0. Subsequently, an internal voltage fluctuation 18a' (a part of the internal voltage fluctuation 18a) appears due to the ON-action of the operation enable signal en2 during the approximately ½ resonance period Tres immediately after the ON-action of the operation enable signal en2.

After the internal voltage fluctuation 18a', the compound internal voltage fluctuation 18c rapidly converges and retains a constant voltage. Even if the compound internal voltage fluctuation 18c greatly fluctuates twice, these two internal voltage fluctuations 17a' and 18a' do not mutually amplify.

In a term 88a, the internal voltage fluctuations 17a and 17b are approximately cancelled by the ON-action of the operation enable signal en0 and the ON-action of the operation enable signal en1. The term 88a starts in response to the ON-action of the operation enable signal en1 after the approximately ½ resonance period Tres from the ON-action of the operation enable signal en0

In addition, in a term 88b, the internal voltage fluctuations 18a and 18b are approximately cancelled by the ON-action of the operation enable signal en2 and the ON-action of the operation enable signal en3. The term 88b starts in response to the ON-action of the operation enable signal en3 after the approximately ½ resonance period Tres from the ON-action of the operation enable signal en2.

In this case, the arbiter 200 becomes the constraint A invocation state due to the ON-action of the operation enable signal en0 from the initial state, and returns to the initial state due to the ON-action of the operation enable signal en1 after the approximately ½ resonance period Tres. Again, the arbiter 200 becomes the constraint A invocation state due to the ON-action of the operation enable signal en2, and returns to the initial state due to the ON-action of the operation enable signal en3 after the ½ resonance period Tres (FIG. 18(e)).

As described above, even if there are state transitions for four operation enable signals en0 through en3, the compound internal voltage fluctuation 18c applied to the LSI 100 simply appears as the internal voltage fluctuation 17a' (a part of the internal voltage fluctuation 17a) caused by the ON-action of the operation enable signal en0 and the internal voltage fluctuation 18a' (a part of the internal voltage fluctuation 18a) caused by the ON-action of the operation enable signal en2, and appears only during the approximately ½ resonance period Tres for each of the fluctuations 17a' and 18a'.

Figure 19:
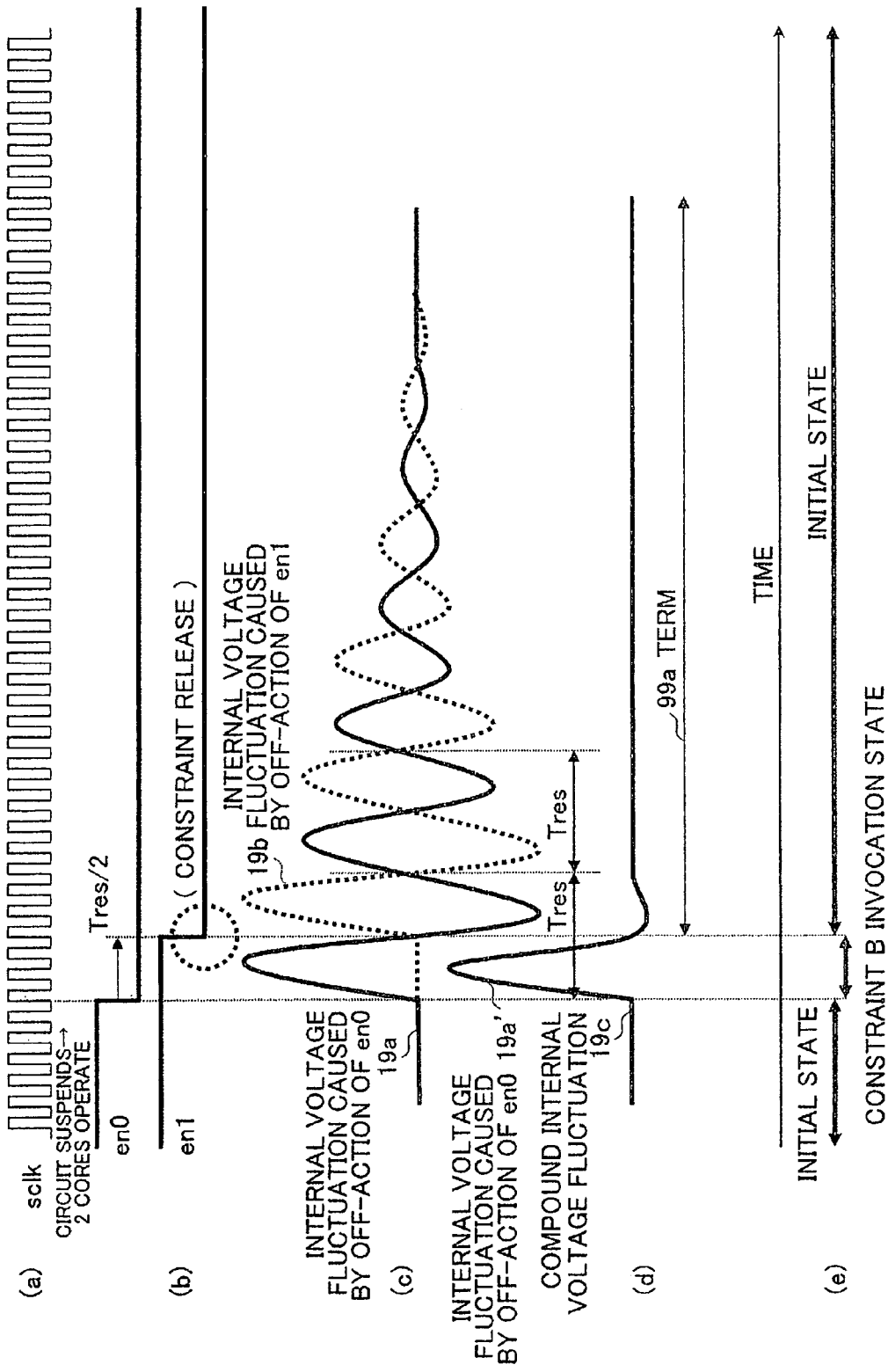
FIG. 19 is a diagram for explaining the internal power voltage waveform due to a transition from a circuit operation state to a two core suspend state according to the first embodiment.

FIG. 19 is a diagram for explaining the internal power voltage waveforms in transiting from the circuit operation state to two core suspend state. In FIG. 19, the internal power voltage waveforms in which the arbiter 200 acknowledges the OFF-action of the operation enable signal en1 during the OFF-action permission period will be described in a case in that the OFF-action requests are simultaneously conducted to the operation enable signals en0 and en1, or in a case in that the OFF-action request is conducted to the operation enable signal en1 during the constraint B invocation term invoked by the OFF-action of the operation enable signal en0.

By synchronizing with the system clock sclk (FIG. 19(a)), in a case in that two cores in the circuit suspend state transit to the circuit operation state, after the arbiter 200 becomes the constraint B invocation state by the OFF-action of the operation enable signal en0, the OFF-action is conducted to the operation enable signal en1 during the OFF-action permission period after the approximately resonance period Tres (FIG. 19(b)). The arbiter 200 release the constraint B invocation state by the OFF-action of the operation enable signal en1.

After the approximately ½ resonance period Tres from an occurrence of the internal voltage fluctuation 19a caused by the OFF-action of the operation enable signal en0, an internal voltage fluctuation 19b occurs by the OFF-action of the operation enable signal en1. After that, the internal voltage fluctuation 19a and the internal voltage fluctuation 19b are mutually cancelled, and are converged (FIG. 19(c)).

A compound internal voltage fluctuation 19c is formed by the internal voltage fluctuation 19a caused by the OFF-action of the operation enable signal en0 and the OFF-action of the operation enable signal en1. In the compound internal voltage fluctuation 19c, an internal voltage fluctuation 19a' (a part of the internal voltage fluctuation 19a) appears by the OFF-action of the operation enable signal en0 during the approximately ½ resonance period Tres immediately after the OFF-action of the operation enable signal en0. However, after that, the compound internal voltage fluctuation 19c rapidly converges and retains a constant voltage.

In a term 99a, the internal voltage fluctuations 19a and 19b are approximately cancelled by the OFF-action of the operation enable signal en0 and the OFF-action of the operation enable signal en1. The term 99a starts in response to the OFF-action of the operation enable signal en1 after the approximately ½ resonance period Tres from the OFF-action of the operation enable signal en0.

In this case, the arbiter 200 becomes the constraint B invocation state due to the OFF-action of the operation enable signal en1 from the initial state, and returns to the initial state due to the OFF-action of the operation enable signal en1 after the approximately ½ resonance period Tres (FIG. 19(e)).

As described above, even if there are state transitions for two operation enable signals en0 and en1, the compound internal voltage fluctuation 19c applied to the LSI 100 simply appears as the internal voltage fluctuation 19a' (a part of the internal voltage fluctuation 19a) caused by the ON-action of the operation enable signal en0, and appears only during the approximately ½ resonance period Tres.

Figure 20:
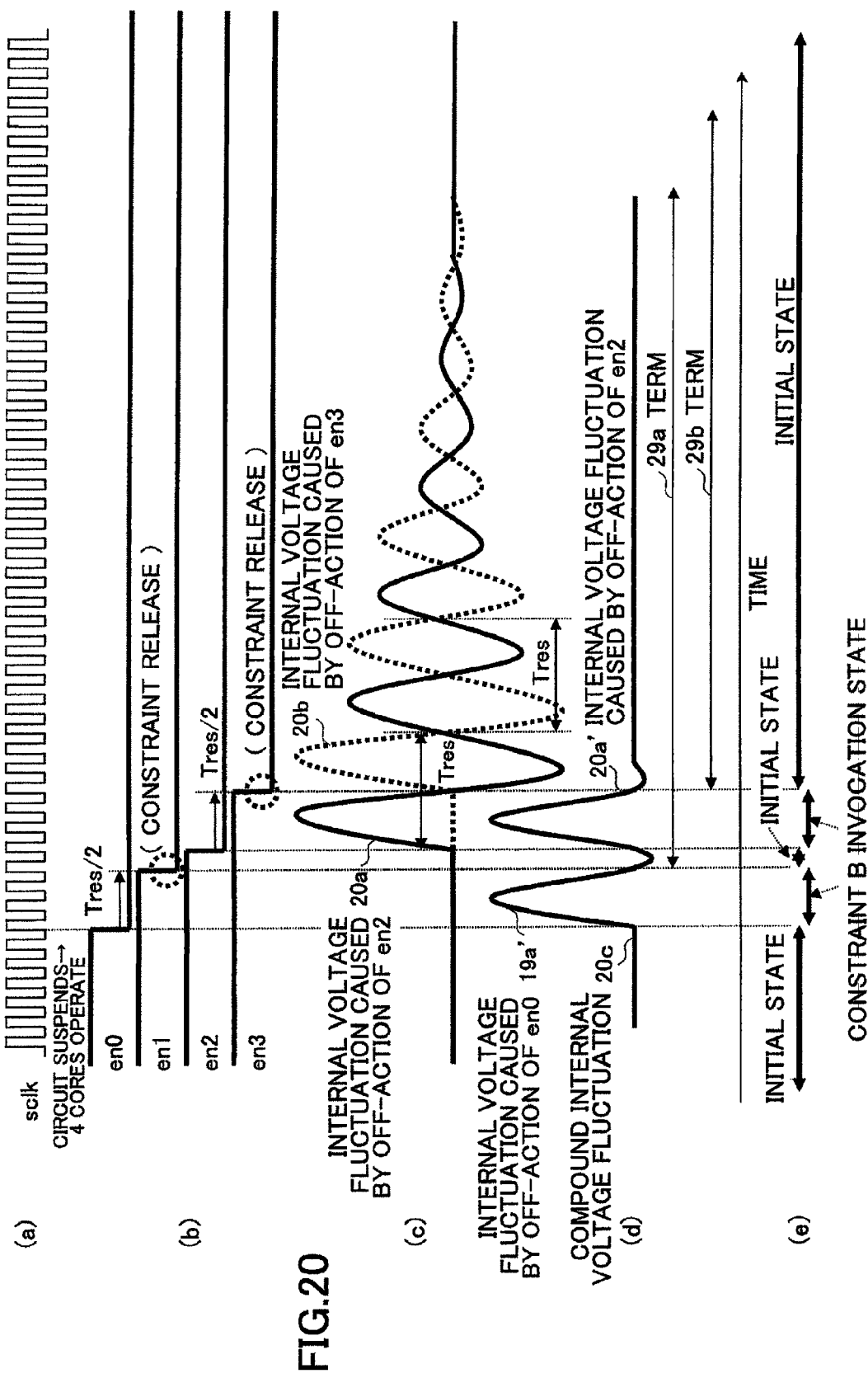
FIG. 20 is a diagram for explaining the internal power voltage waveform due to a transition from a circuit operation state to a four core suspend state according to the first embodiment.

FIG. 20 is a diagram for explaining the internal power voltage waveforms in transiting from the circuit suspend state to another four core operation state. In FIG. 20, the internal power voltage waveforms, in which for example, the arbiter 200 acknowledges the OFF-actions in a sequence of the operation enable signals en0, en1, en2, and en3, will be described in a case in that the OFF-action requests are simultaneously conducted to the operation enable signals en0 through en3, or in a case in that the OFF-action requests are conducted to the operation enable signals en1 through en3 during the constraint B invocation term invoked by the OFF-action of the operation enable signal en0.

By synchronizing with the system clock sclk (FIG. 20(a)), when four cores in the circuit suspend state are transited to the circuit operation state, after the operation enable signal en0 turns OFF and the arbiter 200 becomes the constraint B invocation state, the operation enable signal en1 is tuned OFF during the OFF-action permission period following to an approximately ½ resonance period Tres. When the constraint B is released by the OFF-action of the operation enable signal en1 and the arbiter 200 becomes the initial state, the arbiter 200 invokes the constraint B by the OFF-action of the operation enable signal en2, and turns OFF the operation enable signal en3 during the OFF-action permission period following to the approximately ½ resonance period Tres (FIG. 20(b)). The arbiter 200 releases the constraint B invocation by the OFF-action of the operation enable signal en3, again.

As illustrated in FIG. 19, the interferences internally occur due to the internal voltage fluctuation 19a caused by the OFF-action of the enable signal en0 and the internal voltage fluctuation 19b caused by the OFF-action of the operation enable signal en1. Moreover, as illustrated in FIG. 20, after an approximately ½ resonance period Tres from an occurrence of the internal voltage fluctuation 20a caused by the OFF-action of the operation enable signal en2, the internal voltage fluctuation 20b occurs due to the OFF-action of the operation enable signal en3. After that, the internal voltage fluctuation 20a and the internal voltage fluctuation 20b are mutually cancelled, and are converged (FIG. 20(c)).

As a result, a compound internal voltage fluctuation 20c is formed by the internal voltage fluctuation 19a caused by the OFF-action of the operation enable signal en0, the internal voltage fluctuation 19b caused by the OFF-action of the operation enable signal en1, the internal voltage fluctuation 20a caused by the OFF-action of the operation enable signal en2, and the internal voltage fluctuation 20b caused by the OFF-action of the operation enable signal en3 (FIG. 20(d)).

In the compound internal voltage fluctuation 20c, an internal voltage fluctuation 19a' (a part of the internal voltage fluctuation 19a) appears due to the OFF-action of the operation enable signal en0 during the approximately ½ resonance period Tres immediately after the OFF-action of the operation enable signal en0. Subsequently, an internal voltage fluctuation 20a' (a part of the internal voltage fluctuation 20a) appears due to the OFF-action of the operation enable signal en2 during the approximately ½ resonance period Tres immediately after the OFF-action of the operation enable signal en2.

After the internal voltage fluctuation 20a', the compound internal voltage fluctuation 20c rapidly converges and retains a constant voltage. Even if the compound internal voltage fluctuation 20c greatly fluctuates twice, these two internal voltage fluctuations 19a' and 20a' do not mutually amplify.

In a term 29a, the internal voltage fluctuations 19a and 19b are approximately cancelled by the OFF-action of the operation enable signal en0 and the OFF-action of the operation enable signal en1. The term 29a starts in response to the OFF-action of the operation enable signal en1 after the approximately ½ resonance period Tres from the OFF-action of the operation enable signal en0.

In addition, in a term 29b, the internal voltage fluctuations 20a and 20b are approximately cancelled by the OFF-action of the operation enable signal en2 and the OFF-action of the operation enable signal en3. The term 29b starts in response to the OFF-action of the operation enable signal en3 after the approximately ½ resonance period Tres from the OFF-action of the operation enable signal en2.

In this case, the arbiter 200 becomes the constraint B invocation state due to the OFF-action of the operation enable signal en0 from the initial state, and returns to the initial state due to the OFF-action of the operation enable signal en1 after the approximately ½ resonance period Tres. Again, the arbiter 200 becomes the constraint B invocation state due to the OFF-action of the operation enable signal en2, and returns to the initial state due to the OFF-action of the operation enable signal en3 after the ½ resonance period Tres (FIG. 20(e)).

As described above, even if there are state transitions for four operation enable signals en0 through en3, the compound internal voltage fluctuation 20c applied to the LSI 100 simply appears as the internal voltage fluctuation 19a' (a part of the internal voltage fluctuation 19a) caused by the OFF-action of the operation enable signal en0 and the internal voltage fluctuation 20a' (a part of the internal voltage fluctuation 20a) caused by the OFF-action of the operation enable signal en2, and appears only during the approximately ½ resonance period Tres for each of fluctuations 19a' and 20a.

As described above, even if the ON-actions and the OFF-actions are successively requested, the internal voltage fluctuations 18c and 20c do not exceed over a voltage fluctuation amount caused by the state transitions of a single operation enable signal.

Accordingly, in a case of the LSI 100 in which four cores (that is, the core_0 10 through the core_3 13) are arranged as illustrated in FIG. 5, compared with a conventional LSI, the voltage fluctuation amount is suppressed to approximately one fourth. Since the voltage fluctuation amount is suppressed as described above, it may be possible to prevent a performance of the LSI 100 from being deteriorated.

Also, the first embodiment is not limited to the LSI 100 in which four cores are arranged, but may be applied to an LSI in which more than four cores are arranged.

In the following, a second embodiment will be described in a case of detecting an actual voltage fluctuation instead of externally setting the resonance period Tres and controlling the timings of the ON-action and the OFF-action.

Figure 21:
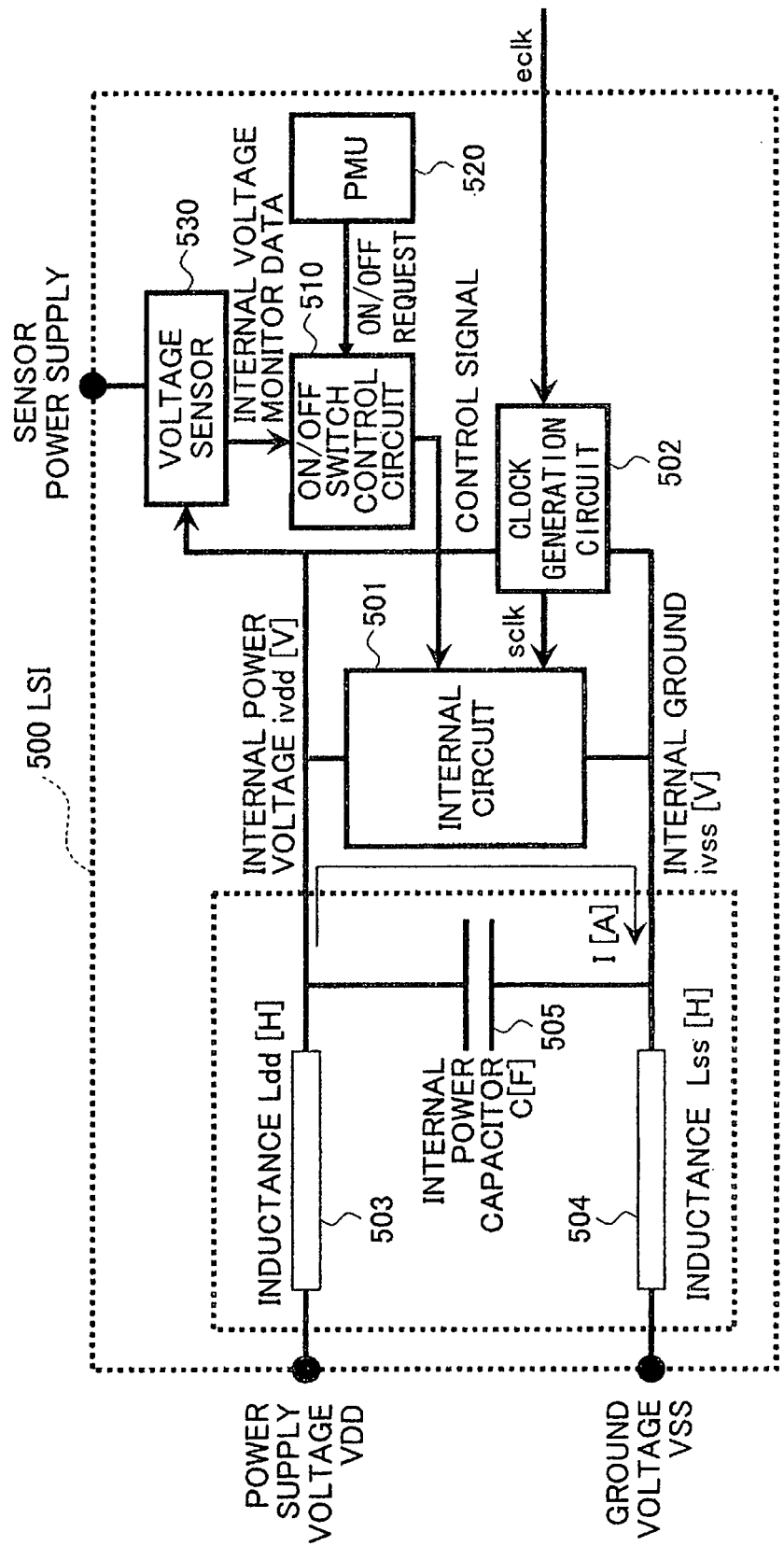
FIG. 21 is a diagram illustrating the entire circuit configuration of an LSI according to a second embodiment.

FIG. 21 is a diagram illustrating a circuit configuration of an LSI according to the second embodiment. In FIG. 21, an LSI 500 includes an internal circuit 501 including a plurality of functional circuits, a clock generation circuit 502, an inductance 503, an inductance 504, an internal power capacitor 505, an ON/OFF switch control circuit 510, a PMU (Power Management Unit) 520, and a voltage sensor 530.

A power supply voltage VDD and a ground voltage VSS are applied to the LSI 500 through the inductances 503 and 504, and an internal power voltage ivdd(V) and an internal ground voltage ivss(V) are applied to the internal circuit 501, the clock generation circuit 502, the ON/OFF switch control circuit 510, the PMU (Power Management Unit) 520, and the voltage sensor 530. Moreover, a power current I(A) flows when the internal circuit 501 operates, and a power voltage inside the LSI 500 fluctuates. The internal power capacitor 505 suppresses the power voltage fluctuation.

In the internal circuit 501, in accordance with a control signal indicating a start (ON) or a suspend (OFF) of an operation sent from the ON/OFF switch control circuit 510 to each of the function circuits, an operation start and an operation suspend is controlled for each of the function circuits. Each of the function circuits operates by synchronizing with the system clock sclk supplied from the clock generation circuit 502. An external clock eclk is supplied to the clock generation circuit 502.

The ON/OFF switch control circuit 510 detects the resonance period Tres by using internal voltage monitor data which indicates the actual voltage fluctuation and are supplied from the voltage sensor 530, and outputs the control signal to the internal circuit 501 for each of the functional circuits by controlling a timing of an ON switch and a timing of an OFF switch in response to the ON-action request and the OFF-action request, which are sent from the PMU 520 for each of the function circuits.

The ON/OFF switch control circuit 510 conducts a basic operation illustrated in FIG. 8, similar to the arbiter 200 in the first embodiment. However, the ON/OFF switch control circuit 510 is configured to detect the voltage fluctuation by using the internal voltage monitor data and automatically switch between the initial state and the constraint invocation state. Accordingly, the steps S16, S14-6, S24, and S24-6 illustrated in FIG. 8 are omitted.

The PMU 520 is a device which manages the operation state of the internal circuit 502, and outputs the ON-action request or the OFF-action request to the ON/OFF switch control circuits 510 for each of the functional circuits.

The voltage sensor 530 measures the internal power voltage ivdd and supplies the result to the ON/OFF switch control circuit 510. By supplying the internal power voltage ivdd and a sensor power supply to the voltage sensor 530, the voltage sensor 530 supplies the internal voltage monitor data indicating a detection result of the actual voltage fluctuation of the internal power voltage ivdd to the ON/OFF switch control circuit 510.

Figure 22:
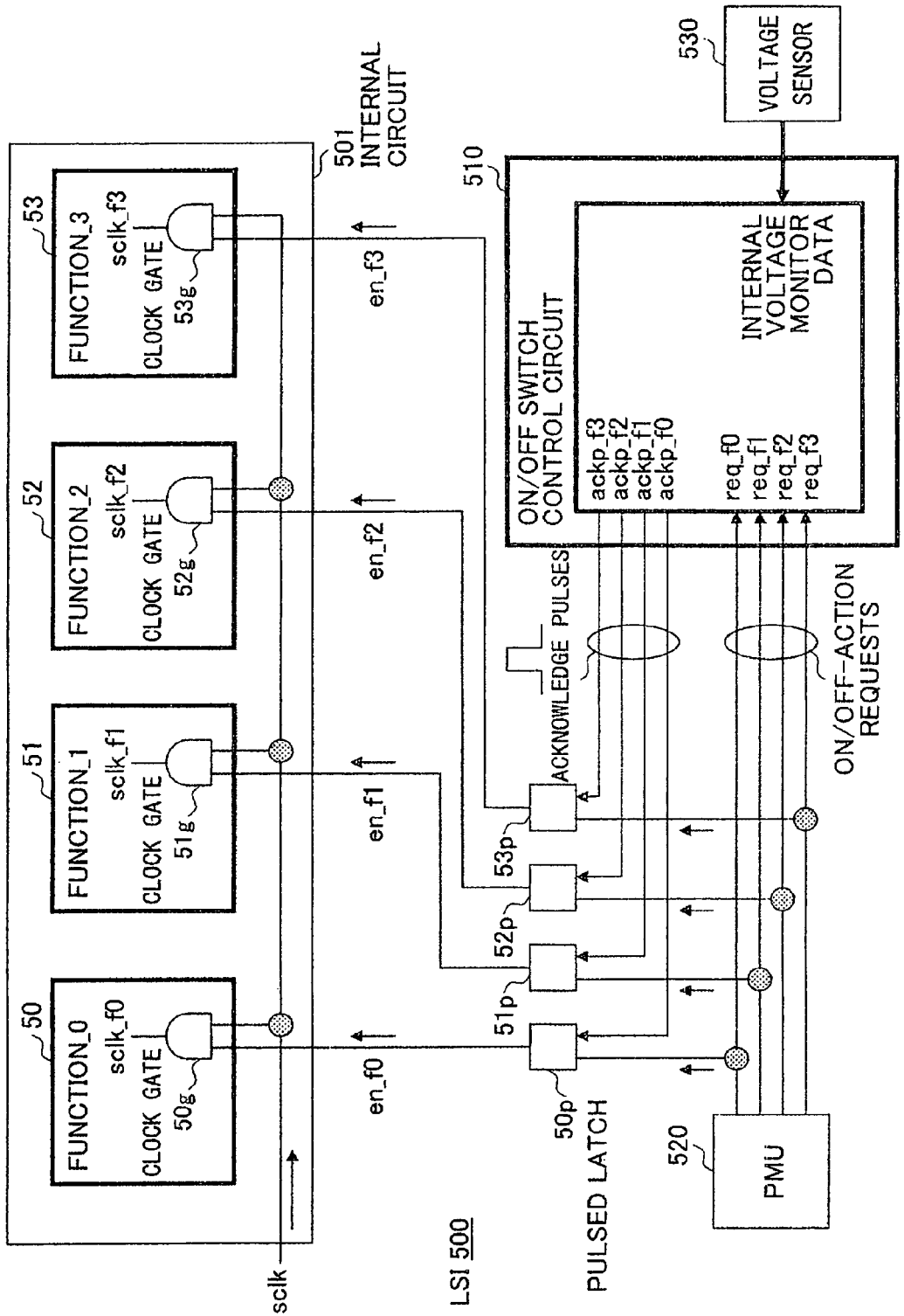
FIG. 22 is a diagram illustrating a circuit configuration for suppressing the power supply noise in the LSI according to the second embodiment.

FIG. 22 is a diagram illustrating a circuit configuration for suppressing a power supply noise inside the LSI according to the second embodiment. In FIG. 22, only the circuit configuration suppressing a power supply noise inside the LSI is illustrated, and others are omitted.

In FIG. 22, as the circuit configuration for suppressing the power supply noise, the LSI 500 includes a function block_0 50, a function block_1 51, a function block_2 52, a function block_3 53, pulsed latches 50p, 51p, 52p, and 53p, the ON/OFF switch control circuit 510, and the PMU 520. In FIG. 22, four processors are arranged as the function block_0 50, the function block_1 51, the function block_2 52, and the function block_3 53 in the internal circuit 501. The second embodiment is not limited to this configuration, and may be applied to an LSI in which more than four processors are arranged as a multi-core processor by implementing the following configuration.

Similar to the core_0 10 in the first embodiment, the function block_0 50 includes a clock gate 50g which inputs the system clock sclk and the operation enable signal en_f0 and internally outputs a system clock sclk_f0 in the function block_0. With respective to the function block_1 51, the function block_2 52, and the function block_3 53, the above explanation is similarly made for operation enable signals en_f1, en_f2, and en_f3, system clocks sclk_f1, sclk_f2, and sclk_f3, and a clock gate 51g, a clock gate 52g, and a clock gate 53g.

In the second embodiment, instead of the second controller 120 in the first embodiment, PMU 520 conducts the ON-action request for starting an operation or the OFF-action request for suspending the operation for each of the function block_0 50, the function block_1 51, the function block_2 52, and the function block_3 53, with respect to the ON/OFF switch control circuit 510. The ON-action request or the OFF-action request is also supplied to each of the pulsed latches 50p, 51p, 52p, and 53p.

Similar to the pulsed latch 10p in the first embodiment, the pulsed latch 50p is connected to the function block_0 50. When the pulsed latch 50p receives the ON-action request or the OFF-action request from the PMU 520 and receives the acknowledge pulse ackp_f0 from the ON/OFF switch control circuit 510 with respect to the ON-action request of the OFF-action request, the pulsed latch 50p supplies the operation enable signal en_f0 to the function block_0 50. Similarly, if the pulsed latch 51p, the pulsed latch 52p, and the pulsed latch 53p receive the acknowledge pulse ackp_f1, the acknowledge pulse ackp_f2, and the acknowledge pulse ackp_f3, respectively from the ON/OFF switch control circuit 510 with respect to the ON-action request or the OFF-action request received from the PMU 520, the pulsed latch 51p, the pulsed latch 52p, and the pulsed latch 53p output the operation enable signal en_f1, the operation enable signal en_f2, and the operation enable signal en_f3 to the function block_1 51, the function block_2 52, and the function block_3 53.

The ON/OFF switch control circuit 510 is a circuit for adjusting timings of the ON-action request and the OFF-action request based on the actual voltage fluctuation. When the ON/OFF switch control circuit 510 receives a signal req_f0, a signal req_f1, a signal req_f2, and a signal req_f3 for the function block_0 50, the function block_1 51, the function block_2 52, and the function block_3 53, respectively, the ON/OFF switch control circuit 510 conducts a timing adjustment based on the actual voltage fluctuation, and outputs the acknowledge ackp_f0, the acknowledge ackp_f1, the acknowledge ackp_f2, and the acknowledge ackp_f3.

The ON-action means to make the operation enable signals en_f0 through en_f3 simultaneously or individually transit from an OFF state to an ON state. Also, the OFF-action means to make the operation enable signals en_f0 through en_f3 simultaneously or individually transit from the ON state to the OFF state.

Figure 23:
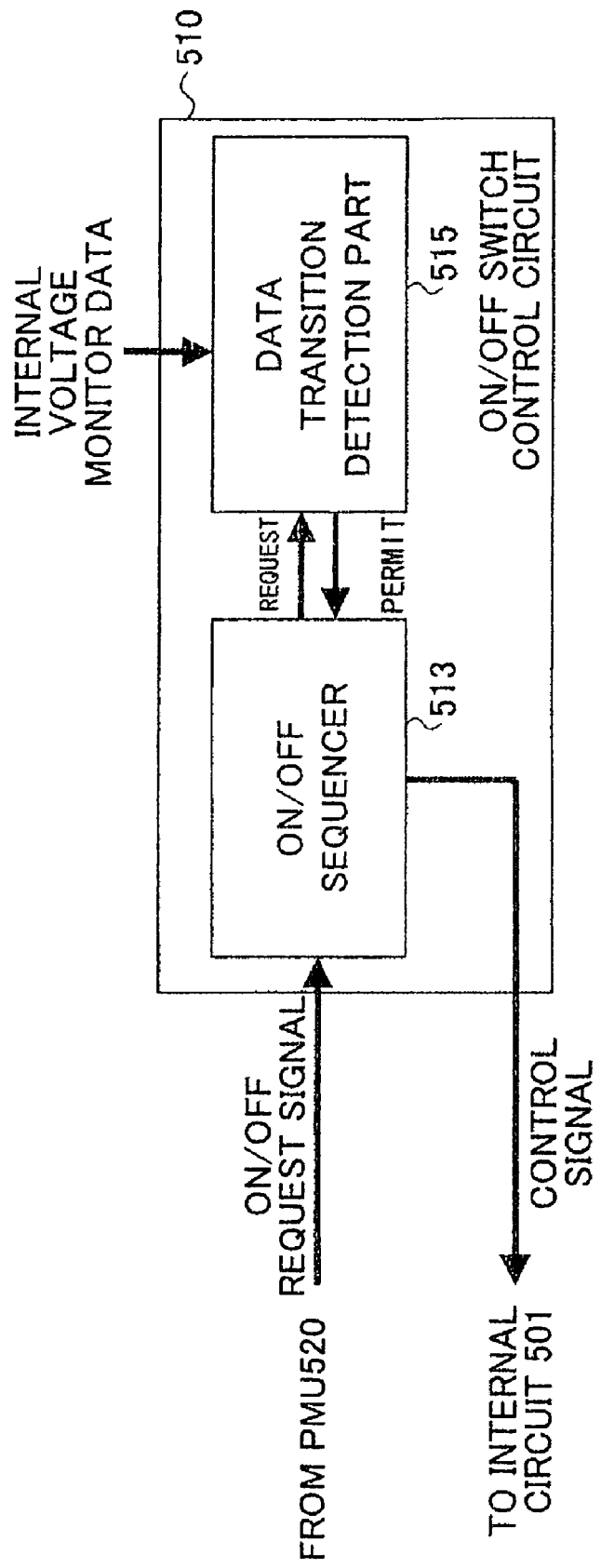
FIG. 23 is a diagram schematically illustrating a configuration of an ON/OFF switch control circuit according to the second embodiment.

FIG. 23 is a diagram schematically illustrating a configuration of the ON/OFF switch control circuit 510. In FIG. 23, the ON/OFF switch control circuit 510 includes an ON/OFF sequencer 513, and a data transition detection part 515.

When the ON/OFF sequencer 513 receives an ON/OFF request signal indicating the ON-action request or the OFF-action request from the PMU 520, the ON/OFF sequencer 513 conducts the ON-action request or the OFF-action request to the data transition detection part 515. When the ON/OFF sequencer 513 is allowed for the ON-action request or the OFF-action request by the data transition detection part 515, the ON/OFF sequencer 513 outputs a control signal to the internal circuit 501.

The data transition detection part 515 detects a waveform of a resonance frequency from the actual voltage fluctuation, adjusts the timing of the ON-action and the timing of the OFF-action so as to suppress amplifying the power supply noise, and informs the ON/OFF sequencer 513 to permit the ON-action and the OFF-action. On the other hand, the data transition detection part 515 informs the ON/OFF sequencer 513 to forbid the ON-action and the OFF-action at timing when the power supply noise is amplified.

Sequences for a number of the ON-actions and a number of the OFF-actions in the internal circuit 501, which are changed based on a number of the ON-action requests and a number of the OFF-action requests being simultaneously occurred, will be described with reference to FIG. 24. FIG. 24 is a diagram for explaining a clock enabling sequence and a clock disabling sequence based on the numbers of the ON-action requests and the OFF-action requests.

In FIG. 24, a STEP 1 is defined when all the function block_0 50 through the function block_3 53 (hereinafter, collectively called function blocks_#) in the internal circuit 501 are in the OFF state (ALL OFF-STATE), a STEP 2 is defined when one of the function blocks_# is in the ON state and other three are in the OFF state, a STEP 3 is defined when two of the function blocks_# are in the ON state and other two are in the OFF state, a STEP 4 is defined when three of the function blocks_# are in the ON state and one is in the OFF state, and a STEP 5 is defined when all the function blocks_# are in the ON state (ALL ON-STATE).

The clock enabling sequence is a sequence for increasing a number of the ON states, and the clock disabling sequence is a sequence for increasing a number of the OFF state. That is, in the STEP 2 in which one of the function blocks_# is in the ON state and other three are in the OFF state, if the OFF-action request for the one function block being in the ON state and the ON-action request for one of the three function blocks being in the OFF state are simultaneously conducted, since the number of the ON states and the number of the OFF state in the internal circuit 501 are not changed in consequence, both the clock enabling sequence and the clock disabling sequence are not conducted.

The clock enabling sequence will be briefly described. In a case of conducting the ON-action requests to transit all the function blocks_# from all ON states to all OFF states, in accordance with the clock enabling sequence, the STEP 1 through the STEP 5 are conducted to turn ON the function blocks_# sequentially one by one at timings each adjusted to be in a state switch constraint term (described later).

Moreover, in the STEP 3 in which two of the function blocks_# are in the ON state and other two are in the OFF state, when transiting to the STEP 4 in which three of the function blocks_# become the ON state and one becomes the OFF state by one ON-action request or a combination of the ON-action request and the OFF-action requests being simultaneously conducted, the internal circuit 501 transits at a timing which is adjusted to be in the state switch constraint term. Transitions to other STEPs are similarly explained.

The clock disabling sequence will be briefly described. In a case of conducting the ON-action requests to transit all the function blocks_# from all ON states to all OFF states, in accordance with the clock disabling sequence, the STEP 5 through the STEP 1 are conducted to turn OFF the function blocks_# sequentially one by one at timings each adjusted to be in a state switch constraint term (described later).

Moreover, in the STEP 3 in which two of the function blocks_# are in the ON state and other two are in the OFF state, when transiting to the STEP 2 in which one of the function blocks_# become the ON state and other three become the OFF state by one OFF-action request or a combination of the ON-action requests and the OFF-action request being simultaneously conducted, the internal circuit 501 transits at a timing which is adjusted to be in the state switch constraint term. Transitions to other STEPs are similarly explained.

Figure 25:
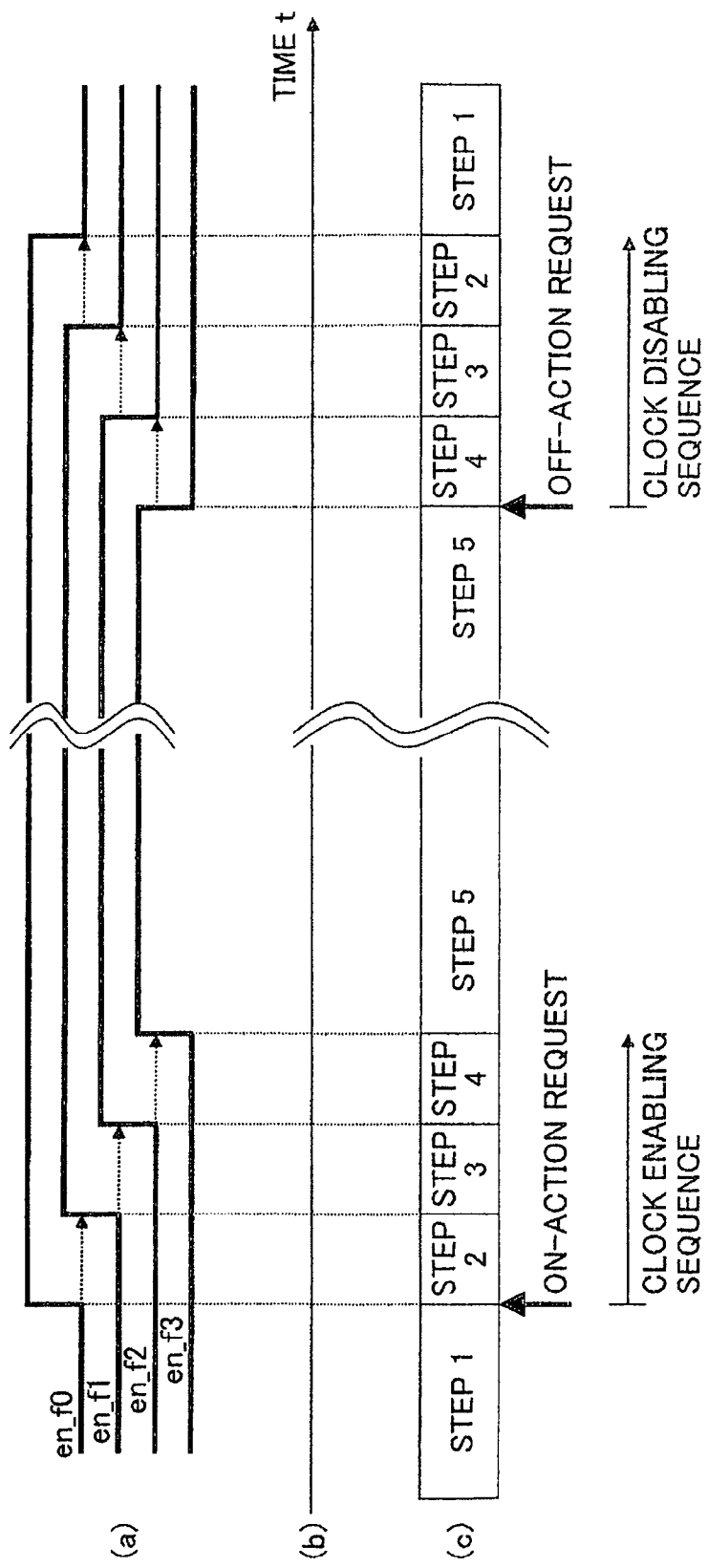
FIG. 25 is a diagram for explaining each state of operation enable signals in accordance with the clock enabling sequence and the clock disabling sequence according to the second embodiment.

FIG. 25 is a diagram illustrating each state of the operation enable signals en_f0, en_f1, en_f2, and en_f3 by the clock enabling sequence and the clock disabling sequence. In FIG. 25, all OFF states are transited to all ON states by the clock enabling sequence. After that, all ON states are transited to all OFF states by the clock disabling sequence.

The ON state or the OFF state of each of the operation enable signals en_f0 through en_f3 is illustrated in FIG. 25(a) along a time axis (FIG. 25(b)). In addition, the STEP 1 through the STEP 5 in the internal circuit 501 by the clock enabling sequence and the clock disabling sequence are illustrated.

In response to the ON-action requests for all the operation enable signals en_f0 through en_f3, the clock enabling sequence starts. Accordingly, at each adjusted timing, the operation enable signal en_f0 is turned ON to transit from the STEP 1 to the STEP 2, the operation enable signal en_f1 is turned ON to transit from the STEP 2 to the STEP 3, the operation enable signal en_f2 is turned ON to transit from the STEP 3 to the STEP 4, and the operation enable signal en_f3 is turned ON to transit from the STEP 4 to the STEP 5.

After that, in response to the OFF-action requests for all the operation enable signals en_f0 through en_f3, the clock disabling sequence starts. Accordingly, at each adjusted timing, the operation enable signal en_f3 is turned OFF to transit from the STEP 5 to the STEP 4, the operation enable signal en_f2 is turned OFF to transit from the STEP 4 to the STEP 3, the operation enable signal en_f1 is turned OFF to transit from the STEP 3 to the STEP 2, and the operation enable signal en_f0 is turned OFF to transit from the STEP 2 to the STEP 1.

The operation enable signals en_f0 through en_f3 may be sequentially controlled one by one. An order of controlling the operation enable signals en_f0 through en_f3 is not limited as illustrated in FIG. 15.

Figure 26:
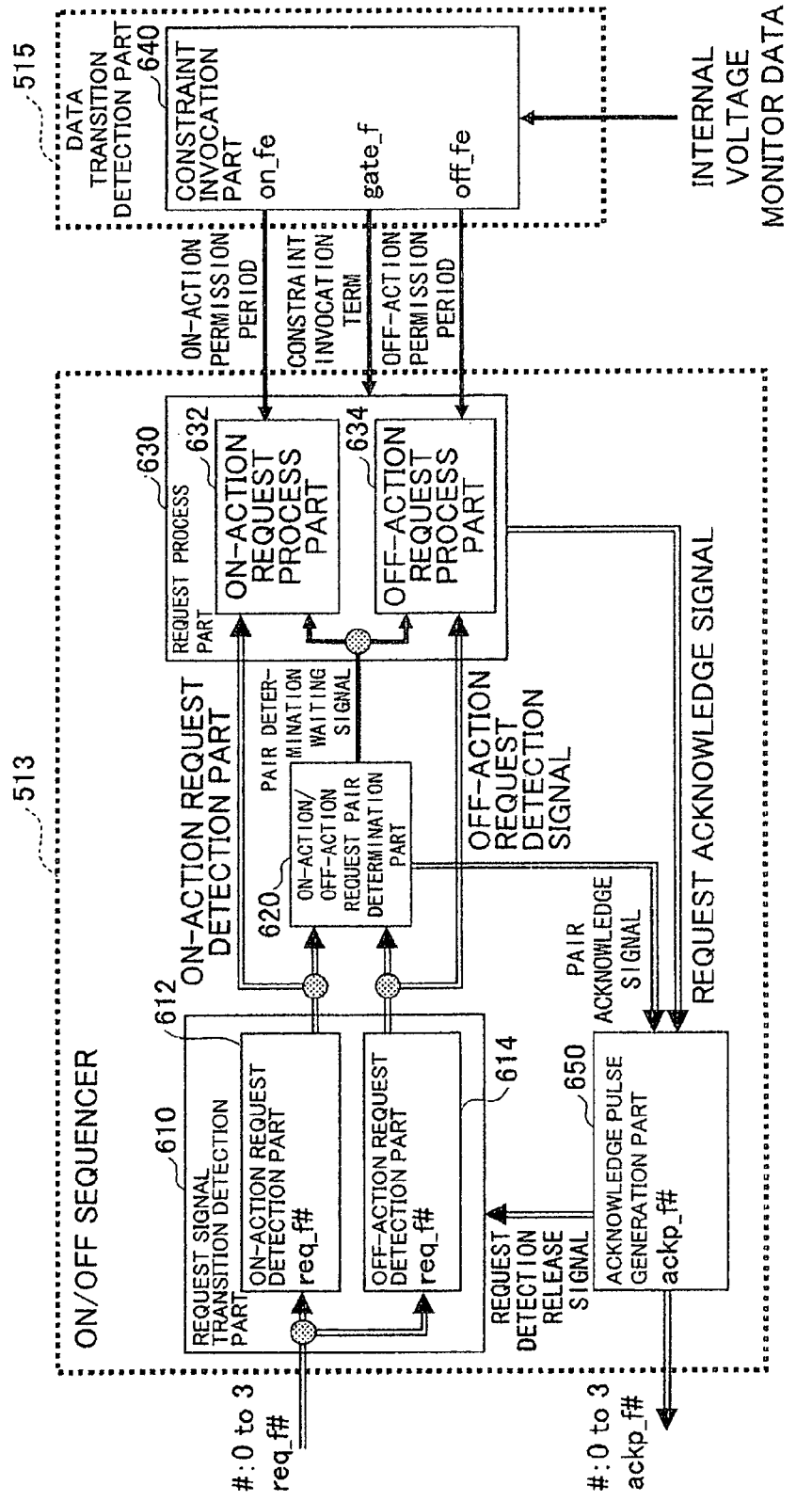
FIG. 26 is a diagram illustrating a circuit configuration of the ON/OFF switch control circuit according to the second embodiment.

A circuit configuration and signal flows of the ON/OF switch control circuit 510 will be described with reference to FIG. 26. In FIG. 26, # denotes at least one of function block numbers 0 through 3, and may indicate all or any combination of the function block numbers 0 to 3. For the sake of convenience, # generically denotes any case, and a single double-line represents all lines which are required in fact.

FIG. 26 is a block diagram illustrating the circuit configuration of the ON/OFF switch control circuit 510 according to the second embodiment. In the ON/OFF switch control circuit 510 illustrated in FIG. 26, the ON/OFF sequencer 513 includes a request signal transition detection part 610, an ON-action/OFF-action request pair determination part 620, a request process part 630, and an acknowledge pulse generation part 650. The data transition detection part 515 further includes a constraint invocation part 640.

The request signal transition detection part 610 is a circuit for detecting a change from the OFF state to the ON state or from the ON state to the ON state of the signals req_#, and further includes an ON-action request detection part 612, and an OFF-action request detection part 614.

The ON-action/OFF-action request pair determination part 620 is a circuit for determining whether or not there are the ON-action and the OFF-action to be paired. Until one pair is determined, a pair determination waiting signal is output to the ON-action request process part 632 and the OFF-action request process part 634 of the request process part 630. Accordingly, the process request part 630 does not operate during the pair determination signal indicates ON.

The request process part 630 includes an ON-action request process part 632 for controlling a transition of the circuit operation state in response to the ON-action request, and an OFF-action request process part 634 for controlling the transition of the circuit operation state in response to the OFF-action request.

The constraint invocation part 640 controls processes for the ON-action request and the OFF-action request by various control signals with respect to the request process part 630.

When the acknowledge pulse generation part 650 receives the pair acknowledge signals from the ON-action/OFF-action pair determination part 620, the acknowledge pulse generation part 650 sends acknowledge pulses ackp_f# only for the signals req_f# being paired. Moreover, when the acknowledge pulse generation part 650 receives request acknowledge signals from the request process part 630, the acknowledge pulse generation part 650 sends the acknowledge pulses ackp_f# for the signals req_f# corresponding to the request acknowledge signals, to the pulsed latches 50p through 53p.

As described above, the request signal transition detection part 610, the ON-action request pair determination part 620, the request process part 630, the constraint invocation part 640, and the acknowledge pulse generation part 650 in the second embodiment correspond to the request signal transition detection part 210, the ON-action request pair determination part 220, the request process part 230, the constraint invocation part 240, and the acknowledge pulse generation part 250, and the explanations thereof will be omitted.

The initial state and the constraint invocation state in the second embodiment will be described. In the second embodiment, similar to the first embodiment, the initial state means is a stable state in that the internal power voltage ivdd is stable. For example, in the initial state, a power voltage fluctuation is not occurred or is converged, or a plurality of internal power voltage fluctuations are interfered with each other and are cancelled. The constraint invocation state is a state of constraining a further operation start and a further operation suspend in a term from a detection start of the internal power voltage fluctuation to the initial state in which the internal power voltage ivdd becomes stable.

<Initial State>

The request process part 630 determines wither a current state is the initial state or the constraint invocation state based on a level of a constraint invocation term signal gate_f sent from the constraint invocation part 640. For example, if the constraint invocation term signal gate_f is a high level, it is determined that the current state is the initial state.

<Constraint Invocation State>

If the constraint invocation term signal gate_f sent from the constraint invocation part 640 is a low level, the ON-action request process part 632 of the request process part 630 further determines whether or not the current state is the ON-action permission period or the ON-action forbidden period based on a level of the ON-action permission period signal on_fe sent from the constraint invocation part 640. If the current state is the ON-action forbidden period (for example, the ON-action permission period signal on_fe indicates the low level), the ON-action request process part 632 retains a request process and waits for the ON-action permission period (for example, the ON-action permission period signal on_fe is the high level).

When the ON-action permission period signal on_fe becomes the high level, the ON-action request process part 632 of the request process part 630 outputs the request acknowledge signal only for the signal req_f# corresponding to the smallest function block number in the function block_0 50 through the function block_3 53 to which the ON-action requests are conducted.

The acknowledge pulse generation part 650 outputs one of the pulsed latches 50p through 53p, which corresponds to the acknowledge pulse ackp_f#, in response to the signal req_f# corresponding to the request acknowledge signal received from the request process part 630.

Similarly, when the constraint invocation period signal gate_f sent from the constraint invocation part 640 is the low level, the OFF-action request process part 634 of the request process part 630 further determines whether the current state is the OFF-action permission period or the OFF-action forbidden period based on the level of the OFF-action permission period signal off_fe. If the current state is the OFF-action forbidden period (for example, the OFF-action permission period signal off_fe is the low level), the OFF-action request process part 634 retains a request process and waits for the OFF-action permission period (for example, the OFF-action permission period signal off_fe is the high level).

When the OFF-action permission period signal off_fe is the high level, the OFF-action request process part 634 of the request process part 630 outputs the request acknowledge signal only for the signal req_f# corresponding to the smallest function block number in the function block_0 50 through the function block_3 53 to which the OFF-action requests are conducted.

The acknowledge pulse generation part 650 outputs one of the pulsed latches 50p through 53p, which corresponds to the acknowledge pulse ackp_f#, in response to the signal req_f# corresponding to the request acknowledge signal received from the request process part 630.

After that, when the constraint invocation period signal gate_f becomes the low level, the request process part 630 determines that the current state transits to the initial state.

In the second embodiment, different from the first embodiment, the constraint invocation period signal gate_f of the constraint invocation part 640 switches to the high level or the low level based on the internal voltage monitor data (described later). Accordingly, the request process part 630 is not required to conduct the constraint invocation request and the constraint release request to the constraint invocation part 640.

Figure 27:
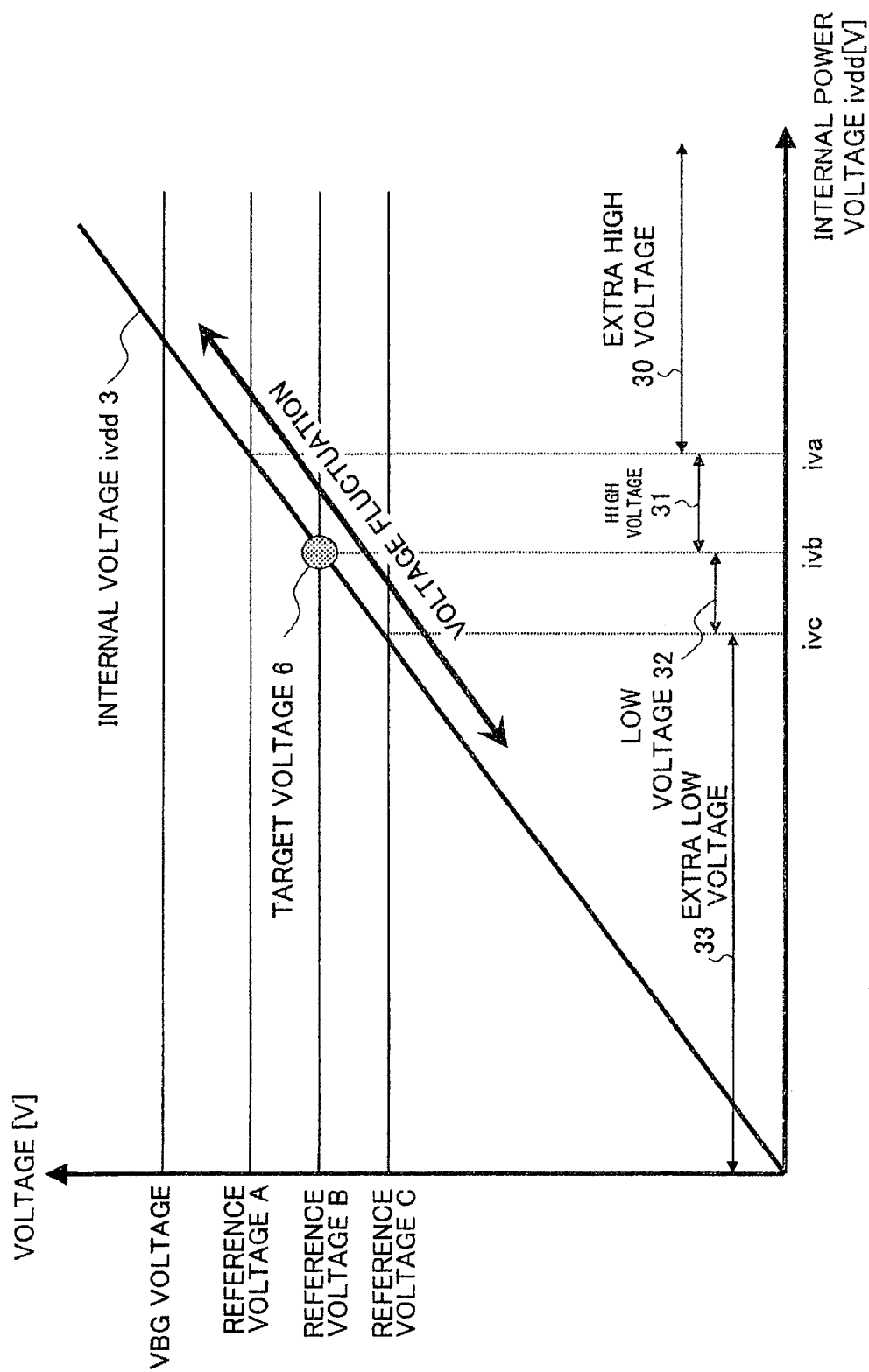
FIG. 27 is a diagram for explaining internal voltage states detected by a voltage sensor according to the second embodiment.

The internal voltage monitor data supplied to the constraint invocation part 640 of the data transition detection part 515 will be described with reference to FIG. 27 and FIG. 28. FIG. 27 is a diagram for explaining internal voltage states which the voltage sensor 530 detects.

In a graph illustrated in FIG. 27, an horizontal axis indicates the internal power voltage ivdd of the LSI 500 and a vertical axis indicates a voltage which the voltage sensor 530 detects.

A reference voltage A, a reference voltage B, and a reference voltage C are provided to the voltage sensor 530 and indicate on the vertical axis. For example, the reference voltage A, the reference voltage B, and the reference voltage C are generated based on a voltage of a band gap reference (hereinafter, called VBG).

The reference voltage A is a voltage higher than the reference voltage B after an approximately ½ resonance period Tres when a waveform of a resonance frequency starts rising due to a voltage fluctuation. The reference voltage B is a voltage at which the power voltage of the internal circuit 501 becomes stable. The reference voltage C is a voltage lower than the reference voltage B after an approximately ½ resonance period Tres when the waveform of a resonance frequency starts falling due to the voltage fluctuation.

An extra high voltage 30 indicates higher than the reference voltage A, a high voltage 31 indicates from the reference voltage A to the reference voltage B, a low voltage 32 indicates from the reference voltage B to the reference voltage C, and an extra low voltage 33 indicates lower than the reference voltage C.

The internal power voltage ivdd of the LSI 500 fluctuates with the resonance period Tres, and the internal voltage state which is fluctuating is indicated by the internal voltage ivdd3. A target voltage 6 indicates a voltage of the initial state when the internal voltage ivdd3 becomes stable, and is defined as the reference voltage B.

The voltage sensor 530 supplies the internal voltage monitor data indicating the internal voltage state which is detected by using the reference voltage A, the reference voltage B, and the reference voltage C.

Figure 28:
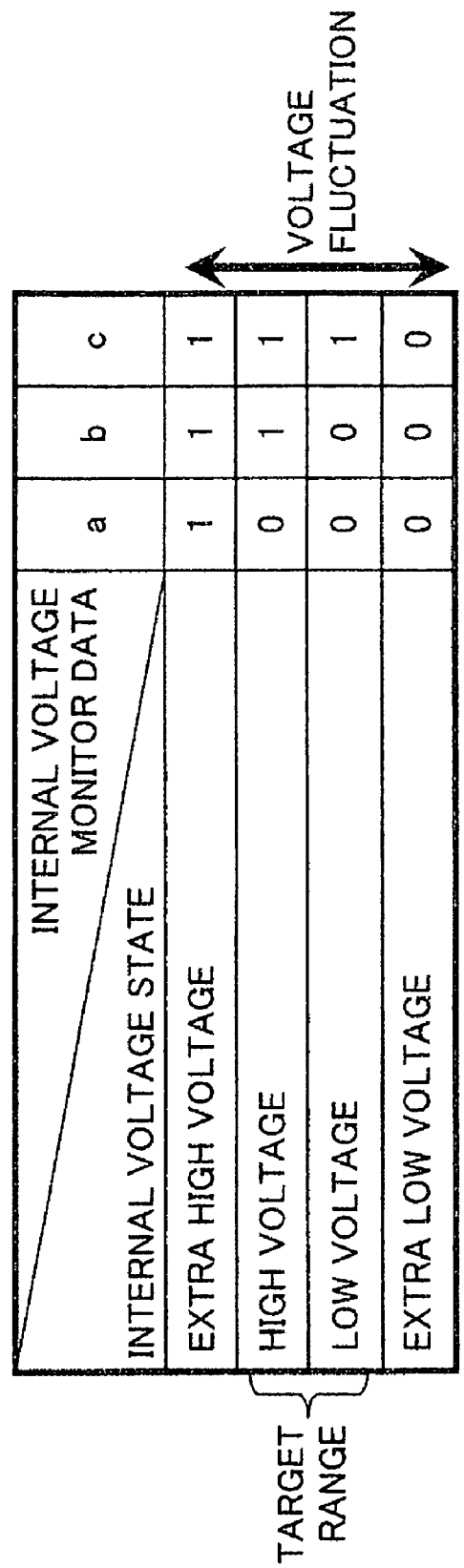
FIG. 28 is a diagram illustrating an correspondence between the internal voltage states detected by the voltage sensor and internal voltage monitor data supplied to a constraint invocation part according to the second embodiment.

FIG. 28 is a diagram illustrating a correspondence between the internal voltage states detected by the voltage sensor 530 and the internal voltage monitor data supplied to the constraint invocation part 640. In FIG. 28, the internal voltage monitor data are formed by signals a, b, and c indicating "0" or "1".

In a case in that the internal voltage ivdd3 illustrated in FIG. 27 is the extra high voltage being higher than the reference voltage A, the internal voltage monitor data indicate "111" (all signals "a", "b", and "c" are "1"). In a case in that the internal voltage ivdd3 is lower than the reference voltage A and higher than the reference voltage B, the internal voltage monitor data indicate "011" (the signal "a" is "0" and the signals b and c are "1"). In a case in that the internal voltage ivdd3 is lower than the reference voltages A and B and higher than the reference voltage C, the internal voltage monitor data indicate "001" (the signals "a" and "b" are "0" and the signal "c" is "1"). In a case in that the internal voltage ivdd3 is lower than the reference voltages A, B, and C, the internal voltage monitor data indicate "000" (all signals "a", "b", and "c" are "0").

The constraint invocation part 640 detects the voltage fluctuation by a transition of the internal voltage monitor data, and determines the constraint invocation term, the ON-action permission period, and the OFF-action permission period based on the voltage fluctuation.

Figure 29:
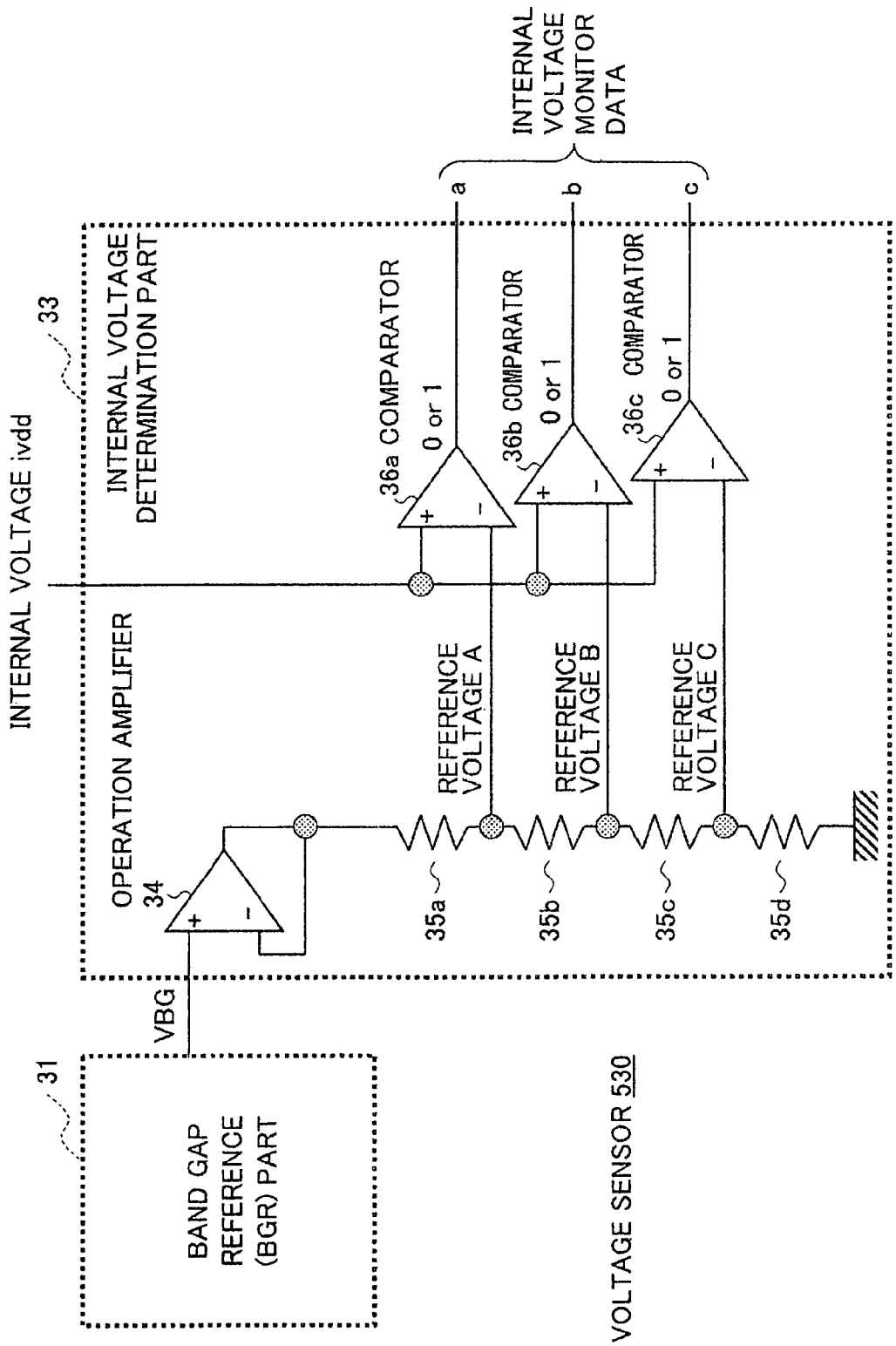
FIG. 29 is a diagram illustrating a circuit configuration of the voltage sensor using a band gap reference according to the second embodiment.

FIG. 29 is a diagram illustrating a circuit configuration of the voltage sensor 530 by using the band gap reference. The voltage sensor 530 illustrated in FIG. 29 includes a band gap reference (BGR) part 31, and an internal voltage determination part 33.

The BGR part 31 generates the VBG which is highly accurate and supplies the VBG to the internal voltage determination part 33. The VBG indicates a voltage higher than the reference voltage A.

The internal voltage determination part 33 includes an operation amplifier 34, a resistor 35a, a resistor 35b, a resistor 35c, and a resistor 35d, a comparator 36a, a comparator 36b, and a comparator 36c. The a comparators 36a through 36c are comparators each which conducts an A/D (analog to digital) conversion and outputs a comparison result.

The VBG generated by the BGR part 31 is applied to the operation amplifier 34 and supplied to the resistors 35a through 35c. The resistor 35a generates the reference voltage A, the resistor 35b generates the reference voltage B, and resistor 35c generates the reference voltage C. The resistor 35d lowers and grounds the VBG. The reference voltage A is applied to the comparator 36a, the reference voltage B is applied to the comparator 36b, and the reference voltage C is applied to the comparator 36c.

The comparator 36a outputs a result from comparing the internal voltage ivdd with the reference voltage A. The signal "a" indicates "0" when the internal voltage ivdd is higher than the reference voltage A, and the signal "a" indicates "1" when the internal voltage ivdd is lower than the reference voltage A.

The comparator 36b outputs a result from comparing the internal voltage ivdd with the reference voltage B. The signal "b" indicates "0" when the internal voltage ivdd is higher than the reference voltage B, and the signal "b" indicates "1" when the internal voltage ivdd is lower than the reference voltage B.

The comparator 36c outputs a result from comparing the internal voltage ivdd with the reference voltage C. The signal "c" indicates "0" when the internal voltage ivdd is higher than the reference voltage C, and the signal "c" indicates "1" when the internal voltage ivdd is lower than the reference voltage C.

Figure 30:
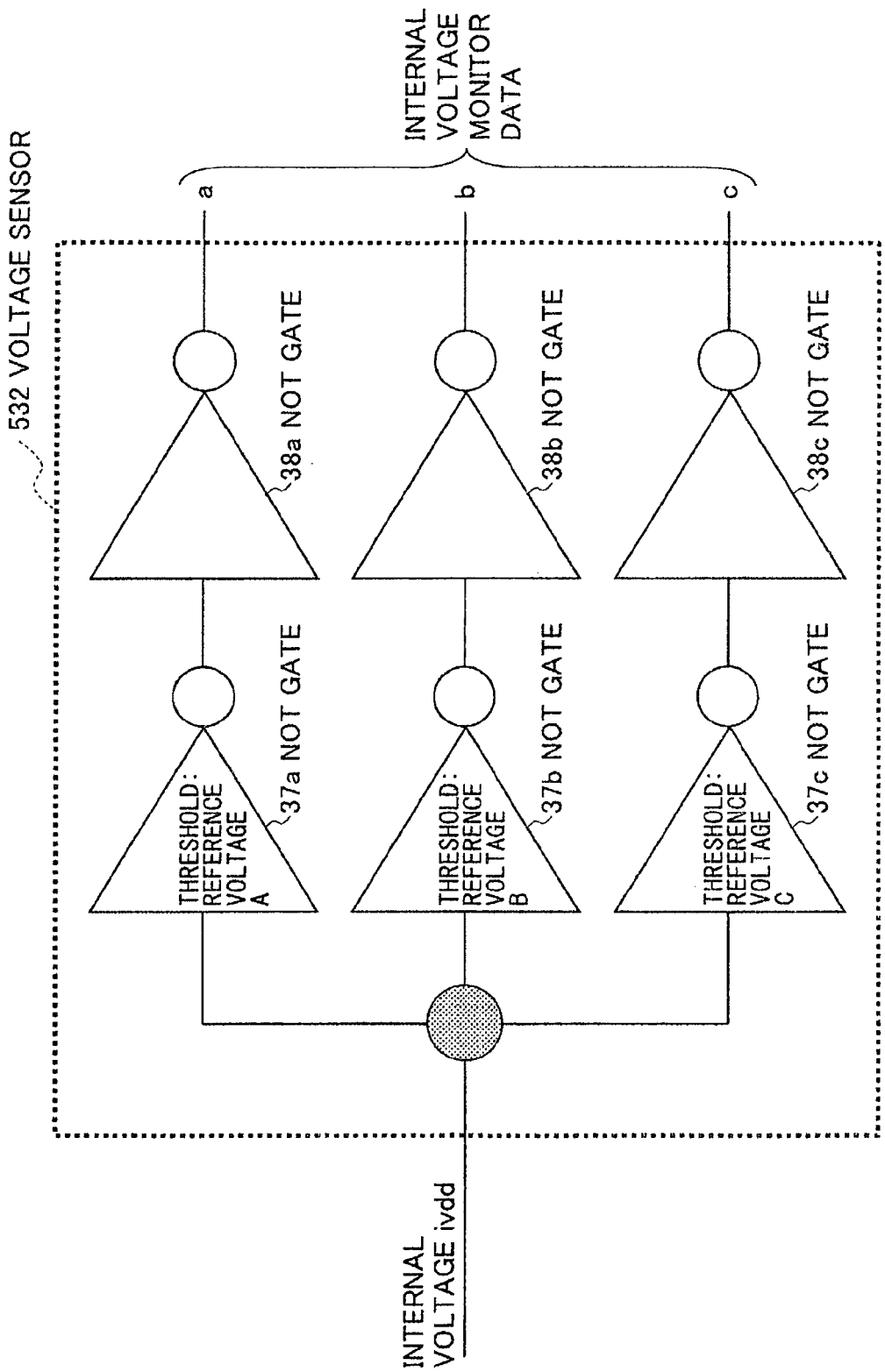
FIG. 30 is a diagram illustrating a first variation of the circuit configuration of the voltage sensor using a logic circuit according to the second embodiment.

Other variations of the circuit configuration of the voltage sensor 530 will be described with reference to FIG. 30 and FIG. 31. FIG. 30 is a diagram illustrating a first variation of the circuit configuration of the voltage sensor using a logic circuit. The voltage sensor 532 illustrated in FIG. 30 includes a NOT gate 37a in which the reference voltage A is a threshold, a NOT gate 37b in which the reference voltage B is a threshold, a NOT gate 37c in which the reference voltage C is a threshold, a NOT gate 38a which outputs the signal "a", a NOT gate 38b which outputs the signal "b", and a NOT gate 38c which outputs the signal "c".

The NOT gate 37a conducts a NOT logic operation with the threshold of the reference voltage A with respect to the internal voltage ivdd being input, and outputs the operation result to the NOT gate 38a. The NOT gate 38a further conducts the NOT logic operation and outputs the signal "a".

The NOT gate 37b conducts a NOT logic operation with the threshold of the reference voltage B with respect to the internal voltage ivdd being input, and outputs the operation result to the NOT gate 38b. The NOT gate 38b further conducts the NOT logic operation and outputs the signal "b".

The NOT gate 37c conducts a NOT logic operation with the threshold of the reference voltage C with respect to the internal voltage ivdd being input, and outputs the operation result to the NOT gate 38c. The NOT gate 38c further conducts the NOT logic operation and outputs the signal "c".

By this circuit configuration, the voltage sensor 532 supplies the internal voltage monitor data of the signals "a", "b", and "c" to the constraint invocation part 640.

Figure 31:
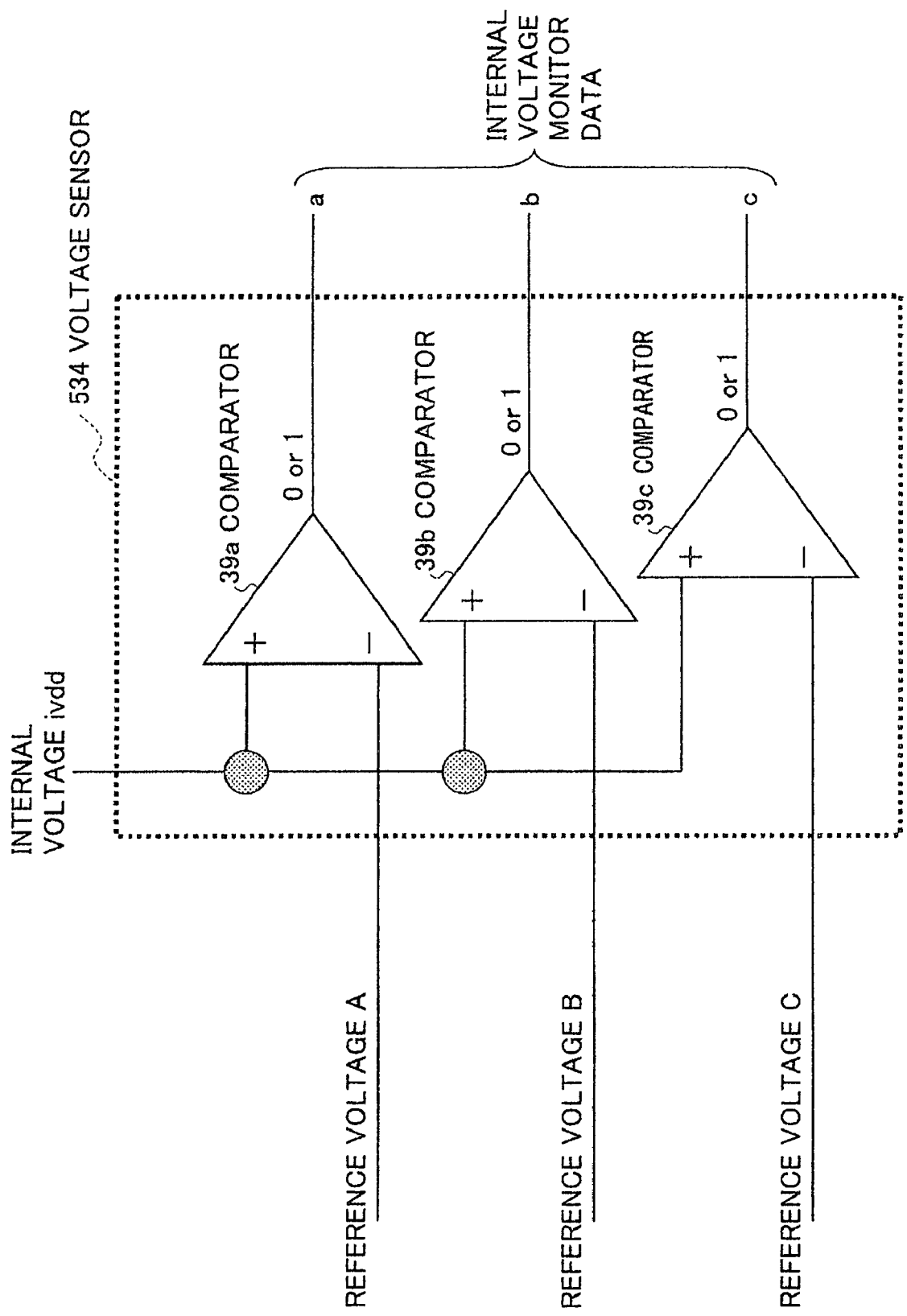
FIG. 31 is a diagram illustrating a second variation of the circuit configuration of the voltage sensor using comparators according to the second embodiment.

FIG. 31 is a diagram illustrating a second variation of the circuit configuration of the voltage sensor using comparators. A voltage sensor 534 illustrated in FIG. 31 includes a comparator 39a, a comparator 39b, and a comparator 39c. The comparator 39a, the comparator 39b, and the comparator 39c are comparators for the A/D conversion.

Different from the voltage sensor 530 illustrated in FIG. 29, the voltage sensor 534 does not include the BGR part 31. The reference voltage A through the reference voltage C are externally applied to the comparator 39a through the comparator 39c, respectively.

The comparators 39a, 39b, and 39c outputs the signals "a", "b", and "c" indicating a result from comparing with the internal voltage ivdd.

By this circuit configuration, the voltage sensor 534 supplies the internal voltage data by the signals "a", "b", and "c" to the constraint invocation part 640.

Figure 32:
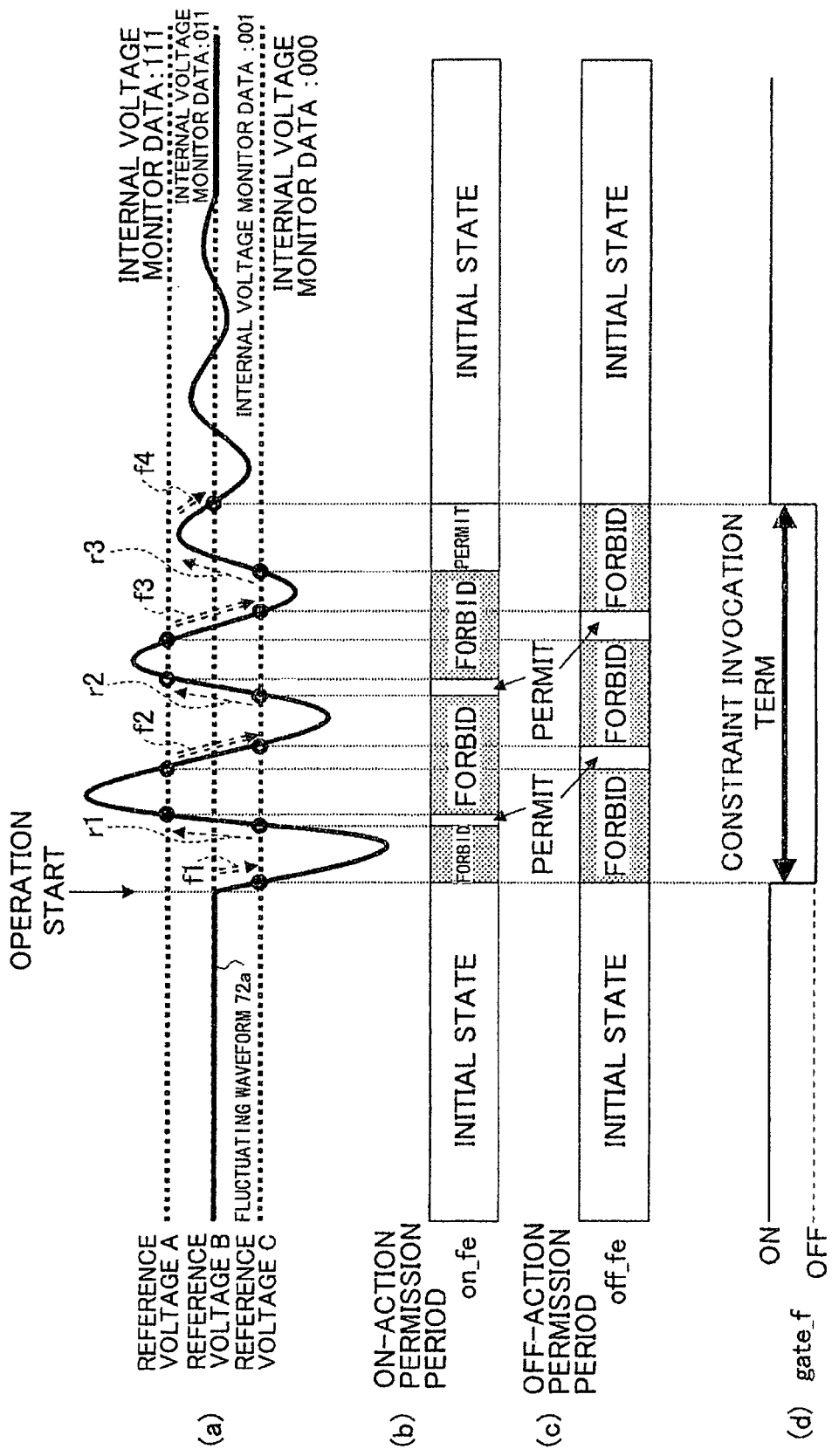
FIG. 32 is a diagram illustrating an operation of the constraint invocation part in a case in that one of function blocks starts to operate from the circuit suspend state according to the second embodiment.

Operation examples of the constraint invocation part 640 of the data transition detection part 515 will be described with reference to FIG. 32 and FIG. 33. FIG. 32 is a diagram illustration an operation of the constraint invocation part 640 in a case in that one of the function block_0 50 through the function block_3 53 starts to operate from the circuit suspend state.

In FIG. 32, a fluctuating waveform 72a indicates a change of the internal power voltage ivdd of the LSI 500 in a case in that one of the function block_0 50 through the function block_3 53 starts to operate from the circuit suspend state (FIG. 32(a)).

The constraint invocation term signal gate_f indicates the constraint invocation term from a data transition due to a falling waveform f1 of the fluctuating waveform 72a, which starts from approximately the reference voltage B indicating the initial state, to a data transition due to a falling waveform f4 of the fluctuating waveform 72a (FIG. 32(d)). When the internal voltage monitor data indicates "000" at the falling waveform f1 of the fluctuating waveform 72a starting from the initial state, the constraint invocation term signal gate_f switches from the ON state to the OFF state and starts the constraint invocation term. After that, when the internal voltage monitor data indicates "001" at the falling waveform f4 of the fluctuating waveform 72a, the constraint invocation term signal gate_f switches from the OFF state to the ON state and terminates the constraint invocation term.

The ON-action permission period signal on_fe turns ON in response to data transitions due to rising waveforms r1, r2, and r3 of the fluctuating waveform 72a and permits the ON-action. Also, the ON-action permission period signal on_fe turns OFF at other than the rising waveforms r1, r2, and r3 (FIG. 32(b)). When the internal voltage monitor data indicates "001" at each of the rising waveforms r1, r2, and r3 of the fluctuating waveform 72a, the ON-action permission period signal on_fe switches from the OFF state to the ON state and starts the ON-action permission period. After that, when the internal voltage monitor data indicates "111", the ON-action permission period signal on_fe switches from the ON state to the OFF state and terminates the ON-action permission period.

In the constraint invocation term, the OFF-action permission period signal off_fe turns ON at the data transitions due to falling waveforms f2 and f3 of the fluctuating waveforms 72a and permits the OFF-action, and turns OFF at other than the falling waveforms f2 and f3 and forbids the OFF-action (FIG. 32(c)). When the internal voltage monitor data indicates "011" at each of the falling waveforms f2 and f3 of the fluctuating waveforms 72a, the OFF-action permission period signal off_fe switches from the OFF state to the ON state and starts the OFF-action permission period. After that, when the internal voltage monitor data indicates "000", the OFF-action permission period signal off_fe switches from the ON state to the OFF state and terminates the OFF-action permission period.

As described above, the constraint invocation term, the ON-action permission period, and the OFF-action permission period are determined by using the internal voltage monitor data. Accordingly, in stead of fixing the resonance period Tres by using a timer control, it may be possible to adjust the timings of the ON-action and the OFF-action in response to the fluctuation of the actual internal power voltage ivdd.

Moreover, in the clock enabling sequence sequentially transiting to the circuit operation state in response to the ON-actions for more than two function blocks requested from the PMU 520, during the constraint operation term, in response to the fluctuation of the internal power voltage ivdd starting at an actual rising waveform, the ON-action permission period is set in a term including a time point of an N/2 resonance period Tres when N is odd and the ON-action forbidden period is set in a term including a time point of an M-fold resonance period Tres when M is integer, so as to cancel the internal power voltage ivdd.

When the internal power voltage ivdd greatly starts fluctuating with a rising waveform at a first ON-action, the data transition detection part 515 detects a moment of crossing the reference voltage C, based on the internal voltage monitor data supplied from the voltage sensor 530, invokes a constraint for a next ON-action, creates alternately the ON-action permission period and the ON-action forbidden period, and releases the constraint after a sufficient time lapses.

Furthermore, in the clock enabling sequence, the OFF-action permission period is set in a term including a time point of the M-fold resonance period Tres when M is integer and the OFF-action forbidden period is set in a term including a time point of the N/2 resonance period Tres when N is odd, so as to cancel the internal power voltage ivdd which starts fluctuating at the rising waveform due to the OFF-action after the constraint is invoked.

Figure 33:
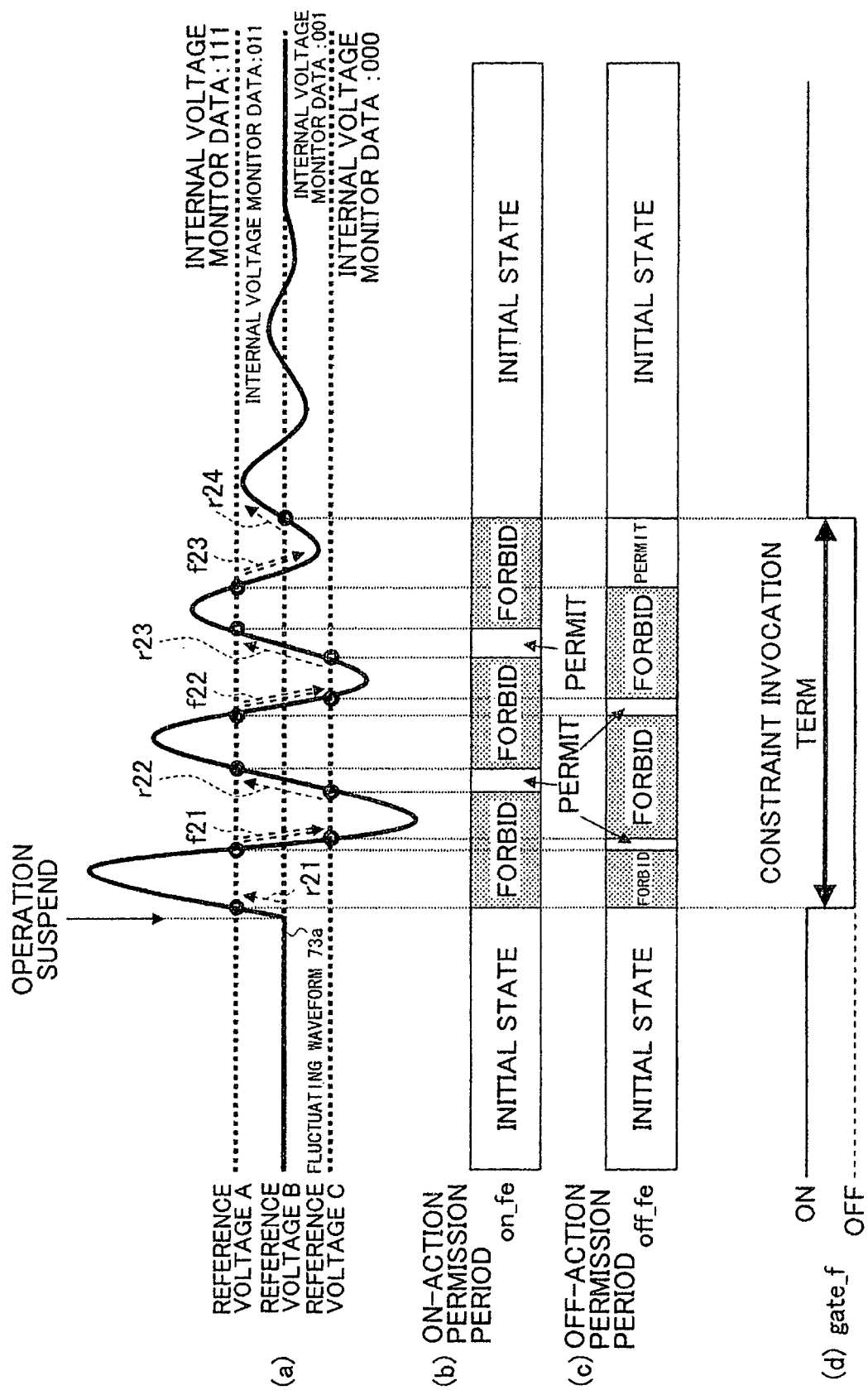
FIG. 33 is a diagram illustrating an operation of the constraint invocation part in a case in that one of function blocks suspends the operation from the circuit operation state according to the second embodiment.

FIG. 33 is a diagram illustrating an operation of the constraint invocation part 640 in a case in that one of the function block_0 50 through the function block_3 53 suspends the operation from the circuit operation state.

In FIG. 33, a fluctuating waveform 73a indicates a change of the internal power voltage ivdd of the LSI 500 in a case in that one of the function block_0 50 through the function block_3 53 suspends operating from the circuit operation state (FIG. 33(a)).

The constraint invocation period signal gate_f indicates the constraint invocation term from a data transition due to a rising waveform r21 of the fluctuating waveform 73a, which starts from approximately the reference voltage B indicating the initial state, to a data transition due to a rising waveform r24 of the fluctuating waveform 72a (FIG. 33(d)). When the internal voltage monitor data indicates "111" at the rising waveform r21 of the fluctuating waveform 73a starting from the initial state, the constraint invocation term signal gate_f switches from the ON state to the OFF state and starts the constraint invocation term. After that, when the internal voltage monitor data indicates "011" at the rising waveform r24 of the fluctuating waveform 73a, the constraint invocation term signal gate_f switches from the OFF state to the ON state and terminates the constraint invocation term.

The ON-action permission period signal on_fe turns ON in response to data transitions due to rising waveforms r22 and r23 of the fluctuating waveform 73a and permits the ON-action. Also, the ON-action permission period signal on_fe turns OFF at other than the rising waveforms r22 and r23 (FIG. 33(b)). When the internal voltage monitor data indicates "001" at each of the rising waveforms r22 and r23 of the fluctuating waveform 73a, the ON-action permission period signal on_fe switches from the OFF state to the ON state and starts the ON-action permission period. After that, when the internal voltage monitor data indicates "111", the ON-action permission period signal on_fe switches from the ON state to the OFF state and terminates the ON-action permission period.

In the constraint invocation term, the OFF-action permission period signal off_fe turns ON at the data transitions due to falling waveforms f21 and f22 of the fluctuating waveforms 73a and permits the OFF-action, and turns OFF at other than the falling waveforms f21 and f22 (FIG. 33(c)). When the internal voltage monitor data indicates "011" at each of the falling waveforms f21 and f22 of the fluctuating waveforms 73a, the OFF-action permission period signal off_fe switches from the OFF state to the ON state and starts the OFF-action permission period. After that, when the internal voltage monitor data indicates "000", the OFF-action permission period signal off_fe switches from the ON state to the OFF state and terminates the OFF-action permission period.

As described above, the constraint invocation term, the ON-action permission period, and the OFF-action permission period are determined by using the internal voltage monitor data. Accordingly, in stead of fixing the resonance period Tres by using a timer control, it may be possible to adjust the timings of the ON-action and the OFF-action in response to the fluctuation of the actual internal power voltage ivdd.

Moreover, in the clock disabling sequence sequentially transiting to the circuit suspend state in response to the OFF-actions for more than two function blocks requested from the PMU 520, during the constraint operation term, in response to the fluctuation of the internal power voltage ivdd starting at an actual falling waveform, the OFF-action permission period is set in a term including a time point of an N/2 resonance period Tres when N is odd and the OFF-action forbidden period is set in a term including a time point of an M-fold resonance period Tres when M is integer, so as to cancel the internal power voltage ivdd.

When the internal power voltage ivdd greatly starts fluctuating with a rising waveform at a first OFF-action, the data transition detection part 515 detects a moment of crossing the reference voltage A, based on the internal voltage monitor data supplied from the voltage sensor 530, invokes a constraint for a next OFF-action, creates alternately the OFF-action permission period and the OFF-action forbidden period, and releases the constraint after a sufficient time lapses.

Moreover, in the clock disabling sequence, the ON-action permission period is set in a term including a time point of the M-fold resonance period Tres when M is integer and the ON-action forbidden period is set in a term including a time point of the N/2 resonance period Tres when N is odd, so as to cancel the internal power voltage ivdd which starts fluctuating at the falling waveform due to the ON-action after the constraint is invoked.

Figure 34:
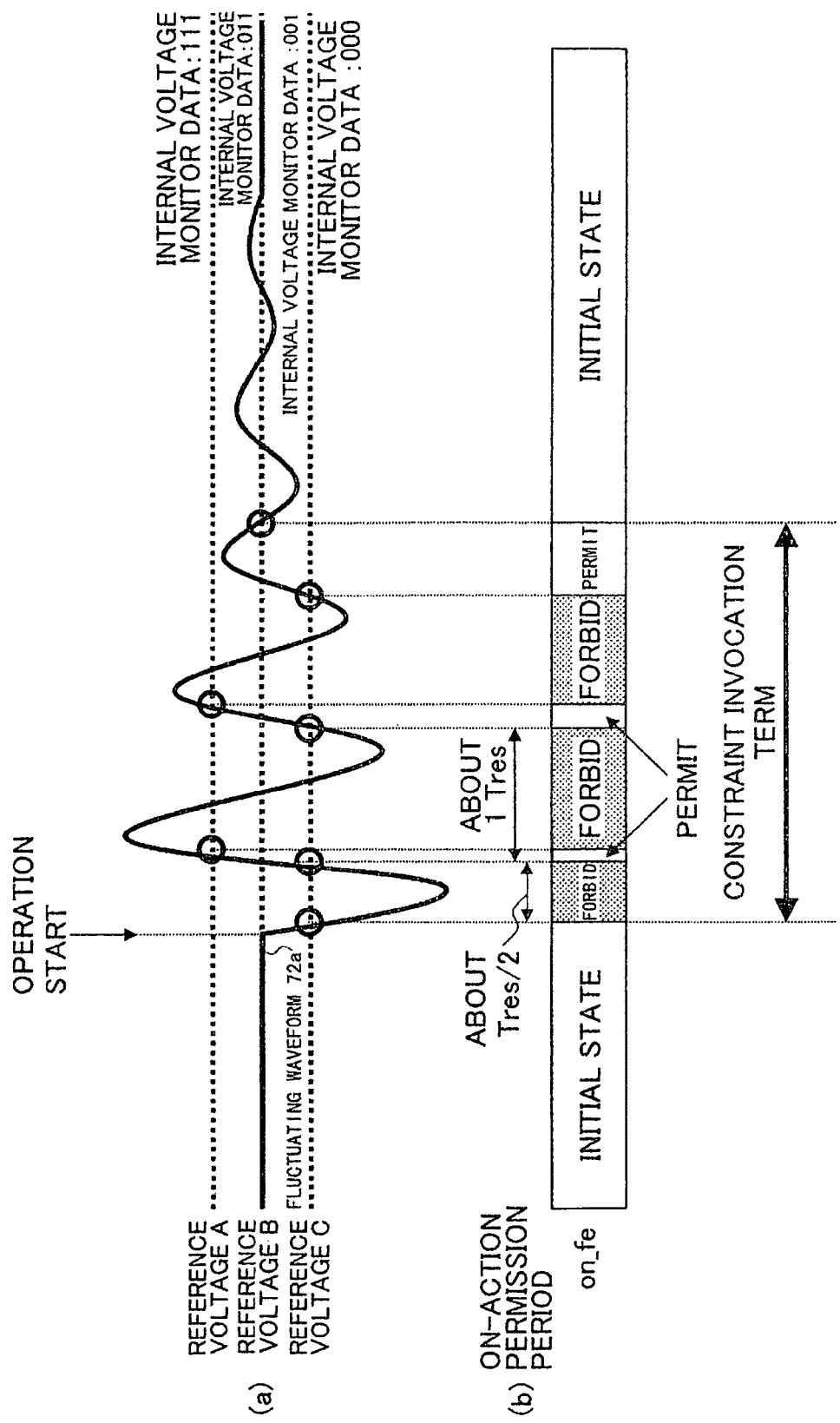
FIG. 34 is a diagram for explaining ON-action permission periods set by the clock enabling sequence according to the second embodiment.
Figure 35:
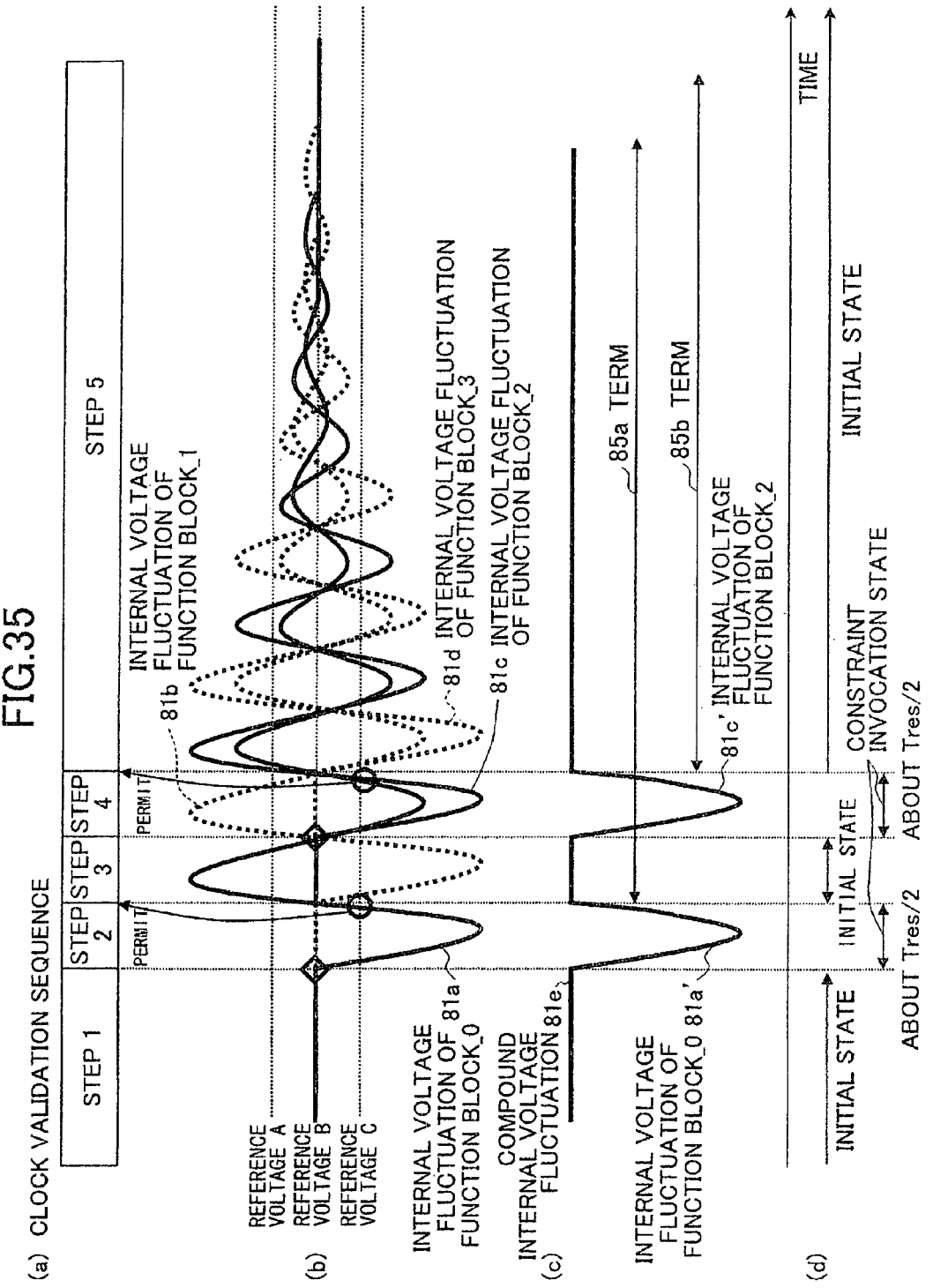
FIG. 35 is a diagram illustrating an example of an ON-action control in accordance with the clock enabling sequence according to the second embodiment.

The clock disabling sequence will be described in a case in that the ON-actions are conducted for all the function block_0 50 through the function block_3 53, with reference to FIG. 34 and FIG. 35. In FIG. 34 and FIG. 35, the ON-actions are conducted in a sequence of the function block_0 50 through the function block_3 53.

FIG. 34 is a diagram for explaining the ON-action permission periods set by the clock enabling sequence. In FIG. 34, in a case of conducting the ON-actions for all in the sequence of the function block_0 50 through the function block_3 53, when the ON-action is made to the function block_0 50 and when the ON-action is permitted to the function block_2 52, the fluctuating waveform 72a occurs to the internal power voltage ivdd of the LSI 500 (FIG. 34(a)). After the ON-action is permitted to the function block_0 50 at any one of the ON-action permission periods indicated by the ON-action permission period signal on_fe (FIG. 34(b)), the ON-action is permitted to the function block_1 51. Then, after the ON-action is permitted to the function block_2 52, the ON-action is permitted to the function block_3 53.

In this case, after the ON-action is permitted to the function block_0 50, when the ON-action is permitted to the function block_1 51, the fluctuation of the internal power voltage ivdd is cancelled by mutual resonance periods and the current state is transited to the initial state.

In the constraint invocation term, a first ON-action permission period starts after approximately ½ resonance period Tres in response to a detection of the reference voltage C at a rising waveform. If the ON-action is not permitted to the function block_1 51 or the function block_3 53 to be next, the first ON-action permission period and the ON-action forbidden period are passed. Then, a next ON-action permission period is started after the approximately one resonance period Tres in response to a detection of the reference voltage C at the rising waveform.

In accordance with the constraint invocation term and the ON-action permission period determined by using the internal voltage monitor data, the clock enabling sequence is conducted at a timing of the ON-action, which is adjusted based on the fluctuation of the actual internal power voltage ivdd.

FIG. 35 is a diagram illustrating an example of an ON-action control in accordance with the clock enabling sequence. In FIG. 35, in a case in that the ON-actions are sequentially conducted for all the function block_0 50 through the function block_3 53, the clock enabling sequence is conducted from the STEP 1 through the STEP 5 (FIG. 35(a)).

By sequentially conducting the ON-actions in accordance with the clock enabling sequence, an internal voltage fluctuation 81a of the function block_0 50, an internal voltage fluctuation 81b of the function block_1 51, an internal voltage fluctuation 82c of the function block_2 52, and an internal voltage fluctuation 81d of the function block_3 53 occur (FIG. 35(b)).

The internal voltage fluctuations 81a through 81d are interfered with each other and form a compound internal voltage fluctuation 81e (FIG. 35(c)).

In the compound internal voltage fluctuation 81e, an internal voltage fluctuation 81a' (a part of the internal voltage fluctuation 81a) appears due to the ON-action of the function block_0 50 during the approximately ½ resonance period Tres immediately after the ON-action of the function block_0 50. Subsequently, an internal voltage fluctuation 81c' (a part of the internal voltage fluctuation 81c) appears due to the ON-action of the function block_2 52 during the approximately ½ resonance period Tres immediately after the ON-action of the function block_2 52.

After the internal voltage fluctuation 81a', the compound internal voltage fluctuation 81e rapidly converges and retains a constant voltage. Even if the compound internal voltage fluctuation 81e greatly fluctuates twice, these two internal voltage fluctuations 81a' and 81c' do not mutually amplify.

In a term 85a, the internal voltage fluctuations 81a and 81b are approximately cancelled by the ON-action of the function block_0 50 and the ON-action of the function block_1 51. The term 85a starts in response to the ON-action of the function block_1 51 after the approximately ½ resonance period Tres from the ON-action of the function block_0 50.

In addition, in a term 85b, the internal voltage fluctuations 81c and 81d are approximately cancelled by the ON-action of the function block_2 52 and the ON-action of the function block_3 53. The term 85b, starts in response to the ON-action of the function block_3 53 after the approximately ½ resonance period Tres from the ON-action of the function block_2 52.

In this case, the data transition detection part 511 of the ON/OFF switch control circuit 510 becomes the constraint invocation state due to the ON-action of the function block_0 50 from the initial state, and returns to the initial state due to the ON-action of the function block_1 51 after the approximately ½ resonance period Tres. Again, the data transition detection part 511 becomes the constraint invocation state due to the ON-action of the function block_2 52, and returns to the initial state due to the ON-action of the function block_3 53 (FIG. 35(d)).

In a case of the clock enabling sequence, the data transition detection part 511 becomes the constraint invocation state during the approximately ½ resonance period Tres by setting the reference voltage C.

As described above, even if there are state transitions for four function blocks 50 through 53, the compound internal voltage fluctuation 81e applied to the LSI 500 simply appears as the internal voltage fluctuation 81a' (a part of the internal voltage fluctuation 81a) caused by the ON-action of the function block_0 50 and the internal voltage fluctuation 81c' (a part of the internal voltage fluctuation 81c) caused by the ON-action of the function block_2 52, and appears only during the approximately ½ resonance period Tres for each of the fluctuations 81a' and 81c'.

FIG. 36 is a diagram for explaining the ON-action permission periods set by the clock disabling sequence. In FIG. 36, in a case of conducting the OFF-actions for all in the sequence of the function block_0 50 through the function block_3 53, when the OFF-action is made to the function block_0 50 and when the OFF-action is permitted to the function block_2 52, the fluctuating waveform 72a occurs to the internal power voltage ivdd of the LSI 500 (FIG. 36(a)). After the OFF-action is permitted to the function block_0 50 at any one of the OFF-action permission periods indicated by the OFF-action permission period signal off_fe (FIG. 36(b)), the OFF-action is permitted to the function block_1 51. Then, after the OFF-action is permitted to the function block_2 52, the OFF-action is permitted to the function block_3 53.

In this case, after the OFF-action is permitted to the function block_0 50, when the OFF-action is permitted to the function block_1 51, the fluctuation of the internal power voltage ivdd is cancelled by mutual resonance periods and the current state is transited to the initial state.

In the constraint invocation term, a first OFF-action permission period starts after approximately ½ resonance period Tres in response to a detection of the reference voltage A at a falling waveform. If the OFF-action is not permitted to the function block_1 51 or the function block_3 53 to be next, the first OFF-action permission period and the ON-action forbidden period are passed. Then, a next OFF-action permission period is started after the approximately one resonance period Tres in response to a detection of the reference voltage A at the rising waveform.

In accordance with the constraint invocation term and the OFF-action permission period determined by using the internal voltage monitor data, the clock enabling sequence is conducted at a timing of the OFF-action, which is adjusted based on the fluctuation of the actual internal power voltage ivdd.

An OFF-action control by the clock disabling sequence is conducted similar to the ON-action control by the clock enabling sequence, and the explanation thereof will be omitted. It is noted that in a case of the clock disabling sequence, the data transition detection part 511 of the ON/OFF switch control circuit 510 becomes the constraint invocation state in an approximately ½ resonance period Tres by setting the reference voltage A.

As described above, even if the ON-action and the OFF-action are consecutively conducted in the internal circuit 501, the compound internal voltage fluctuation 81e (that is, the internal power voltage ivdd of the LSI 500) does not exceed over a voltage fluctuation amount caused by the state transitions of a single function block.

Accordingly, in a case of the LSI 500 in which four function blocks (that is, the function block_0 50 through the function block_3 53) are arranged as illustrated in FIG. 22, compared with a conventional LSI, the voltage fluctuation amount is suppressed to approximately one-fourth. Since the voltage fluctuation amount is suppressed as described above, it may be possible to prevent a performance of the LSI 500 from being deteriorated.

Moreover, in the second embodiment, it may be possible to adjust the ON-action timing and the OFF-action timing by detecting the actual voltage fluctuation. Accordingly, the second embodiment is an event driven type of a control by detecting the actual voltage fluctuation, instead of using the timer control and programmably setting the resonance period Tres.

Furthermore, the second embodiment is not limited to the LSI 500 in which four function blocks are arranged in the internal circuit 501, and may be applied to an LSI in which more than four function blocks are arranged in an internal circuit.

Accordingly, since timings of an operation start and an operation suspend are scheduled for each of the plurality of circuits in an semiconductor device, it may be possible to considerably reduce a power supply noise related to a step response, and it may be possible to prevent deterioration of a performance of the semiconductor device caused by the power supply noise.

All examples and conditional language recited herein are intended for pedagogical purposes to aid the reader in understanding the principles of the embodiments and the concepts contributed by the inventor to furthering the art, and are to be construed as being without limitation to such specifically recited examples and conditions, nor does the organization of such examples in the specification relate to a showing of the superiority and inferiority of the embodiments. Although the embodiment(s) has(have) been described in detail, it should be understood that the various changes, substitutions, and alterations could be made hereto without departing from the spirit and scope of the invention.

What is claimed is:

1. A semiconductor device, comprising:
    a plurality of circuits each independently executing a predetermined process;
    a circuit operation control part controlling operation start timings and operation suspend timings so as to mutually interfere with power voltage fluctuations caused by a state transition between an operation start and an operation suspend for each of the plurality of circuits; and
    an adjustment circuit adjusting execution timings of at least one of operation enables and operation disables based on a resonance period of the power voltage.

2. The semiconductor device as claimed in claim 1, wherein: each of the circuits includes an operation enable terminal; the circuit operation control part includes a first controller controlling an operation enable state by controlling a signal state of the operation enable terminal for each of the circuits; and the adjustment circuit sends an acknowledge instruction to the first controller, when receiving one or more operation enable requests and operation disable requests for the plurality of circuits from the first controller.

3. The semiconductor device as claimed in claim 1, wherein one resonance period of the power voltage is indicated by cycles of a system clock period.

4. The semiconductor device as claimed in claim 1, wherein one resonance period of the power voltage is set as programmable.

5. The semiconductor device as claimed in claim 1, wherein the adjustment circuit has an initial state, a first constraint invocation state which is invoked by an ON transition from an OFF state to an ON state with respect to one operation enable terminal, and a second constraint invocation state which is invoked by an OFF transition from the ON state to the OFF state with respect to the one operation enable terminal.

6. The semiconductor device as claimed in claim 5, wherein in the initial state, when a number of the operation enable requests is the same as a number of the operation disable requests in which the operation enable requests and the operation disable requests are received from the first controller, the adjustment circuit sends the acknowledge instructions for all the operation enable requests and the operation disable requests to the first controller.

7. The semiconductor device as claimed in claim 5, wherein in the initial state, when a number of the operation enable requests is greater than a number of the operation disable requests in which the operation enable requests and the operation disable requests are received from the first controller, the adjustment circuit sends the acknowledge instructions to the first controller for all the operation disable requests and the operation enable requests which are the same number of the operation disable requests, further sends the acknowledge instructions to the first controller for remaining operation enable requests, and transits to the first constraint invocation state.

8. The semiconductor device as claimed in claim 5, wherein in the initial state, when a number of the operation enable requests is fewer than a number of the operation disable requests, in which the operation enable requests and the operation disable requests are received from the first controller, the adjustment circuit sends the acknowledge instruction to the first controller for all operation enable requests and the operation disable requests which are the same number of the operation enable requests, further sends acknowledge instructions to the first controller for remaining operation disable requests, and transits to the second constraint invocation state.

9. The semiconductor device as claimed in claim 5, wherein the adjustment circuit alternately generates an ON transition forbidden period and an ON transition permission period for the operation enable requests and alternately generates an OFF transition forbidden period and an OFF transition permission period for the operation disable requests, for each of the first constraint invocation state and the second constraint invocation.

10. The semiconductor device as claimed in claim 9, wherein at least, a generation method of the ON transition forbidden period and the ON transition permission period for the operation enable requests in the first constraint invocation state is the same as a generation method of the OFF transition forbidden period and the OFF transition permission period for the operation disable requests in the second constraint invocation state, or a generation method of the OFF transition forbidden period and the OFF transition permission period for the operation disable requests in the first constraint invocation state is the same as a generation method of the ON transition forbidden period and the ON transition permission period for the operation enable requests in the second constraint invocation state.

11. The semiconductor device as claimed in claim 9, wherein in the first constraint invocation state or the second constraint invocation state, when the number of the operation enable requests is the same as the number of the operation disable requests in which the operation enable requests and the operation disable requests are received from the first controller, the adjustment circuit sends the acknowledge instructions to the first controller for all the operation enable requests and the operation disable requests, regardless of the ON transition forbidden period, the ON transition permission period, the OFF transition forbidden period, and the OFF transition permission period, and retains the first constraint invocation state or the second constraint invocation state.

12. The semiconductor device as claimed in claim 9, wherein in the ON transition permission period of each of the first constraint invocation state and the second constraint invocation state, the adjustment circuit sends the acknowledge instruction to the first controller for one of the operation enable requests, releases the first constraint invocation state and the second constraint invocation state, and transits to the initial state.

13. The semiconductor device as claimed in claim 9, wherein in the OFF transition permission period of each of the first constraint invocation state and the second constraint invocation state, the adjustment circuit sends the acknowledge instruction to the first controller for one of the operation disable requests, releases the first constraint invocation state and the second constraint invocation state, and transits to the initial state.

14. The semiconductor device as claimed in claim 9, wherein in each of the first constraint invocation state and the second constraint invocation state, when a constant time lapses without receiving the operation enable requests and the operation disable requests, the adjustment circuit transits to the initial state.

15. The semiconductor device as claimed in claim 2, wherein the first controller includes: a second controller sending the operation enable requests and/or the operation disable requests to the adjustment circuit; a plurality of pulsed latches switching a signal state of each operation enable terminal with respect to the operation enable requests and/or the operation disable requests sent from the second controller in response to acknowledge pulses indicating the acknowledge instruction received from the adjustment circuit.

16. The semiconductor device as claimed in claim 1, wherein: the plurality of the circuits are mounted in one internal circuit; and the circuit operation control part includes: a voltage sensor measuring the power voltage of the internal circuit; and a data transition detection part detecting a transition of measurement data indicating a measurement result of the power voltage supplied from the voltage sensor, and determining the operation start timings and the operation suspend timings of the plurality of circuits based on a detection result.

17. The semiconductor device as claimed in claim 16, wherein the data transition detection part detects a resonance period of the power voltage fluctuation from the measurement data.

18. The semiconductor device as claimed in claim 16, wherein when the data transition detection part detects a startup of the operation start or the operation suspend, the data transition detection part permits a next operation start or a next operation suspend during a transition term of the measurement data in which the power voltage fluctuation is cancelled by interferences of resonance.

19. The semiconductor device as claimed in claim 16, wherein when the data transition detection part detects a startup of the operation start or the operation suspend, the data transition detection part forbids a next operation start or a next operation suspend during a transition term of the measurement data in which the power voltage fluctuation is amplified by interferences of resonance.

20. An adjustment circuit to be mounted in a semiconductor device including a plurality of circuits for separately processing processes based on a power voltage and for adjusting timings of an operation enable and an operation disable of each of the plurality of the circuits, wherein the adjustment circuit adjusts the timings based on a resonance period of the power voltage in response to more than two of operation enable requests and/or operation disable requests with respect to the plurality of the circuits, so as to suppress power voltage fluctuations caused by a resonance of an internal power voltage with each other.

* * * * *